US012791814B2

(12) United States Patent
Murray et al.

(10) Patent No.: US 12,791,814 B2
(45) Date of Patent: Nov. 10, 2026

(54) TELECOMMUNICATIONS CHASSIS

(71) Applicants: CommScope Connectivity UK Limited, Dorcan (GB); CommScope Connectivity Belgium BVBA, Kessel-Lo (BE)

(72) Inventors: David Patrick Murray, Bishopton (GB); Christopher Charles Taylor, Cheltenham (GB); Heidi Bleus, Genk (BE); Willem De Vis, Merchtem (BE); Danny Ghislain Thijs, Zonhoven (BE); Geert Antoon Parton, Lubbeek (BE)

(73) Assignees: CommScope Connectivity UK Limited, Dorcan (GB); CommScope Connectivity Belgium BVBA, Kessel-Lo (BE)

( * ) Notice: Subject to any disclaimer, the term of this patent is extended or adjusted under 35 U.S.C. 154(b) by 209 days.

(21) Appl. No.: 18/758,294

(22) Filed: Jun. 28, 2024

(65) Prior Publication Data

US 2024/0353645 A1 Oct. 24, 2024

Related U.S. Application Data

(63) Continuation of application No. 18/160,115, filed on Jan. 26, 2023, now Pat. No. 12,025,846, which is a (Continued)

(51) Int. Cl.
*G02B 6/44* (2006.01)

(52) U.S. Cl.
CPC .................................. *G02B 6/4455* (2013.01)

(58) Field of Classification Search
CPC ............................ G02B 6/4455; G02B 6/4478
(Continued)

(56) References Cited

U.S. PATENT DOCUMENTS 4,609,171 A 9/1986 Matsui
4,765,710 A 8/1988 Burmeister et al.
(Continued)

FOREIGN PATENT DOCUMENTS

CN 102375188 A 3/2012
CN 102460261 A 5/2012
(Continued)

OTHER PUBLICATIONS

2005 Product Catalog, CommScope Europe, S.PR.L., 13 pages (Nov. 2004).
(Continued)

*Primary Examiner* — Robert Tavlykaev
(74) *Attorney, Agent, or Firm* — Merchant & Gould P.C.

(57) ABSTRACT

A fiber optic system includes a telecommunications chassis defining a front and a rear, a plurality of blades slidably mounted to the chassis, the blades slidable in a direction extending from the front to the rear, and a plurality of fiber optic cassettes removably mounted to each blade. Each fiber optic cassette includes a housing defining a maximum cassette height, the housing formed by a base and a cover mounted thereon. Each cassette defines fiber optic connection locations. The base of each cassette defines a notched area for receiving a portion of the blade on which the cassette is mounted such that the blade does not increase the overall maximum height defined by the housing.

7 Claims, 79 Drawing Sheets

Related U.S. Application Data continuation of application No. 17/065,904, filed on Oct. 8, 2020, now Pat. No. 11,567,281, which is a continuation of application No. 16/039,920, filed on Jul. 19, 2018, now abandoned, which is a continuation of application No. 15/024,287, filed as application No. PCT/EP2014/070125 on Sep. 22, 2014, now Pat. No. 10,042,135.

(60) Provisional application No. 61/982,406, filed on Apr. 22, 2014, provisional application No. 61/942,805, filed on Feb. 21, 2014.

(58) Field of Classification Search
USPC .................................................. 385/134–136
See application file for complete search history.

(56) References Cited

U.S. PATENT DOCUMENTS 4,840,449 A 6/1989 Ghandeharizadeh
5,129,030 A 7/1992 Petrunia
5,167,001 A 11/1992 Debortoli et al.
5,240,209 A * 8/1993 Kutsch ................ G02B 6/4478 248/74.1
5,339,379 A 8/1994 Kutsch et al.
5,420,958 A 5/1995 Henson et al.
5,497,444 A 3/1996 Wheeler
5,613,030 A 3/1997 Hoffer et al.
5,717,810 A 2/1998 Wheeler
5,758,003 A 5/1998 Wheeler et al.
5,778,131 A 7/1998 Liewellyn et al.
5,966,492 A 10/1999 Bechamps et al.
5,971,626 A 10/1999 Knodell et al.
6,005,991 A 12/1999 Knasel
6,195,493 B1 2/2001 Bridges
6,356,696 B1 * 3/2002 Bakker ................ G02B 6/4478 385/134
6,385,381 B1 5/2002 Janus et al.
6,442,323 B1 8/2002 Sorosiak
6,504,988 B1 1/2003 Trebesch et al.
6,560,114 B2 5/2003 Berry et al.
6,591,051 B2 7/2003 Solheid et al.
6,627,812 B2 9/2003 Kim et al.
6,715,619 B2 4/2004 Kim et al.
6,752,665 B2 6/2004 Kha et al.
6,760,531 B1 7/2004 Solheid et al.
6,792,190 B2 * 9/2004 Xin ...................... G02B 6/4461 385/137
6,804,447 B2 10/2004 Smith et al.
6,854,894 B1 2/2005 Yunker et al.
6,920,274 B2 7/2005 Rapp et al.
6,937,807 B2 8/2005 Franklin et al.
6,944,383 B1 9/2005 Herzog et al.
7,070,459 B2 7/2006 Denovich et al.
7,094,095 B1 8/2006 Caveney
7,171,099 B2 1/2007 Barnes et al.
7,194,181 B2 3/2007 Holmberg et al.
7,200,316 B2 4/2007 Giraud et al.
7,257,223 B2 8/2007 Sajadi et al.
7,273,320 B2 9/2007 Ellis et al.
7,318,751 B2 1/2008 Erdman et al.
7,376,322 B2 5/2008 Zimmel et al.
7,409,137 B1 8/2008 Barnes
7,462,779 B2 12/2008 Caveney et al.
7,470,068 B2 12/2008 Kahle et al.
7,474,828 B2 1/2009 Leon et al.
7,515,806 B2 * 4/2009 Zellak .................. G02B 6/4461 385/136
7,542,649 B1 6/2009 Andersen
7,570,860 B2 8/2009 Smrha et al.
7,570,861 B2 8/2009 Smrha et al.
7,590,328 B2 9/2009 Reinhardt et al.
7,636,507 B2 12/2009 Lu et al.
7,689,089 B2 3/2010 Wagner et al.
7,873,252 B2 1/2011 Smrha et al.
7,873,253 B2 1/2011 Smrha et al.
8,009,954 B2 8/2011 Bran de Leon et al.
8,179,684 B2 5/2012 Smrha et al.
8,340,490 B2 12/2012 Smrha et al.
8,346,044 B2 1/2013 Smrha et al.
8,363,998 B2 1/2013 Newman et al.
8,452,148 B2 5/2013 Cooke et al.
8,538,226 B2 9/2013 Makrides-Saravanos et al.
8,867,884 B2 10/2014 Smrha et al.
8,879,881 B2 11/2014 Cote et al.
8,886,335 B2 11/2014 Pianca et al.
8,953,921 B2 2/2015 Smrha et al.
8,991,950 B2 3/2015 Privitera et al.
9,097,871 B2 8/2015 Smrha et al.
9,429,714 B2 8/2016 Holmberg
9,435,974 B2 9/2016 Smrha et al.
9,435,976 B2 9/2016 Smrha et al.
9,448,378 B2 9/2016 Smrha et al.
9,448,379 B2 9/2016 Smrha et al.
9,488,796 B2 11/2016 Smrha et al.
9,535,226 B2 1/2017 Simmons
9,638,879 B2 5/2017 Smrha et al.
9,638,880 B2 5/2017 Smrha et al.
9,645,342 B2 5/2017 Smrha et al.
9,661,787 B2 5/2017 Hall et al.
9,690,066 B2 6/2017 Smrha et al.
9,703,059 B2 7/2017 Smrha et al.
9,709,764 B2 7/2017 Smrha et al.
9,995,897 B2 6/2018 Smrha et al.
10,203,464 B1 2/2019 Smrha et al.
10,310,204 B2 6/2019 Smrha et al.
10,473,874 B2 11/2019 Smrha et al.
10,739,544 B2 8/2020 Smrha et al.
2002/0102088 A1 8/2002 Kondo et al.
2002/0159746 A1 * 10/2002 Howell ................ G02B 6/4453 385/135
2003/0174953 A1 9/2003 Carnevale et al.
2003/0174996 A1 9/2003 Henschel et al.
2003/0223723 A1 12/2003 Massey et al.
2004/0062488 A1 4/2004 Wood
2004/0086252 A1 5/2004 Smith et al.
2006/0261015 A1 11/2006 Blackwell
2006/0275008 A1 12/2006 Xin
2008/0025683 A1 1/2008 Murano
2008/0037209 A1 2/2008 Niazi et al.
2009/0129033 A1 5/2009 Smrha et al.
2009/0214171 A1 8/2009 Coburn et al.
2010/0054683 A1 3/2010 Cooke et al.
2010/0166378 A1 7/2010 Taylor
2010/0209064 A1 8/2010 Ruiz
2010/0296790 A1 11/2010 Cooke et al.
2010/0322582 A1 12/2010 Cooke et al.
2011/0267794 A1 11/2011 Anderson et al.
2011/0268405 A1 11/2011 Cote et al.
2011/0317971 A1 12/2011 Zhang et al.
2011/0317974 A1 12/2011 Krampotich et al.
2012/0008900 A1 1/2012 Schneider
2012/0114295 A1 5/2012 Guzzo et al.
2012/0251045 A1 10/2012 Budd et al.
2013/0089995 A1 4/2013 Gniadek et al.
2013/0177285 A1 7/2013 Carter et al.
2014/0086545 A1 3/2014 Solheid et al.
2014/0248028 A1 9/2014 Campbell et al.
2015/0131958 A1 5/2015 Smrha et al.
2015/0286021 A1 10/2015 Smrha et al.
2015/0331214 A1 11/2015 Smrha et al.
2015/0331215 A1 11/2015 Smrha et al.
2015/0331216 A1 11/2015 Smrha et al.
2015/0338593 A1 11/2015 Smrha et al.
2015/0338594 A1 11/2015 Smrha et al.
2015/0338595 A1 11/2015 Smrha et al.
2015/0338597 A1 11/2015 Smrha et al.

(56) References Cited

U.S. PATENT DOCUMENTS

| | | | |
|---|---|---|---|
| 2015/0338598 | A1 | 11/2015 | Smrha et al. |
| 2015/0338599 | A1 | 11/2015 | Smrha et al. |

FOREIGN PATENT DOCUMENTS

| | | | | | |
|---|---|---|---|---|---|
| DE | 102007030981 | * | 6/2018 | | G02B 6/44 |
| EP | 0341027 | A2 | 11/1989 | | |
| EP | 1603345 | A2 | 12/2005 | | |
| JP | 2002-82230 | A | 3/2002 | | |
| KR | 10-2006-0111757 | A | 10/2006 | | |
| WO | 2011/094327 | A1 | 8/2011 | | |
| WO | 2011/100613 | A1 | 8/2011 | | |
| WO | 2013/052854 | A2 | 4/2013 | | |
| WO | 2013/106820 | A1 | 7/2013 | | |

OTHER PUBLICATIONS

2006 European Product Catalog, Fiber Optic Cabling, Tyco Electronics AMP GmbH, 11 pages (Copyright 2005).
2007 Solutions Catalog, CommScope, Inc., 27 pages (Feb. 2007).
2007 Uniprise Catalog, CommScope, 31 pages (2007).
2008 Product Catalog, CommScope, Inc., 29 pages (Copyright 2008).
ADC Telecommunications Fiber Outside Plant Systems, 4 pgs.; Aug. 1998.
ADC Telecommunications Fiber Panel Products, Second Edition, 6 pgs.; Jul. 1996.
APA Cable & Networks Unveils 288-Port Fiber Distribution Panel for Central Office Use; Customizable Fiber Cable Panel is One of Densest in the Industry; Modular Design Allows Telcos, CLECs, MSOs to Expand Capacity as Needed, PR Newswire (New York), Jun. 20, 2006, 3 pages.
Cabinets, Racks, Panels, and Associated Equipment, EIA/ECA Standard, EIA/ECA-310-E, 26 pages (Dec. 2005).
Cable Management Tray Panels, ADC, 8 pages (Mar. 2004).
Corning Cable Systems; "Jumper Routing Procedure for Enhanced Management Frame"; Issue 2; dated Apr. 2002; 4 pgs.
Drawing of ADC Telecommunications Drawer, 1 page; Aug. 2006.
Drawing of ADC Telecommunications Drawer, 2 pages, Nov. 2006.
Fiber Optic Panels, 1st Edition, ADC Telecommunications, Inc., 93 pages (Oct. 2007).
Fiber Optic Products, Lucent Technologies, 46 pages (Jun. 1997).
Fiber Optic Products, Lucent Technologies, 62 pages, Issue 8 (Sep. 1999).
FOCIS 10, Fiber Optic Connector Intermateability Standard—Type LC, TIA/EIA Standard, TIA/EIA-604-10A, 36 pages (Mar. 2002).
FONS Introduces Family of Rack Mount Splice Shelves; A Natural Extension to FONS' Suite of High-Density Products for Complete Fiber-to-the-'X' Solutions, Business/Technology Editors Optical Fiber Communications 2002, Business Wire (New York), Apr. 3, 2002, 3 Pages.
LC Connector Products (Fiber), The Siemon Company, Feb. 2000, 4 Pages.
Lightwave—Fiber remains medium of choice for data center applications, www.lightwaveonline.com; Apr. 1, 2007, 5 Pages.
McCreary, Scott A. et al., Increasing rack capacity: An ongoing challenge, Fiberoptic Product News 16.5, May 2001, 7 Pages.
OmniReach™ FTTP Solutions, ADC Telecommunications, Inc., 12 pages, (Apr. 2004).
OMX™ VAM (Value-Added Module) User Manual, ACDP-90-281, Issue 1, pp. 1-8 (Nov. 2000).
Systimax Solutions Catalog, CommScope, Inc., 32 pages (Sep. 2005).
Systimax Solutions Catalog, CommScope, Inc. 19 pages (Copyright 2008).
Systimax Solutions, "Systimax G2 Fiber-Optic Connectivity Solution," Jun. 2005 (10 pgs).
Systimax Solutions, "Systimax InstaPatch Plus Modular Shelf and DM2 Modules," Jun. 2005 (3 pgs).
Systimax Solutions, "Systimax InstaPatch System," Aug. 2004 (7 pgs).
Systimax Solutions, "The Systimax 110 VisiPatch System—Clearly the Way Ahead," May 2004 (3 pgs).
Systimax Solutions, "The Systimax iPatch System," Jun. 2004 (8 pgs).
Systimax® InstaPatch® Plus Modular Shelf and DM2 Modules, CommScope, Inc., pp. 1-4 (Oct. 2007).
Systimax® InstaPatch™ MP-1U Termination Panel Installation Using InstaPatch Plus Modules (for Indoor Use Only), Issue 1, pp. 1-6 (May 2005).
Value-Added Module (VAM) System: Monitor, Splitter, WDM and CWDM Modules and Chassis for Switching Office, Central Exchange and Headend Applications, 1st Edition, ADC Telecommuncations, Inc., 36 pages (Feb. 2008).
Value-Added Module (VAM) System: Monitor, Splitter, WDM and CWDM Modules and Chassis, 4th Edition, ADC Telecommunications, Inc., 32 pages (Mar. 2007).
Value-Added-Module (VAM) System: Unmatched Functionality and Flexibility, 4th Edition, ADC Telecommunications, Inc., 35 pages, (Mar. 2006).
International Search Report and Written Opinion for International Application No. PCT/EP2014/070125 mailed Feb. 26, 2015 (20 pages).
Chinese First Office Action for corresponding Chinese Patent Application No. 201480059838.6 mailed Dec. 3, 2018, 17 pages.
Chinese Second Office Action for corresponding Chinese Patent Application No. 201480059838.6 mailed Dec. 18, 2019, 19 pages.
U.S. Appl. No. 62/027,657, filed Jul. 22, 2014 entitled "Door Hinge Mechanism for Telecommunications Panel."
U.S. Appl. No. 61/707,323, filed Sep. 28, 2012 entitled "Fiber Optic Cassette."

* cited by examiner

TELECOMMUNICATIONS CHASSIS

CROSS REFERENCE TO RELATED APPLICATIONS

This application is a Continuation of U.S. patent application Ser. No. 18/160,115, filed on Jan. 26, 2023; now U.S. Pat. No. 12,025,846; which is a Continuation of U.S. patent application Ser. No. 17/065,904, filed on Oct. 8, 2020, now U.S. Pat. No. 11,567,281; which is a Continuation of U.S. patent application Ser. No. 16/039,920, filed on Jul. 19, 2018, now abandoned; which is a Continuation of U.S. patent application Ser. No. 15/024,287, filed on Mar. 23, 2016, now U.S. Pat. No. 10,042,135; which is a U.S. National Stage of PCT/EP2014/070125, filed on Sep. 22, 2014; which claims benefit of U.S. Provisional Application Ser. No. 61/960,662, filed on Sep. 23, 2013; 61/942,805, filed on Feb. 21, 2014; and 61/982,406, filed on Apr. 22, 2014, which applications are incorporated herein by reference in their entirety.

BACKGROUND

As demand for telecommunications increases, fiber optic networks are being extended in more and more areas. Management of the cables, case of installation, and case of accessibility for later management are important concerns. As a result, there is a need for fiber optic devices which address these and other concerns.

SUMMARY

An aspect of the present disclosure relates to fiber optic devices in the form of fiber optic cassettes and chassis for housing such cassettes, wherein the cassettes include at least one connector that provides a signal entry location and at least one connector that provides a signal exit location and a flexible fiber optical circuit thereinbetween for relaying the signal from the entry location to the exit location. The fiber optic cassettes may be mounted to "pull-out" blades or trays located on the chassis that provide access to the signal entry location or the signal exit location on each fiber optic cassette.

Another aspect of the present disclosure relates to a telecommunications system including a telecommunications chassis, a plurality of blades or trays slidably mounted to the chassis, wherein each blade is configured to hold a plurality of fiber optic cassettes. Each fiber optic cassette mounted on the blade includes a body defining a front and an opposite rear. A cable entry location is defined on the body for a cable to enter the cassette, wherein a plurality of optical fibers from the cable extend into the cassette and form terminations at non-conventional connectors adjacent the front of the body. A flexible substrate is positioned between the cable entry location and the non-conventional connectors adjacent the front of the body, the flexible substrate rigidly supporting the plurality of optical fibers. Each of the non-conventional connectors adjacent the front of the body includes a ferrule, a ferrule hub supporting the ferrule, and a split sleeve surrounding the ferrule.

According to another aspect of the present disclosure, the telecommunications system includes a telecommunications chassis defining a front and a rear, a plurality of blades slidably mounted to the chassis, the blades slidable in a direction extending from the front to the rear, and a plurality of fiber optic cassettes removably mounted to each blade. Each fiber optic cassette includes a housing defining a maximum cassette height, the housing formed by a base and a cover mounted thereon. Each cassette defines fiber optic connection locations. The base of each cassette defines a notched area for receiving a portion of the blade on which the cassette is mounted such that the blade does not increase the overall height defined by the housing. In certain embodiments, the blade lies flush with the housing of the cassette so as to not increase the overall height defined by the housing.

According to another aspect of the present disclosure, the telecommunications system includes a telecommunications rack defining a standard 19-inch width, a telecommunications chassis mounted to the telecommunications rack, the telecommunications chassis defining a height of at least one standard unit of rack space (1 RU), and a plurality of fiber optic cassettes slidably mounted to the chassis, each cassette including a housing defining a front side and a rear side, a plurality of fiber optic connection locations defined by adapter ports having a standard LC connector format positioned on the front side of the housing and a cable entry location defined on the housing for a cable to enter the cassette for providing an optical signal leading to the adapter ports at the front side of the housing. When the fiber optic cassettes are mounted within the 19-inch rack via the chassis, the fiber optic cassettes provide 240 adapter ports having a standard LC connector format within a 1 RU of rack space within the 19-inch rack.

According to another aspect of the present disclosure, the telecommunications system includes a telecommunications chassis defining a front and a rear, a plurality of blades slidably mounted to the chassis, the blades stacked vertically and slidable in a direction extending from the front to the rear, and at least one fiber optic cassette removably mounted to each blade, wherein a portion of a first fiber optic cassette mounted on a first blade abuts a portion of a second fiber optic cassette mounted on a second blade positioned directly above the first blade.

According to another aspect of the present disclosure, a flexible optical circuit includes a flexible substrate and a plurality of optical fibers physically supported by the flexible substrate, wherein a first end of each of the optical fibers is terminated to a multi-fiber connector that is coupled to the flexible substrate and a second end of each of the optical fibers is terminated to a non-conventional fiber optic connector that is coupled to the flexible substrate, the non-conventional fiber optic connector including a ferrule and a ferrule hub that supports the ferrule, wherein the flexible optical circuit is housed in a fiber optic cassette that is removably mounted to a telecommunications chassis with a snap-fit connection. According to another aspect, the fiber optic cassette is mounted to the telecommunications chassis via a blade that slides with respect to the chassis to provide access to the multi-fiber connector or the non-conventional fiber optic connector.

According to another aspect of the present disclosure, a fiber optic cassette includes a housing defining a front side, an opposite rear side, a top, a bottom, and a maximum cassette height defined between the top and the bottom, a cable entry location defined on the housing for a cable to enter the cassette, wherein a plurality of optical fibers from the cable extend into the cassette and form terminations at non-conventional connectors adjacent the front side of the housing, a flexible substrate positioned between the cable entry location and the non-conventional connectors adjacent the front of the housing, the flexible substrate rigidly supporting the plurality of optical fibers, a notched area defined by the bottom for receiving a portion of a telecommunications fixture when the cassette is mounted to the fixture, and a flexible tab protruding from the cassette, the flexible tab configured to removably mount the cassette to the telecommunications fixture with a snap-fit interlock, the flexible tab positioned within the notched area so as to lie within the maximum cassette height defined between the top and the bottom of the cassette.

According to another aspect of the present disclosure, a telecommunications blade for mounting optical equipment to a telecommunications chassis includes a generally thin-profile, planar body defining front end, a rear end, a right side, and a left side, slide portions defined at each of the right and left sides for slidably mounting the blade to the telecommunications chassis, and a plurality of first mounting locations for mounting optical equipment to the blade and a plurality of second mounting locations positioned between the first mounting locations for mounting cable management structures to the blade. The blade is configured such that when receiving optical equipment for mounting, the generally thin-profile body is configured to fit within a portion of the optical equipment such that the blade body does not add to the maximum overall height of the optical equipment.

According to another aspect of the present disclosure, a fiber optic telecommunications system includes a telecommunications chassis defining a right side and a left side and a plurality of mounting slots at each of the right and left sides. At least one telecommunications blade is slidably mounted to the chassis, the telecommunications blade configured for mounting optical equipment to the chassis, the telecommunications blade further comprising a generally thin-profile, planar body defining front end, a rear end, a right side, and a left side, slide portions defined at each of the right and left sides for insertion into mounting slots of the chassis for mounting the blade to the chassis, and a plurality of first mounting locations for mounting optical equipment to the blade and a plurality of second mounting locations positioned between the first mounting locations for mounting cable management structures to the blade. The blade is configured such that when receiving optical equipment for mounting, the generally thin-profile body is configured to fit within a portion of the optical equipment such that the blade body does not add to the maximum overall height of the optical equipment.

According to another aspect, the present disclosure relates to a cable manager for mounting to a telecommunications fixture, the cable manager comprising a bracket, a plurality of independently slidable trays removably mounted to the bracket, the trays configured to be fixed with respect to the bracket with snap-fit interlocking latches, and opposing elastically flexible cable retention fingers within each tray for retaining cables therewithin.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
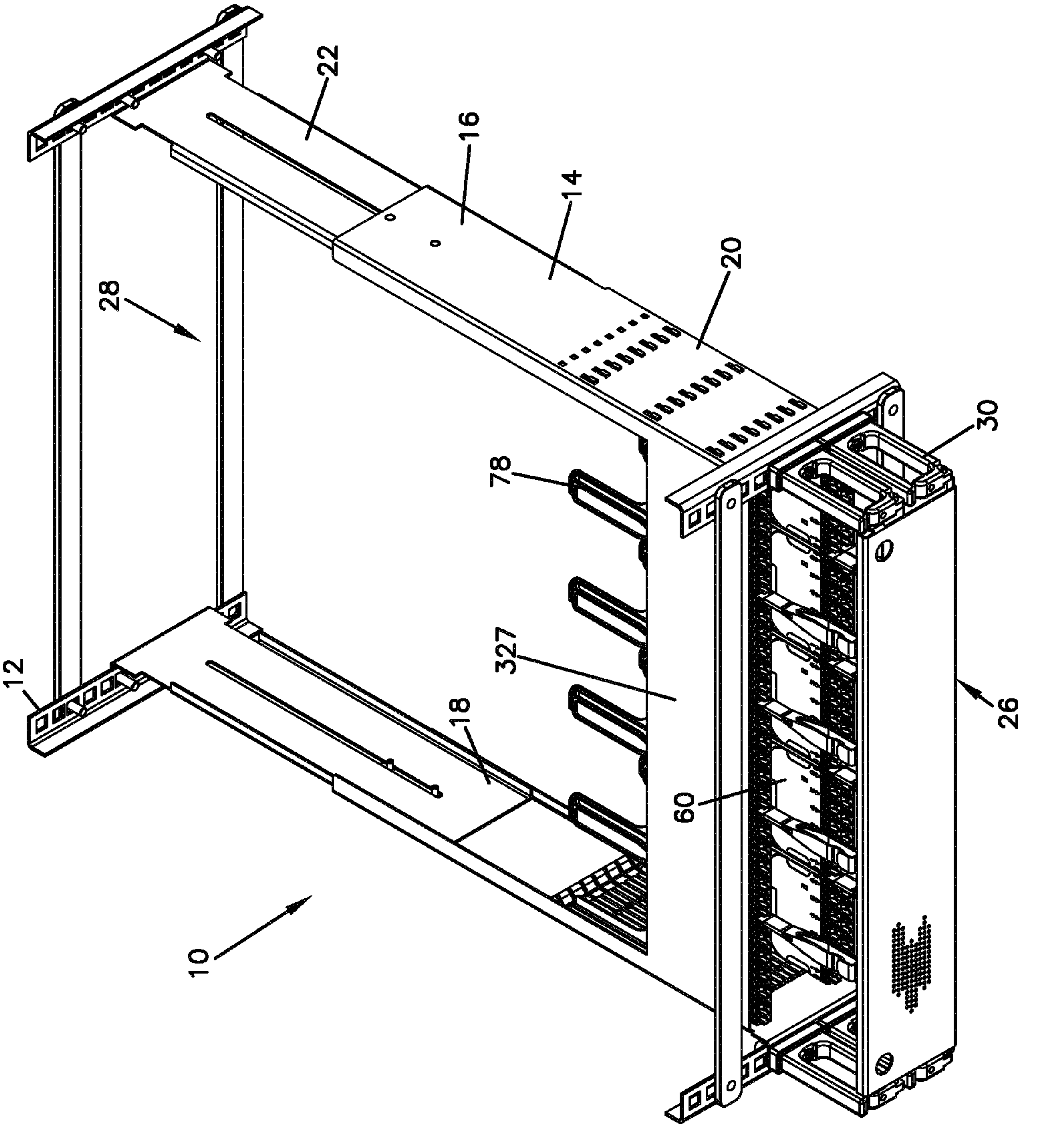
FIG. 1 is a top, front, right side perspective view of a fiber optic telecommunications system having features that are examples of inventive aspects in accordance with the present disclosure, the system including a telecommunications chassis mounted on a telecommunications rack, at least one blade slidably mounted on the telecommunications chassis, and at least one fiber optic cassette removably mounted on the blade.
Figure 2:
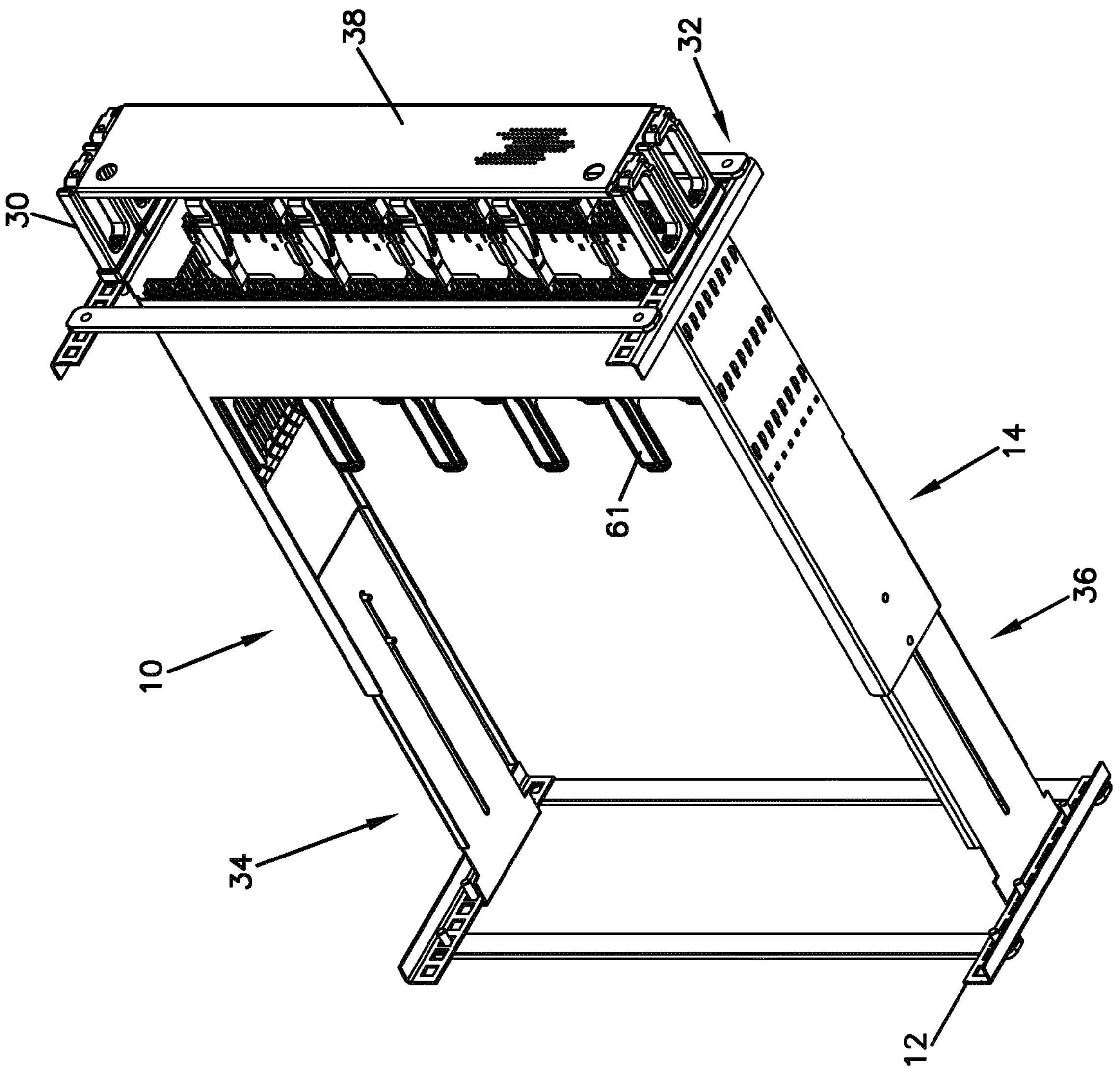
FIG. 2 is a top, front, left side perspective view of the telecommunications system of FIG. 1.

The present disclosure is directed generally to fiber optic devices in the form of fiber optic cassettes and telecommunications chassis configured to house such fiber optic cassettes. As will be described in further detail below, the different embodiments of the fiber optic cassettes of the present disclosure are designed to relay multiple fibers which terminate at a rear connector, such as an MPO style connector, to a plurality of ferrules positioned at a generally front portion of the cassette. The fiber optic cassettes of the present disclosure, thus, provide a transition housing or support between multi-fibered connectors, such as the MPO style connectors having MT ferrules, and single or dual fiber connectors, such as LC or SC type connectors.

Referring now to FIGS. 1-11, a fiber optic telecommunications system 10 having features that are examples of inventive aspects in accordance with the present disclosure is illustrated. The system 10 includes a telecommunications rack or frame 12 and a telecommunications chassis or panel 14 mounted to the rack 12. In the depicted embodiment, the telecommunications rack 12 is a standard 19-inch rack and the depicted chassis 14 is sized to fit the 19-inch width of the rack.

According to the depicted embodiment, the chassis 14 is defined by a right wall 16 and a left wall 18. The right and left walls 16, 18 each include a front portion 20 and a rear portion 22 that are configured to telescopically slide with respect to each other to adjust the depth of the chassis 14. Both the right and left walls 16, 18 define mounting flanges 24 at both a front 26 and a rear 28 of the chassis 14 for mounting the chassis 14 to the telecommunications rack 12.

Adjacent the front 26 of the chassis 14, a top plate 327 extends across the rack 12 from the right wall 16 to the left wall 18. The top plate 29 is configured to provide protection to fiber optic devices housed within the chassis 14.

In the depicted embodiment of the system, a pair of cable rings 30 are attached at the front 32 of the telecommunications rack 12 at each of the right and left side 34, 36 thereof. The cable rings 30 are configured to manage cables leading to or away from the optical devices housed within the chassis 14.

A front door 38 extends across the rack 12 between the cable rings 30 that are at the right and left sides 34, 36 of the rack 12. The door 38 provides access to the connection locations defined by the optical devices within the chassis 14.

Still referring to FIGS. 1-11, in the depicted embodiment, the chassis 14 is configured to have a height of two standard rack units (2 RU). Other heights are possible for the chassis 14. Within the 2 RU height, the chassis 14 is configured to house eight blades or trays 40 that are mounted in a stacked arrangement within the chassis 14. One of the blades 40 is shown in isolation in FIGS. 12-19. As shown, each blade 40 defines a generally planar configuration with slide portions 42 defined at each of the right and left sides 44, 46 of the blade 40. Each of the right and left slide portions 42 defines a front notch 48 and a rear notch 50. Each blade also defines a plurality of rear extensions 540 with upwardly extending portions 541, the purposes of which will be described in further detail below.

Figure 3:
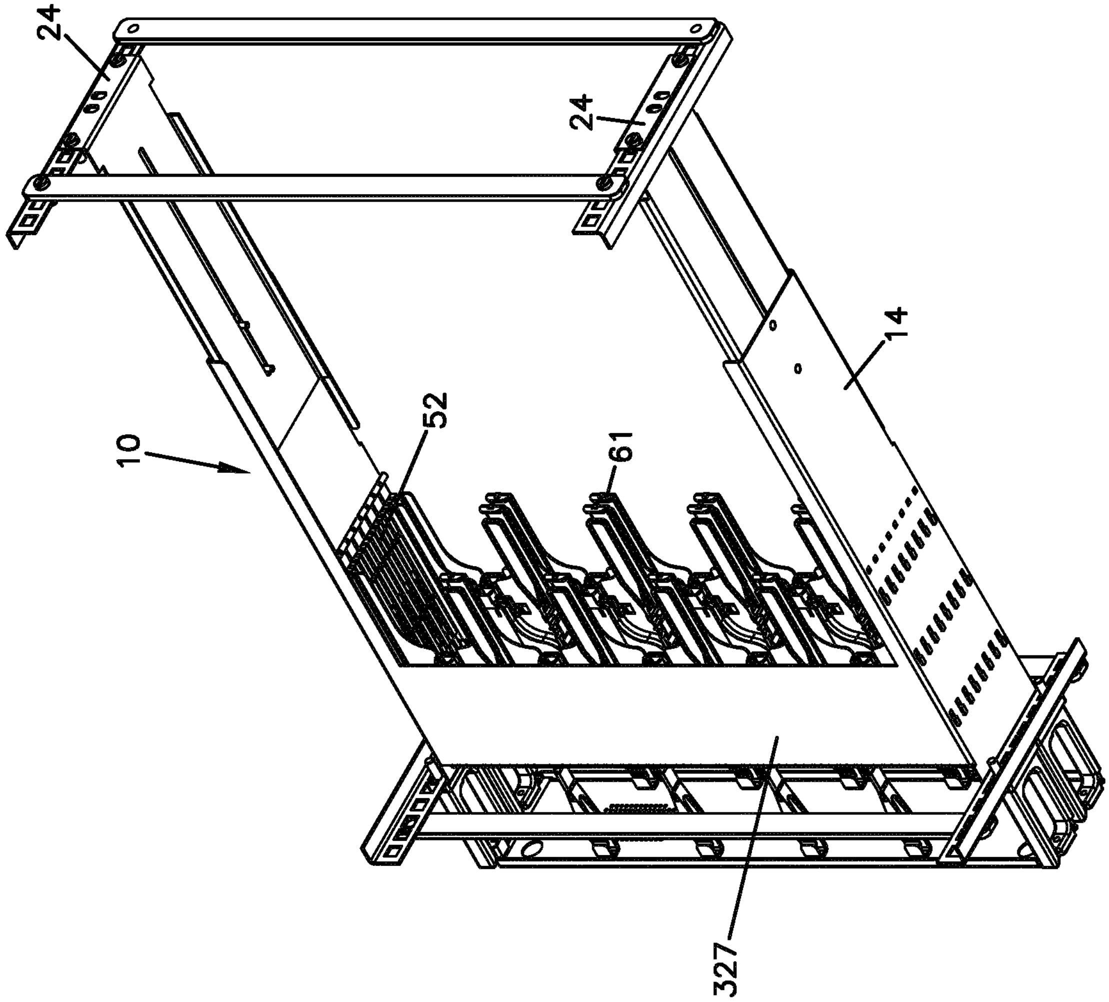
FIG. 3 is a top, rear, right side perspective view of the telecommunications system of FIG. 1.
Figure 4:
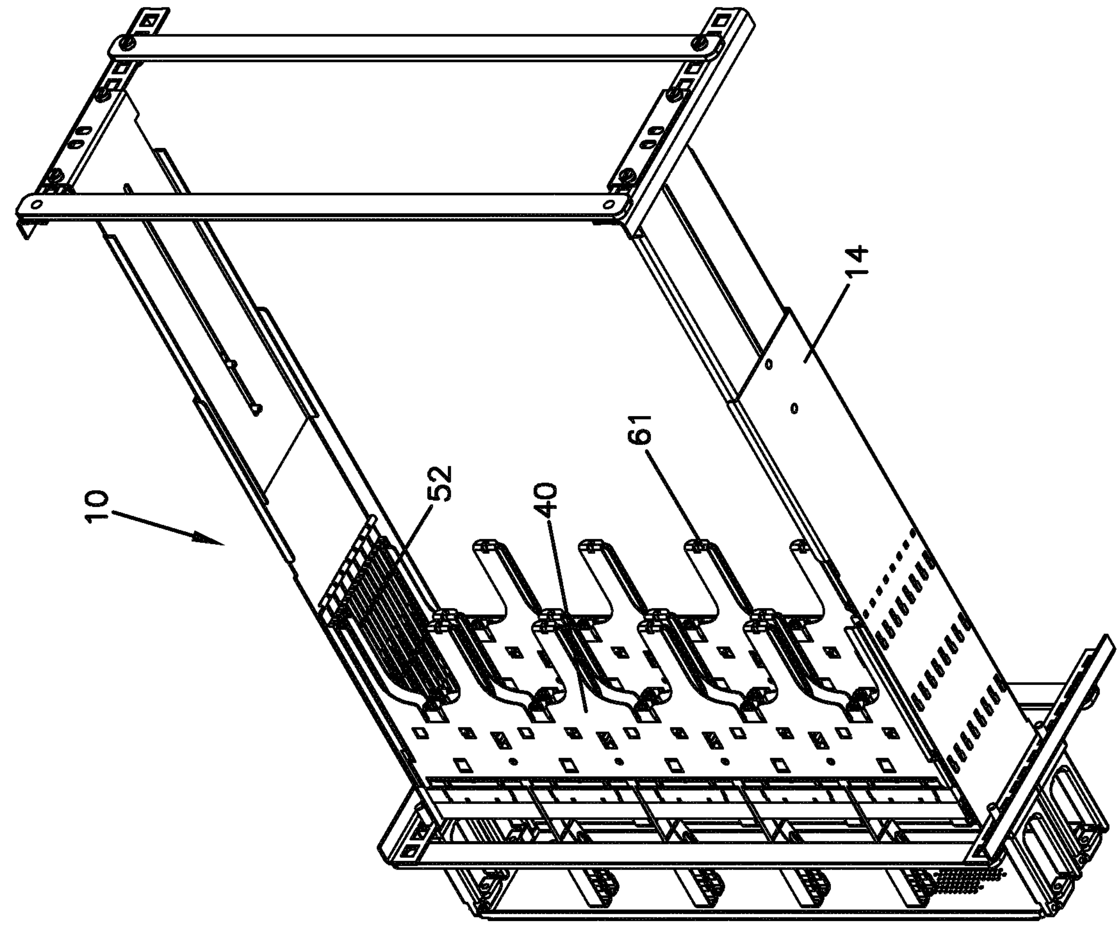
FIG. 4 is a bottom, rear, left side perspective view of the telecommunications system of FIG. 1.
Figure 5:
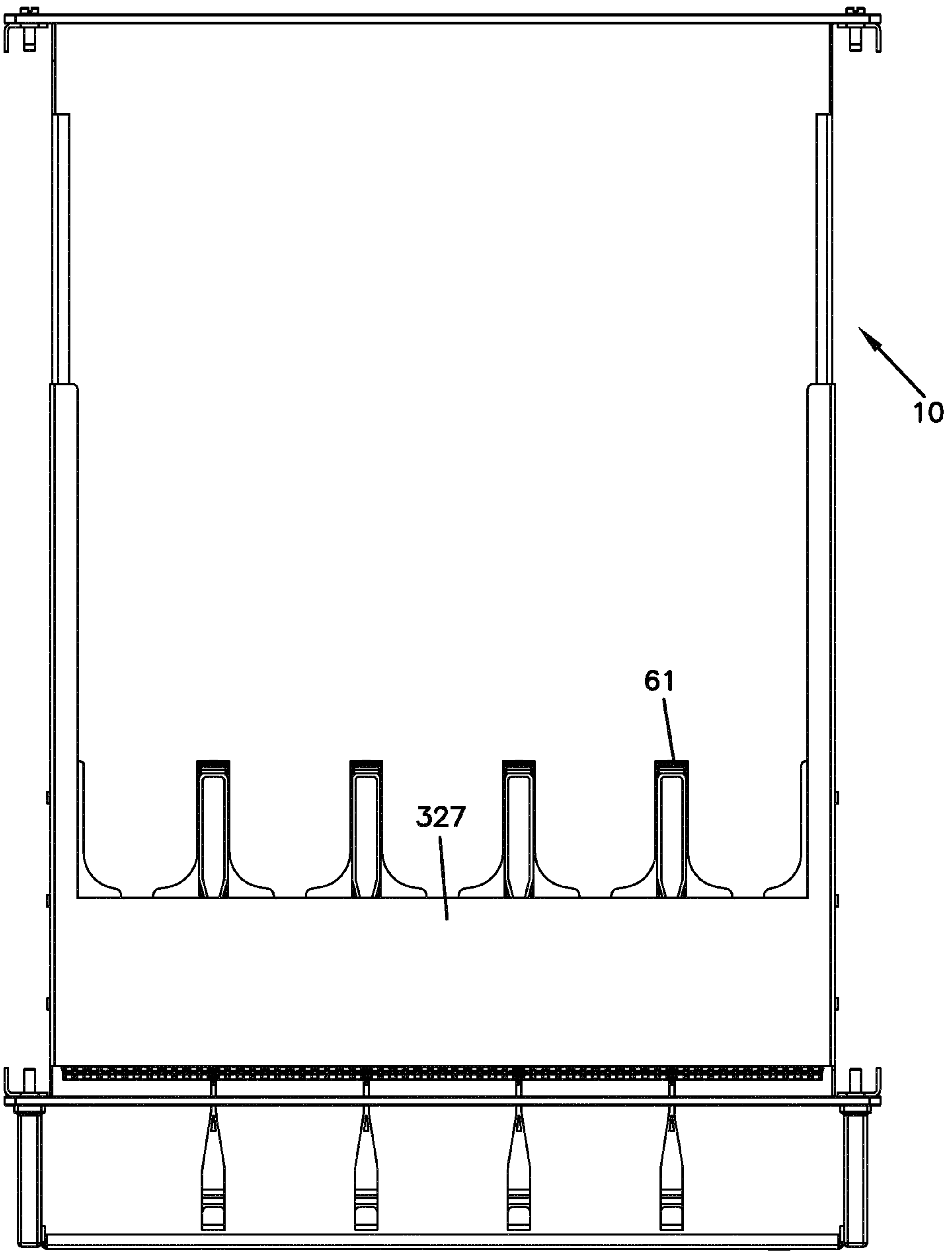
FIG. 5 is a top plan view of the telecommunications system of FIG. 1.
Figure 6:
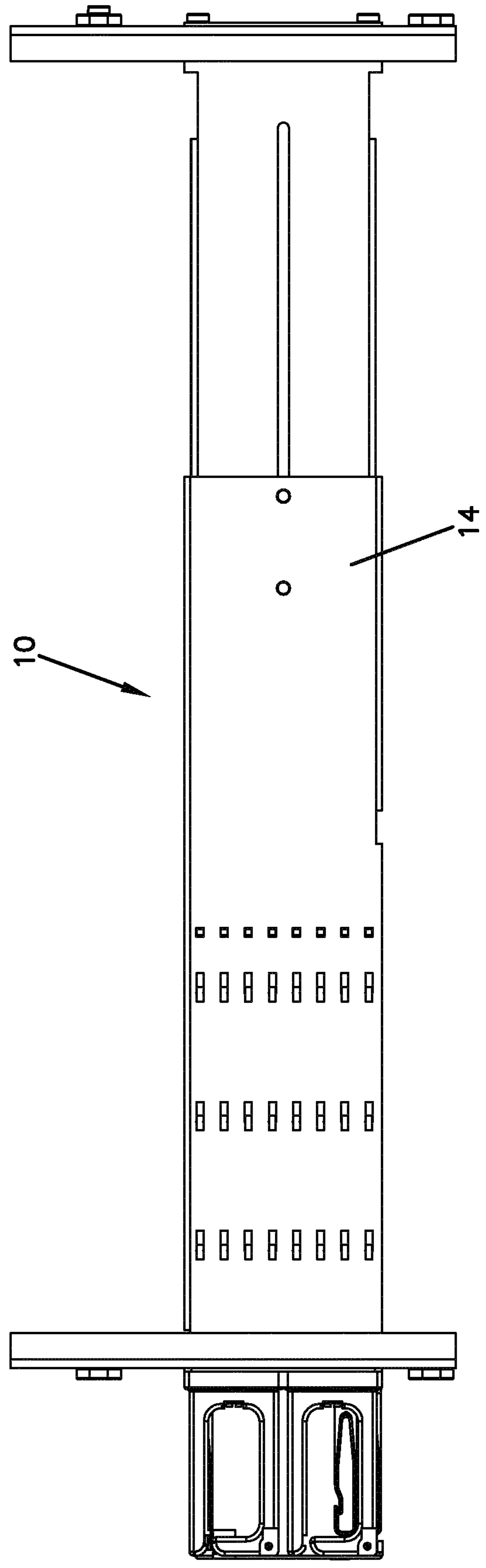
FIG. 6 is a right side view of the telecommunications system of FIG. 1.
Figure 7:
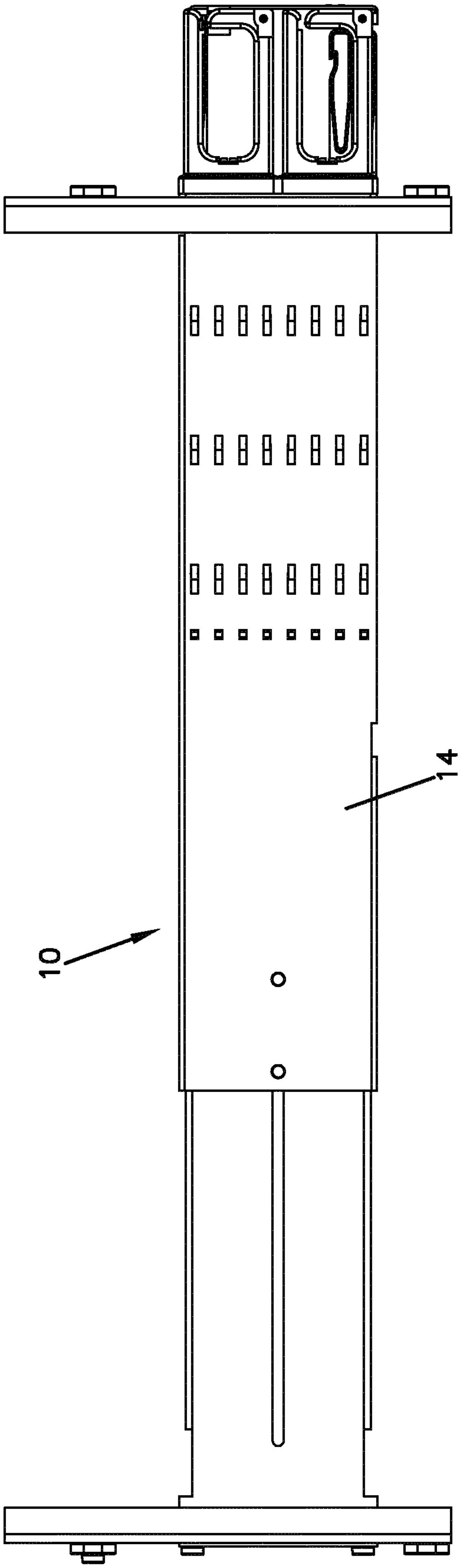
FIG. 7 is a left side view of the telecommunications system of FIG. 1.
Figure 8:
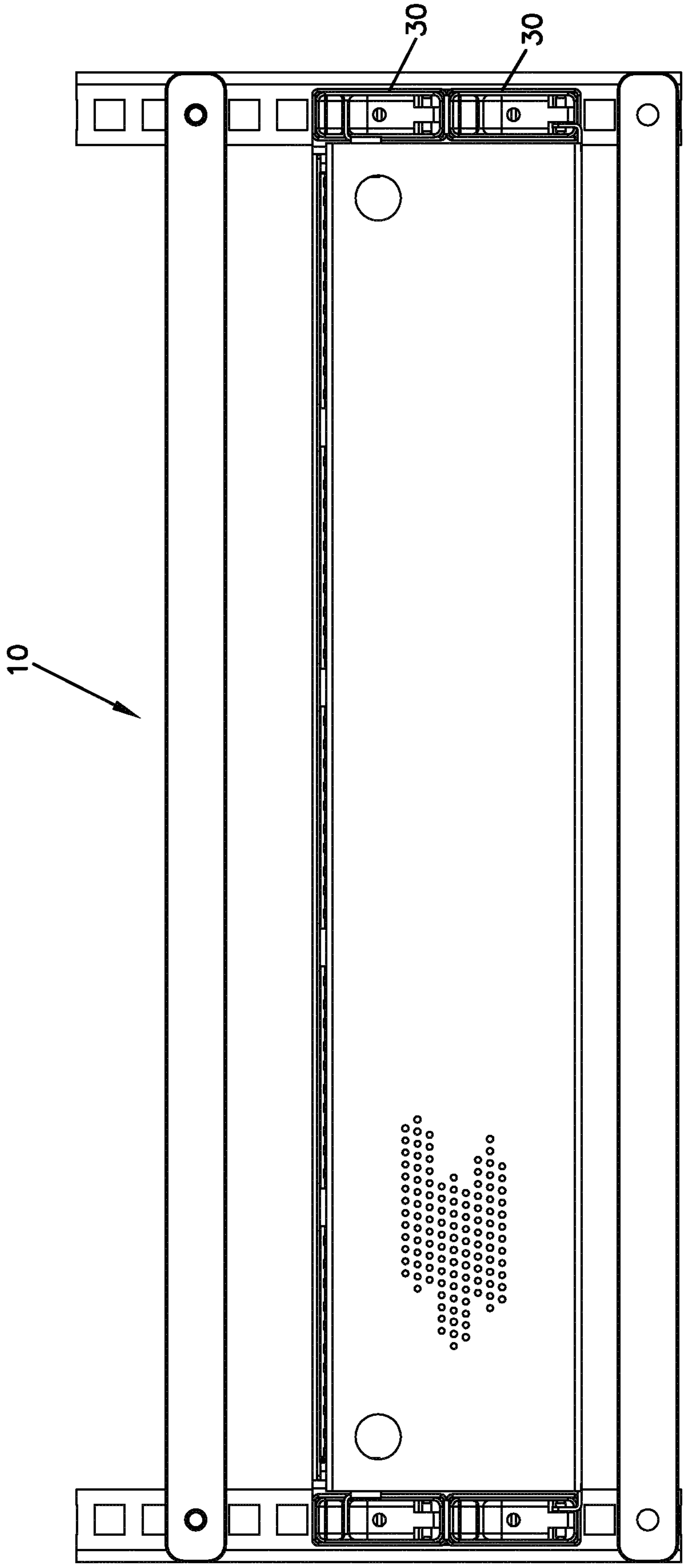
FIG. 8 is a front elevational view of the telecommunications system of FIG. 1.
Figure 9:
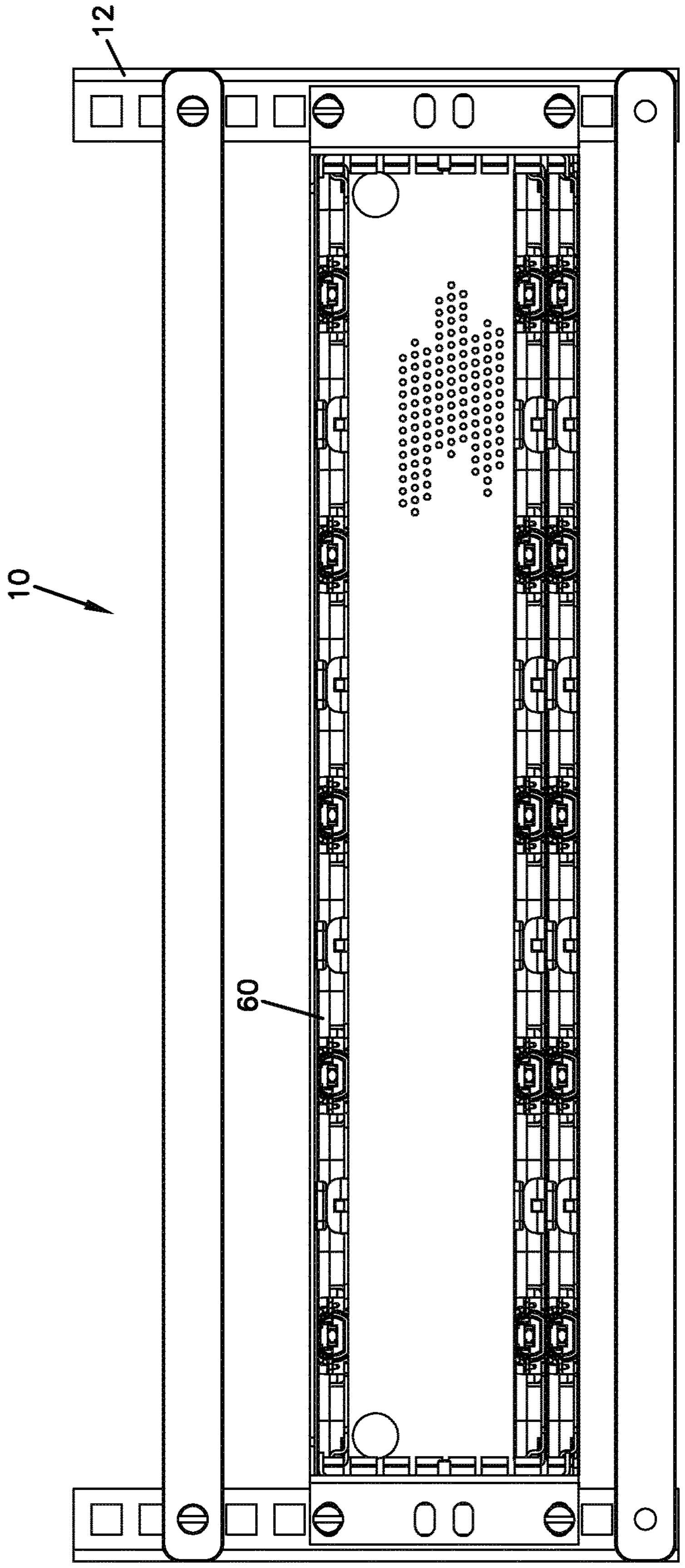
FIG. 9 is a rear elevational view of the telecommunications system of FIG. 1.
Figure 10:
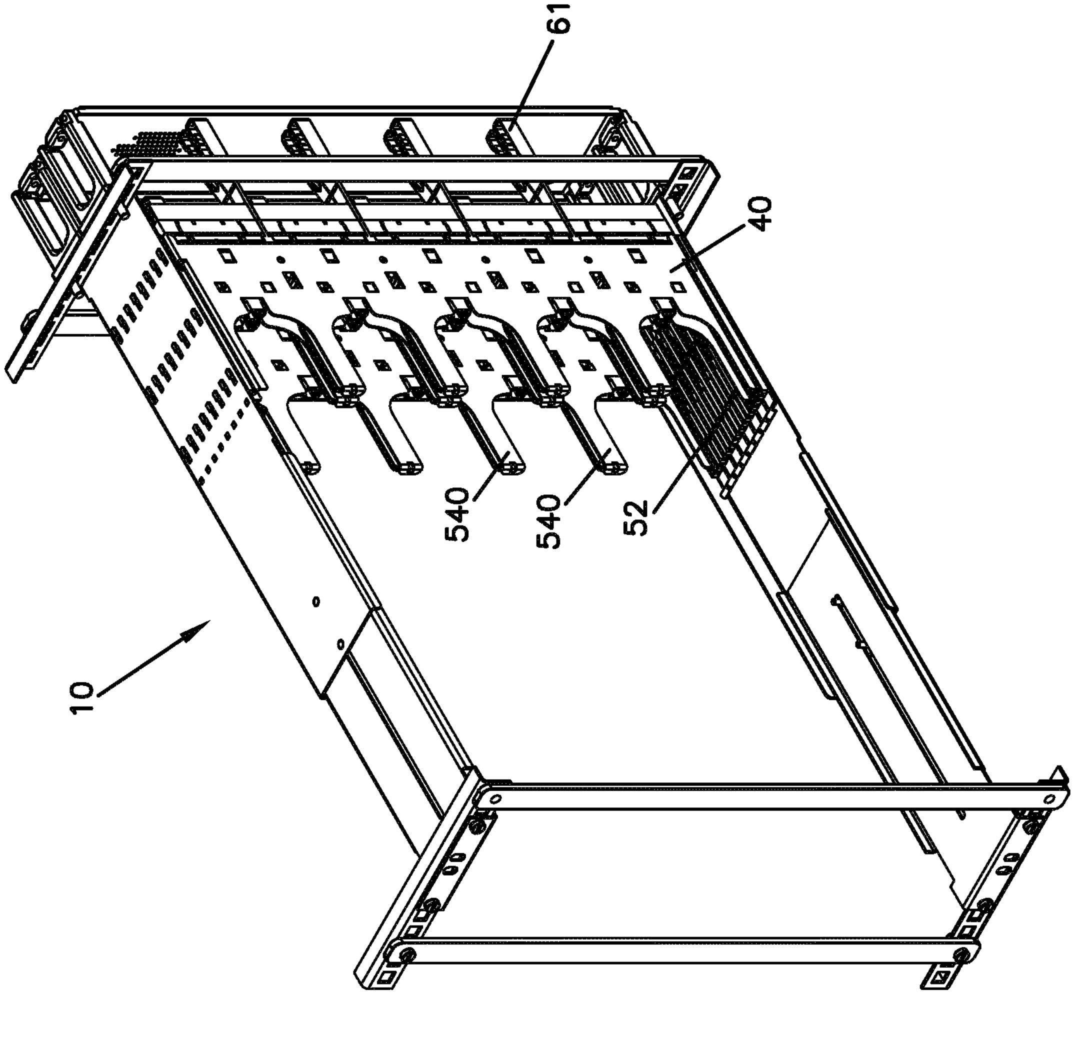
FIG. 10 is a bottom, rear, left side perspective view of the telecommunications system of FIG. 1.
Figure 11:
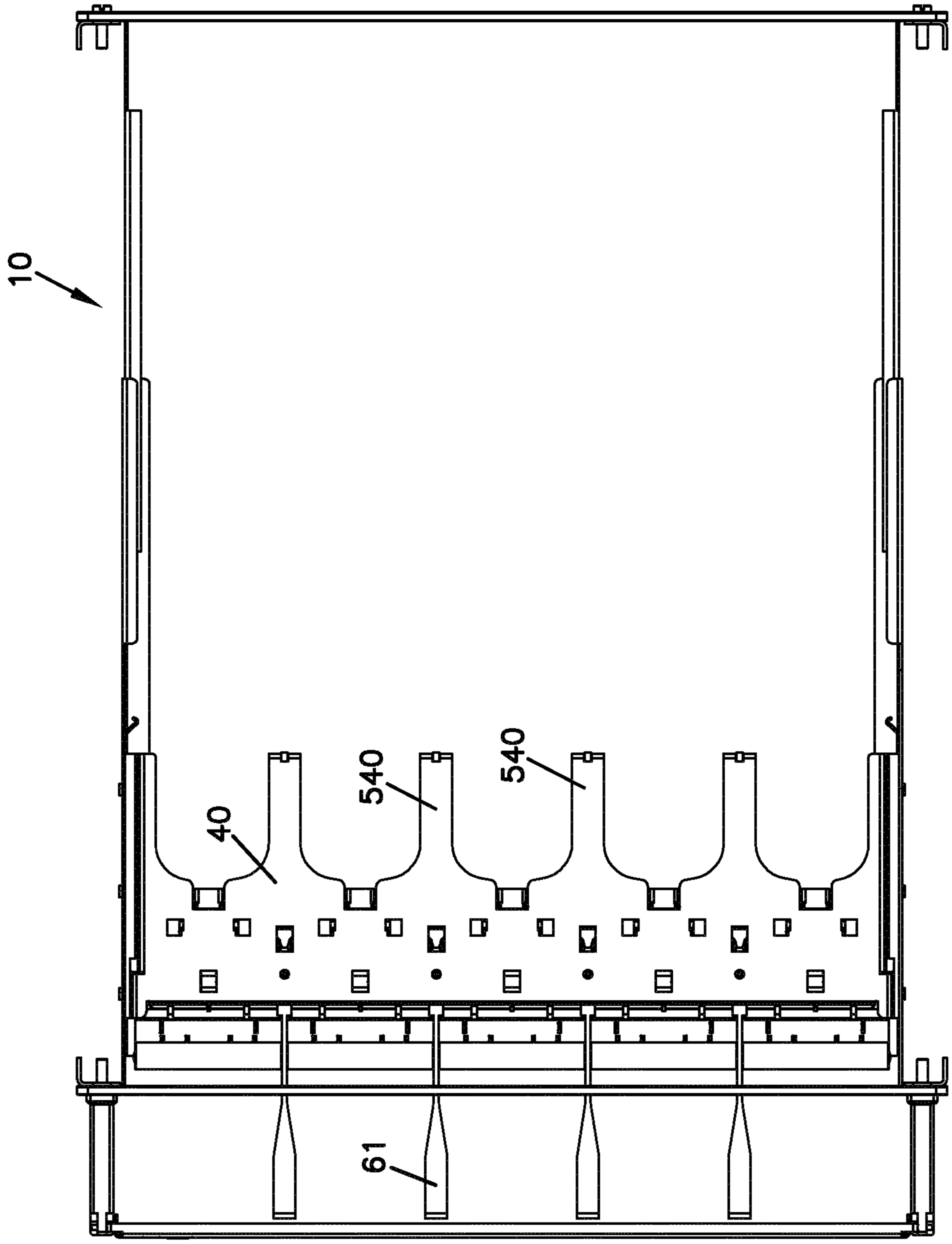
FIG. 11 is a bottom plan view of the telecommunications system of FIG. 1.
Figure 12:
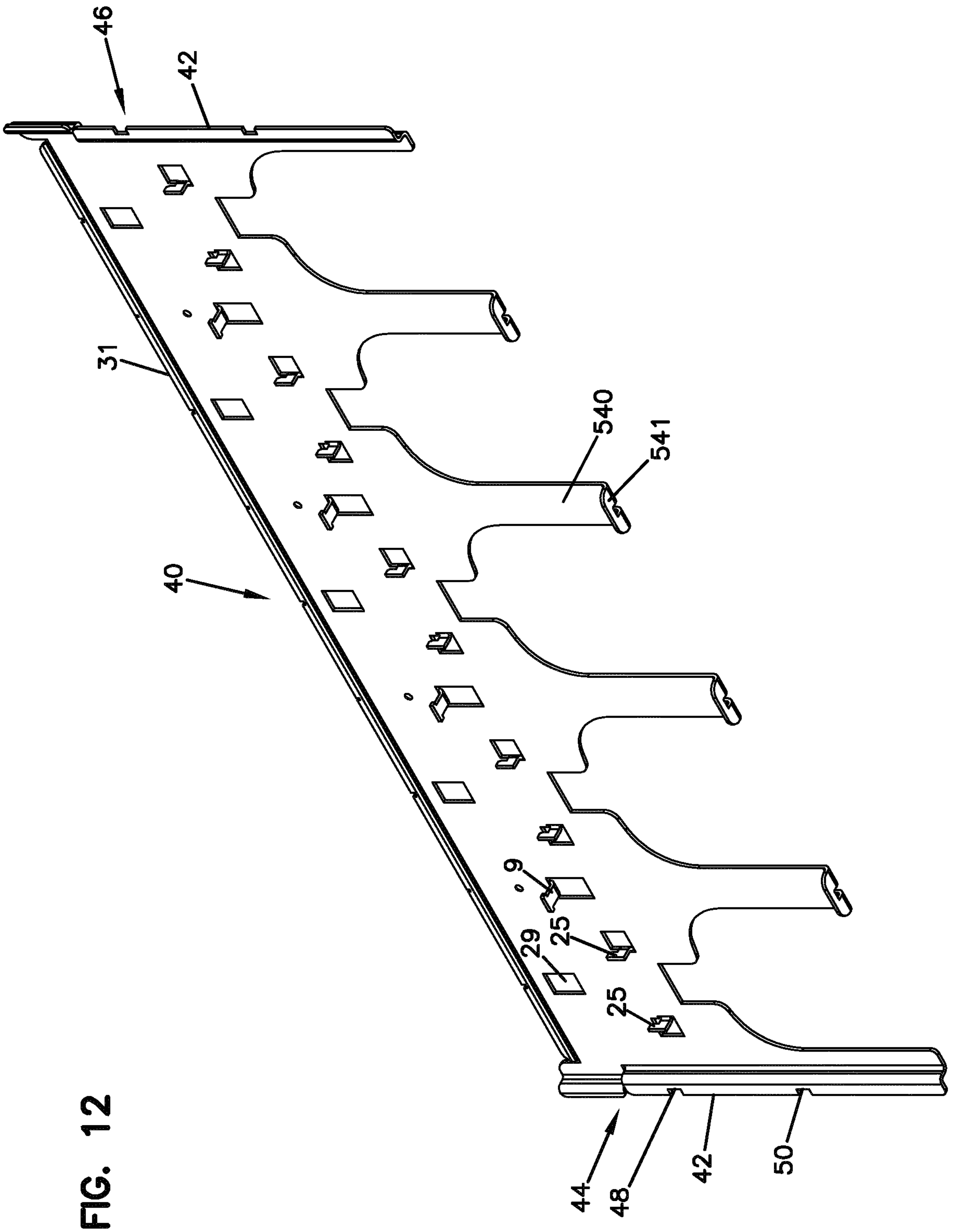
FIG. 12 is a top, rear, left side perspective view of one of the slidable blades that are configured to be mounted on the telecommunications system of FIG. 1.
Figure 13:
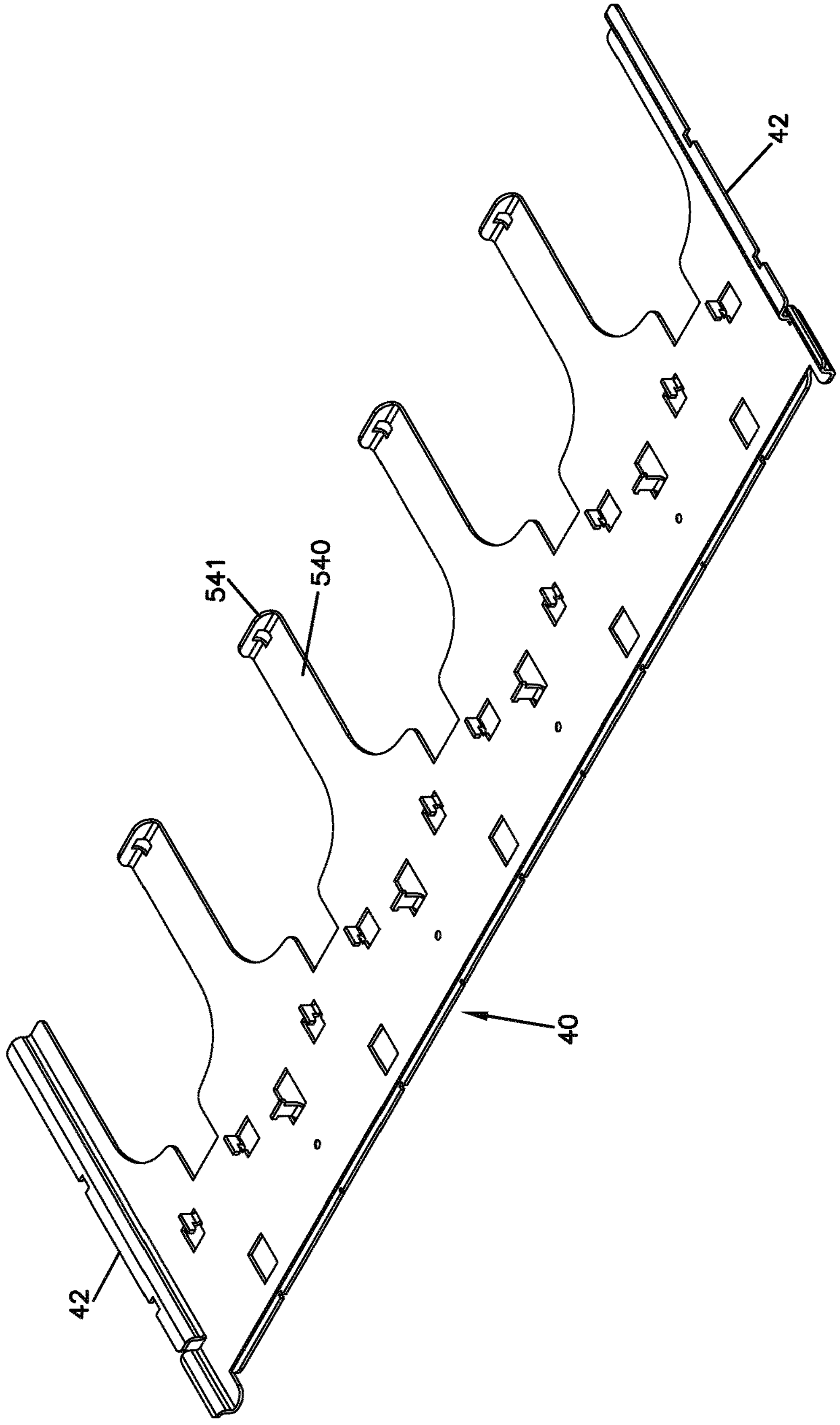
FIG. 13 is a top, front, right side perspective view of the blade of FIG. 12.
Figure 14:
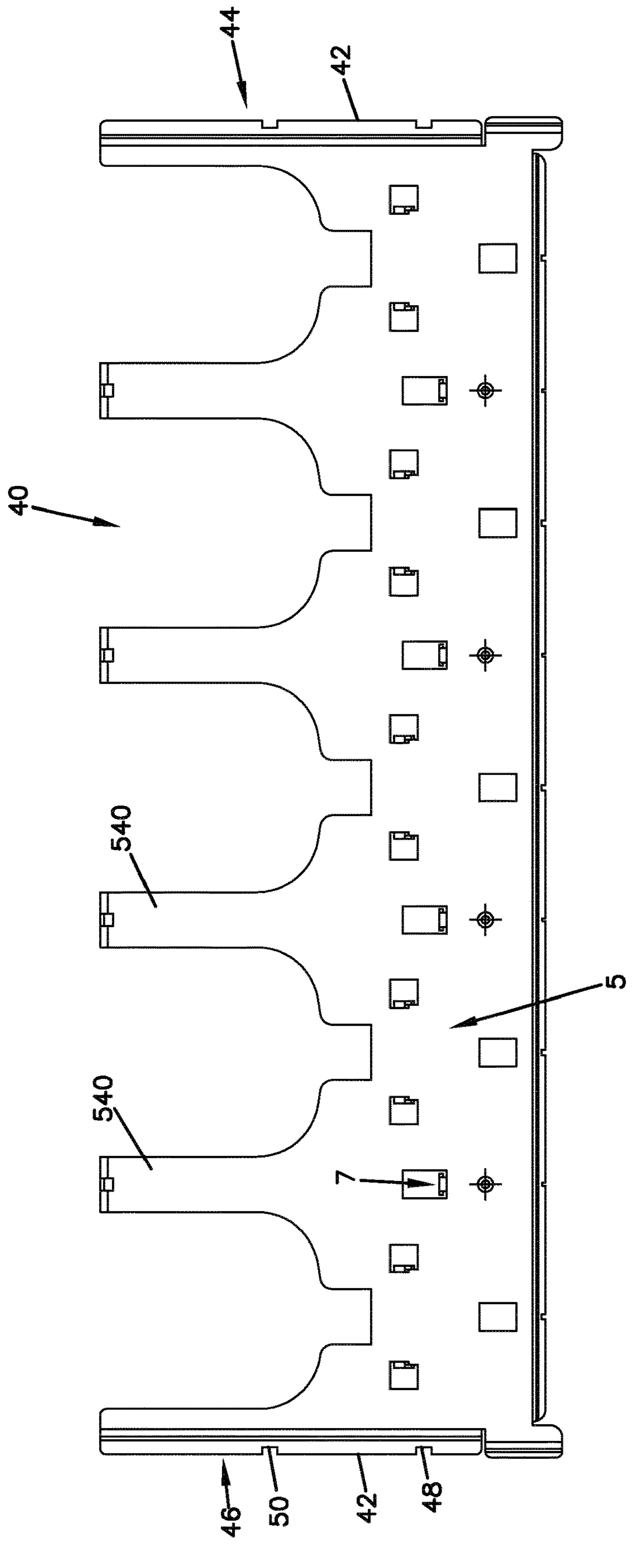
FIG. 14 is a top plan view of the blade of FIG. 12.
Figure 15:
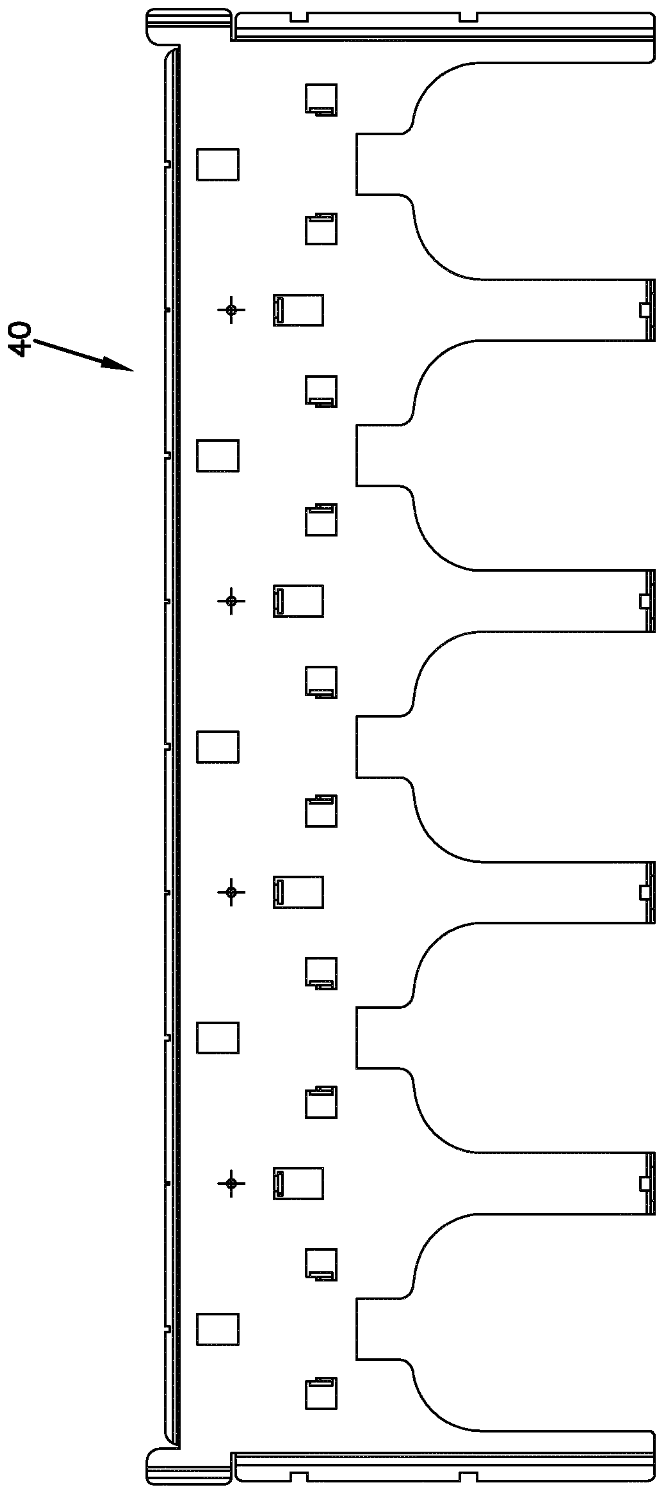
FIG. 15 is a bottom plan view of the blade of FIG. 12.
Figure 16:
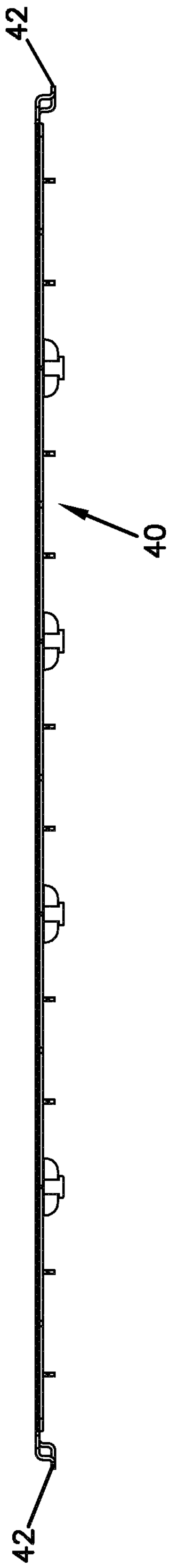
FIG. 16 is a front elevational view of the blade of FIG. 12.
Figure 17:
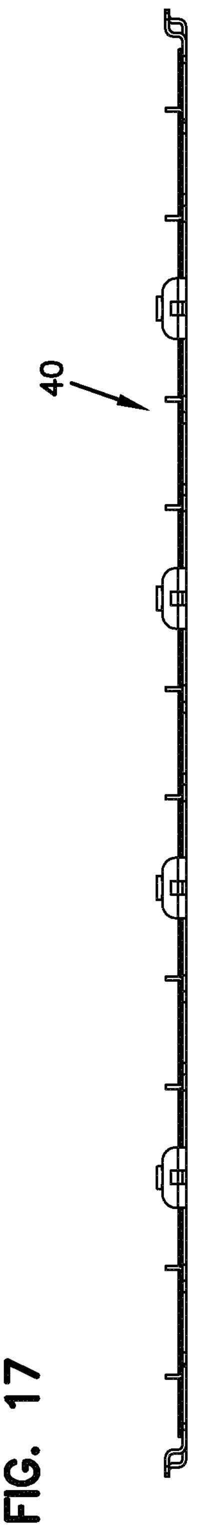
FIG. 17 is a rear elevational view of the blade of FIG. 12.
Figure 18:
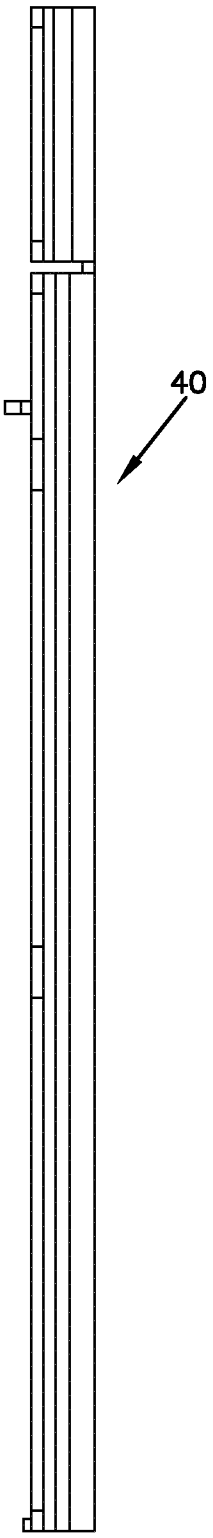
FIG. 18 is a right side view of the blade of FIG. 12.
Figure 19:
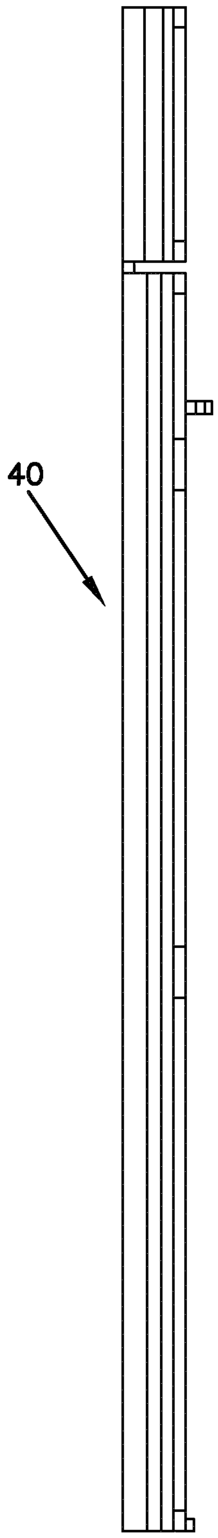
FIG. 19 is a left side view of the blade of FIG. 12.
Figure 48:
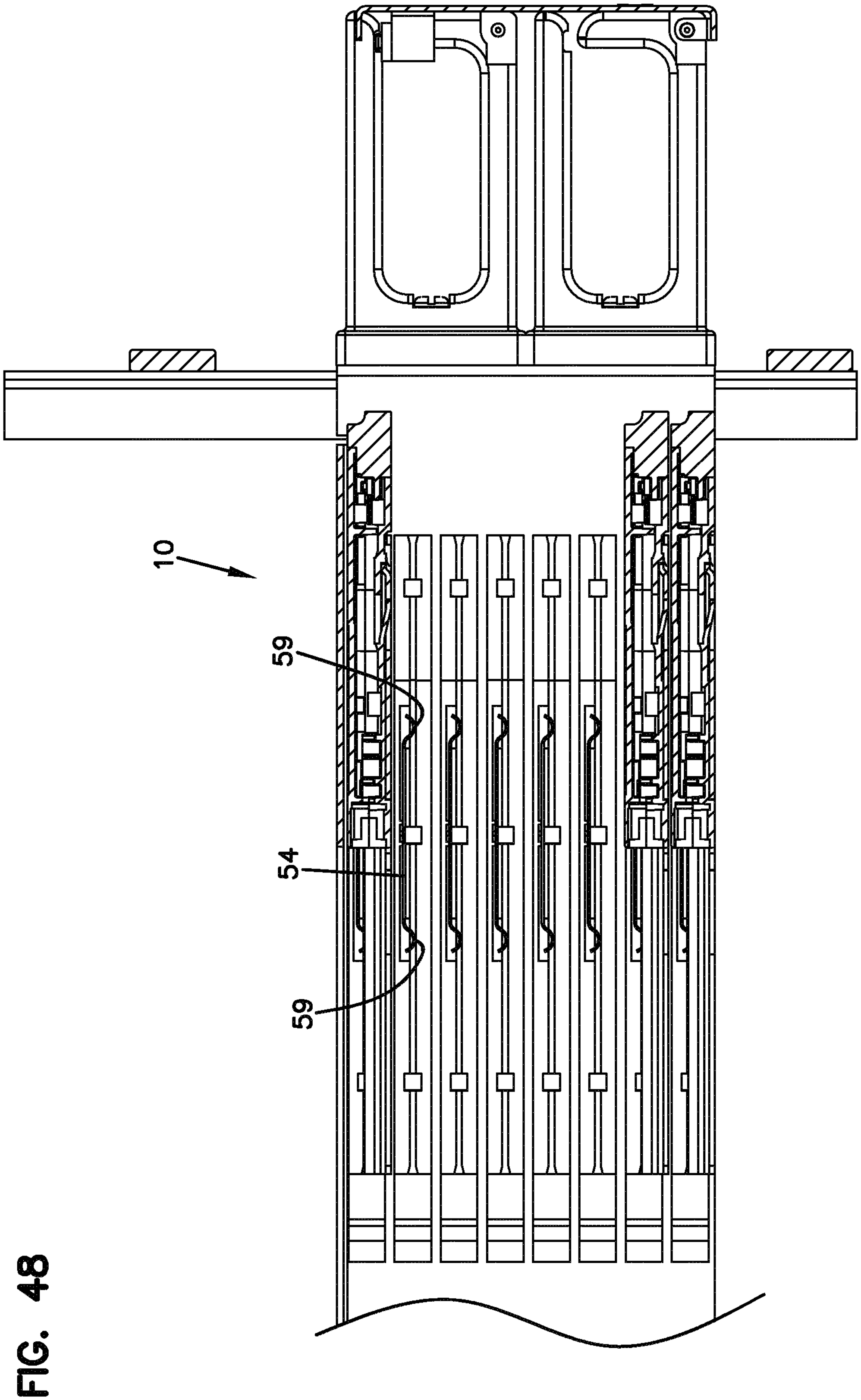
FIG. 48 is a cross-sectional view taken along line 48-48 of FIG. 47.
Figure 49:
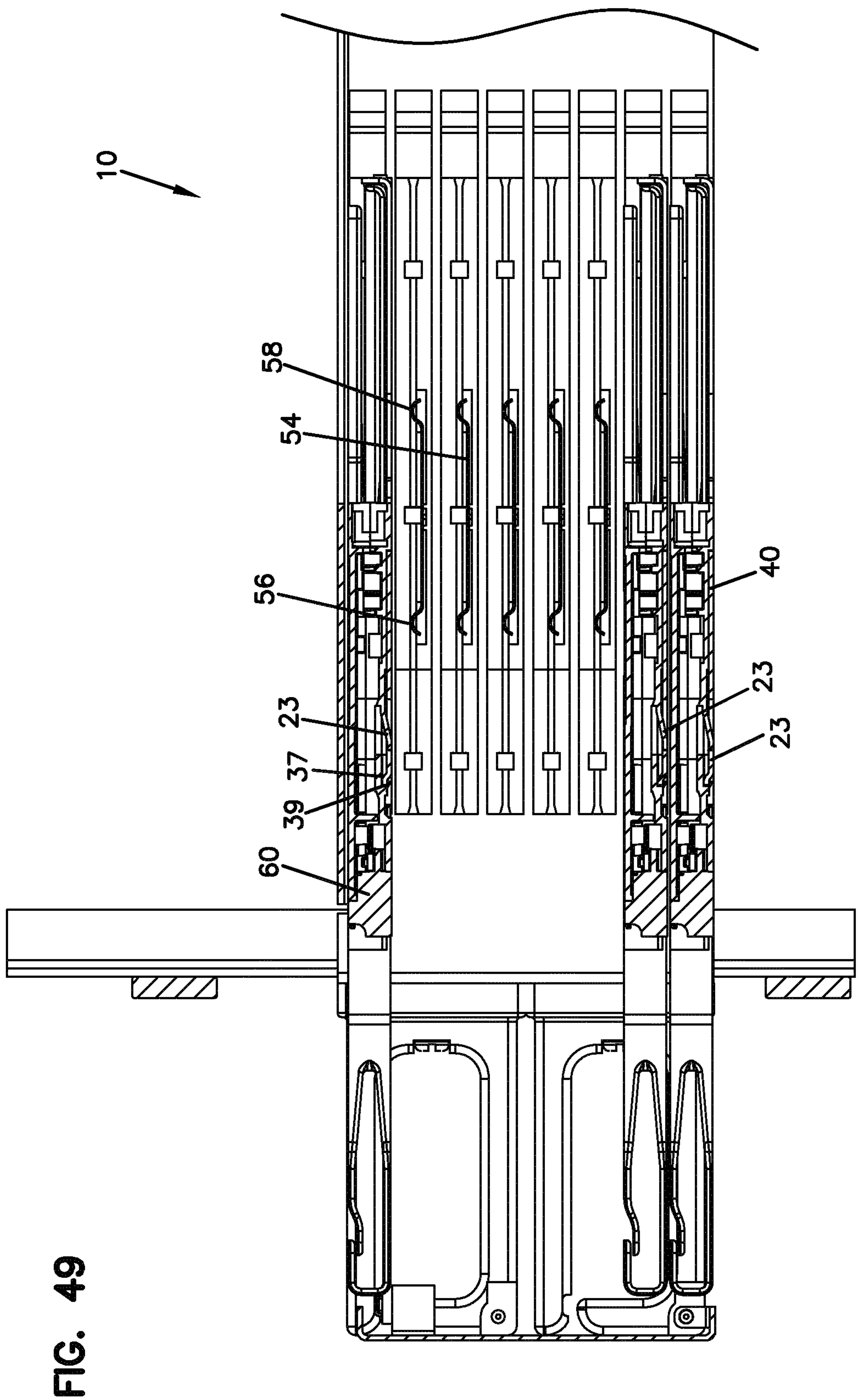
FIG. 49 is a cross-sectional view taken along line 49-49 of FIG. 47.
Figure 50:
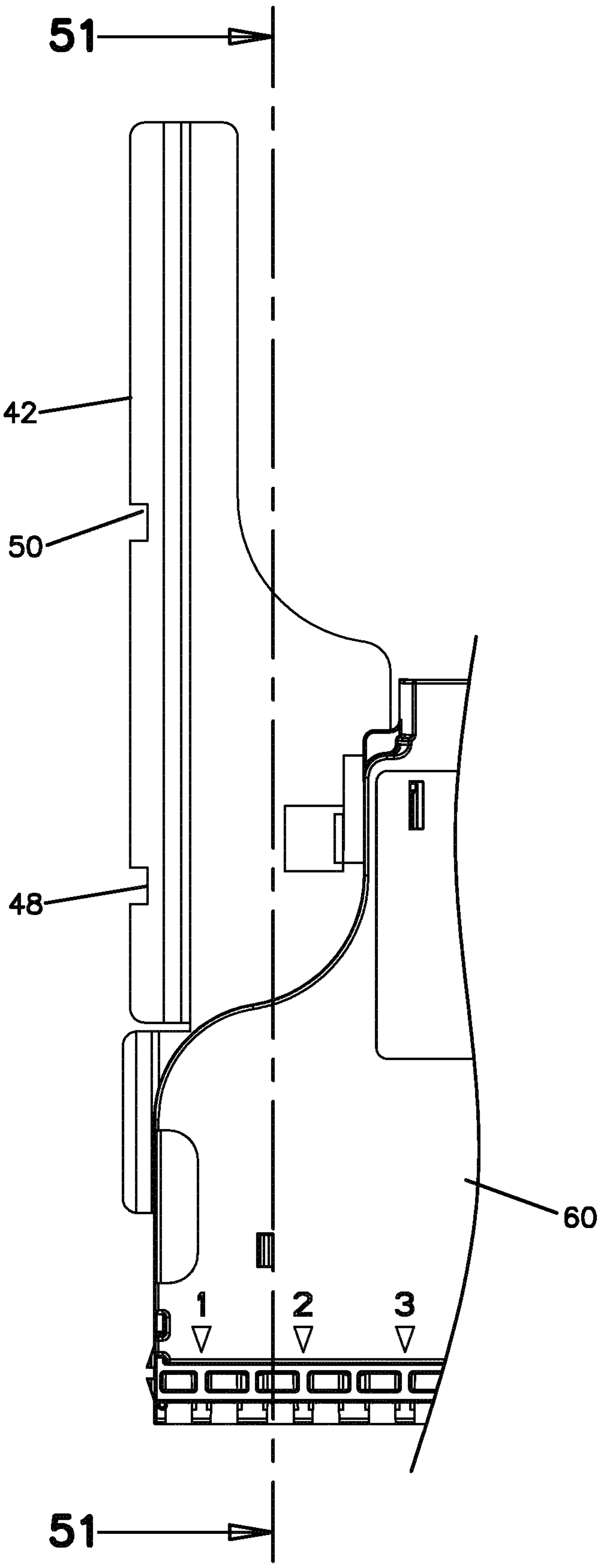
FIG. 50 illustrates a top plan view of a portion of a blade and a fiber optic cassette mounted thereon.

Referring now specifically to FIGS. 3, 4, and 10, at each of the right and left walls 16, 18, the chassis 14 defines mounting slots 52 for receiving the slide portions 42 of the chassis 14. Within each slot 52 at the right wall 16 and the left wall 18, a retainer spring 54 is provided. The retainer spring 54 can be seen in further detail in FIGS. 48 and 49. The retainer springs 54 are configured to provide positive stops for the blades 40 as the blades 40 slide within the chassis 14. The retainer spring 54 defines a front tab 56 and a rear tab 58. When the blade 40 is at a neutral or home position within the chassis 14, the front and rear tabs 56, 58 are positioned within the front and rear notches 48, 50, respectively, of the slide portions 42 of the blade 40. When the blade 40 is slid forwardly, the retainer spring 54 flexes until the front tab 56 of the retainer spring 54 moves into the rear notch 50 of the blade 40 to provide a stop at the forward position of the blade 40. When the blade 40 is slid rearwardly, the retainer spring 54 flexes until the rear tab 58 of the retainer spring 54 moves into the front notch 48 of the blade 40 to provide a stop at the rearward position of the blade 40. The tabs 56, 58 of the retainer spring 54 are configured with a curved profile 59. The curved profile 59 facilitates flexing of the springs 54 when a force strong enough is applied in the forward or rearward direction to move the tabs 56, 58 out of the notches 48, 50.

Figure 20:
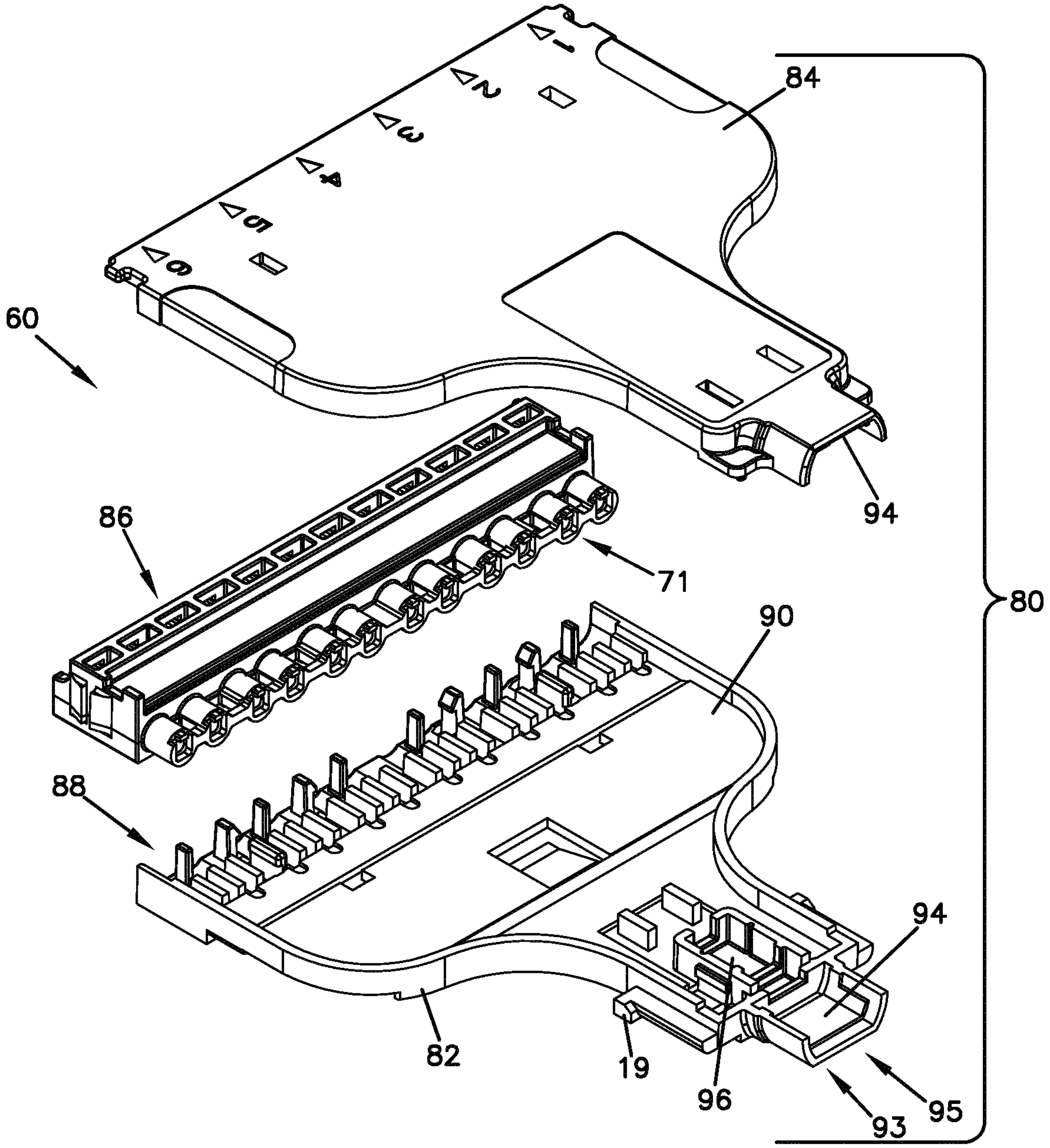
FIG. 20 is an exploded perspective view of one of the fiber optic cassettes that are configured to be mounted on the blades of the chassis of the telecommunications system of FIG. 1.
Figure 21:
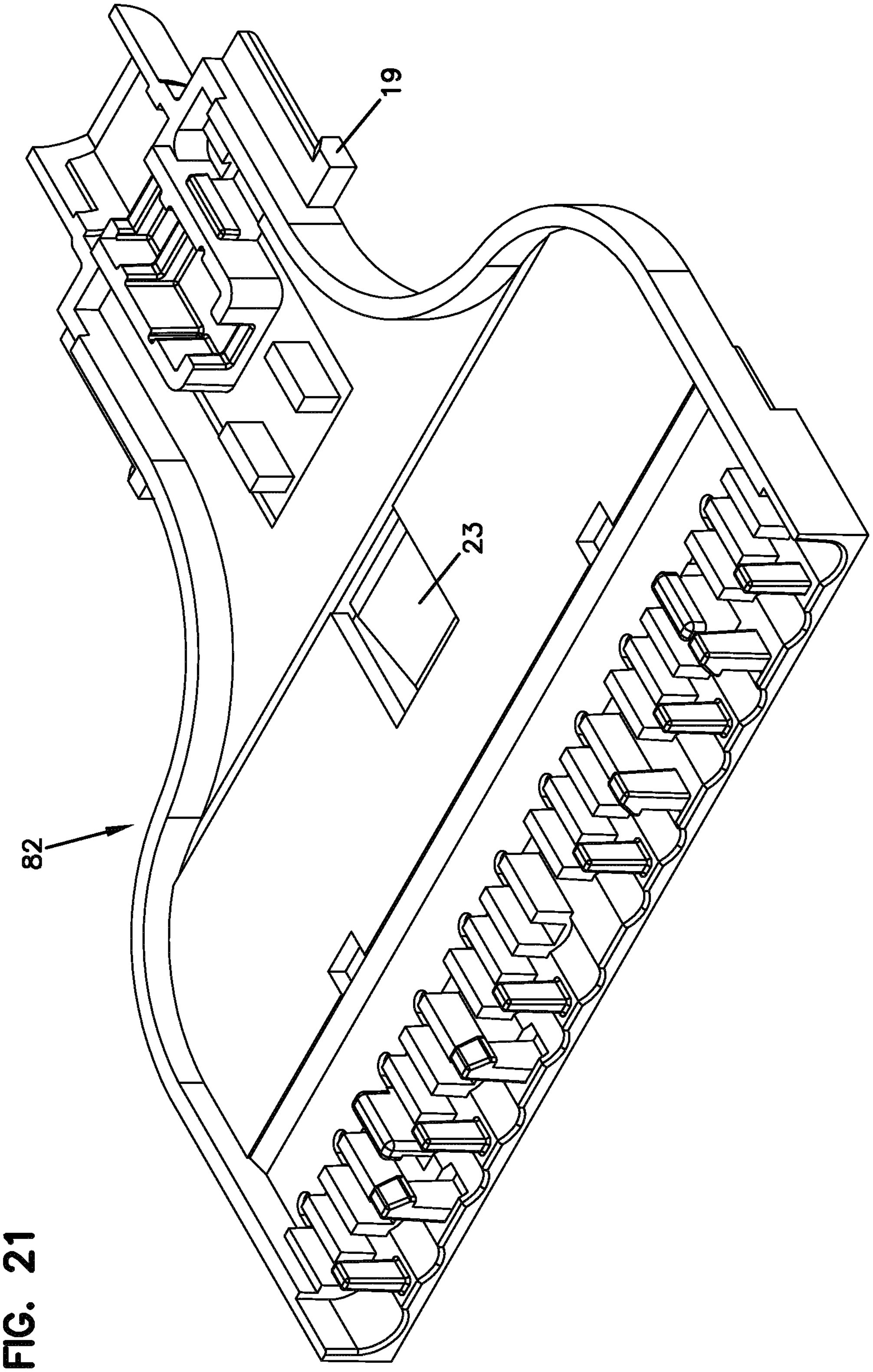
FIG. 21 is a top, front, right side perspective view of a base of the fiber optic cassette of FIG. 20.
Figure 22:
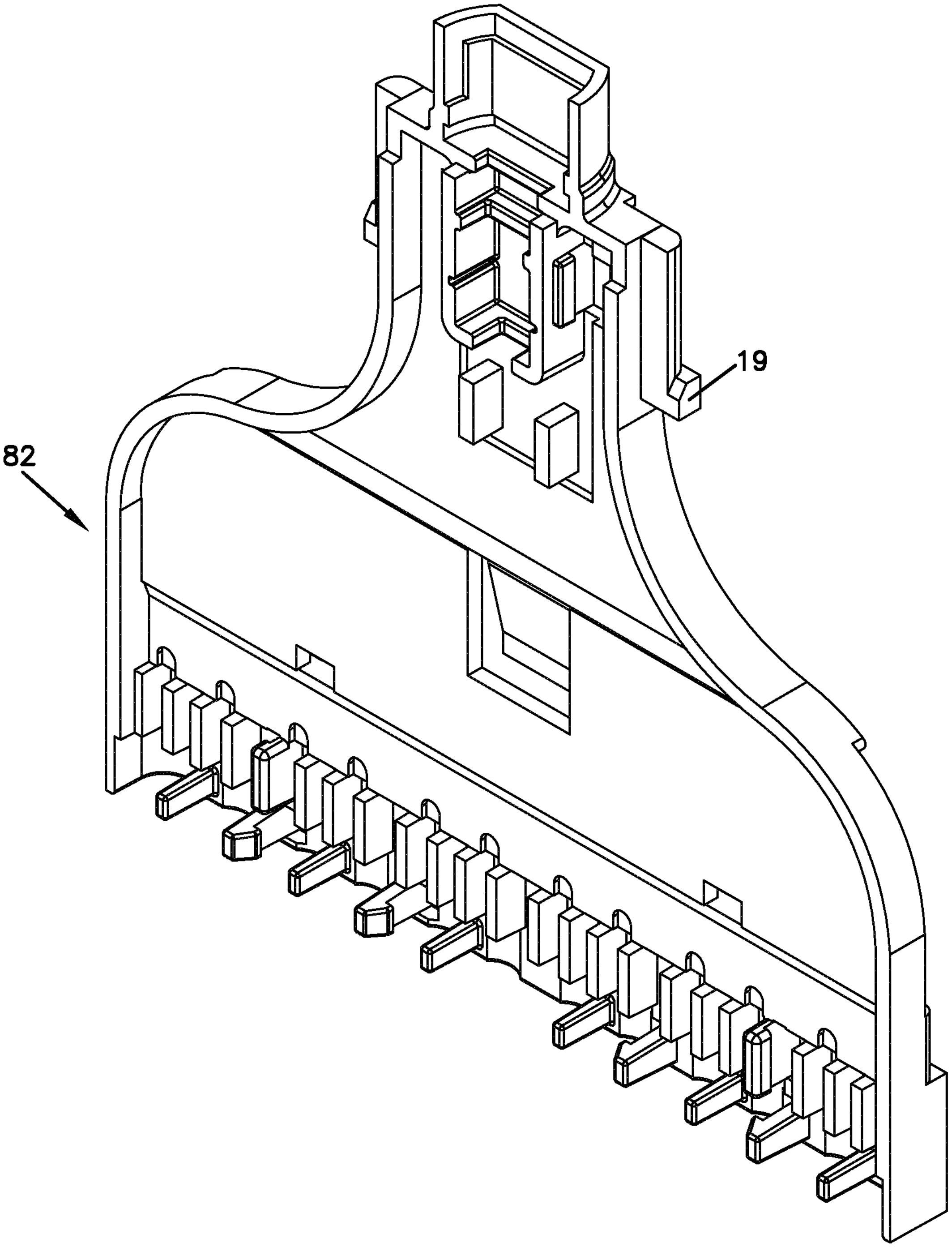
FIG. 22 is a top, rear, right side perspective view of the base of FIG. 21.
Figure 23:
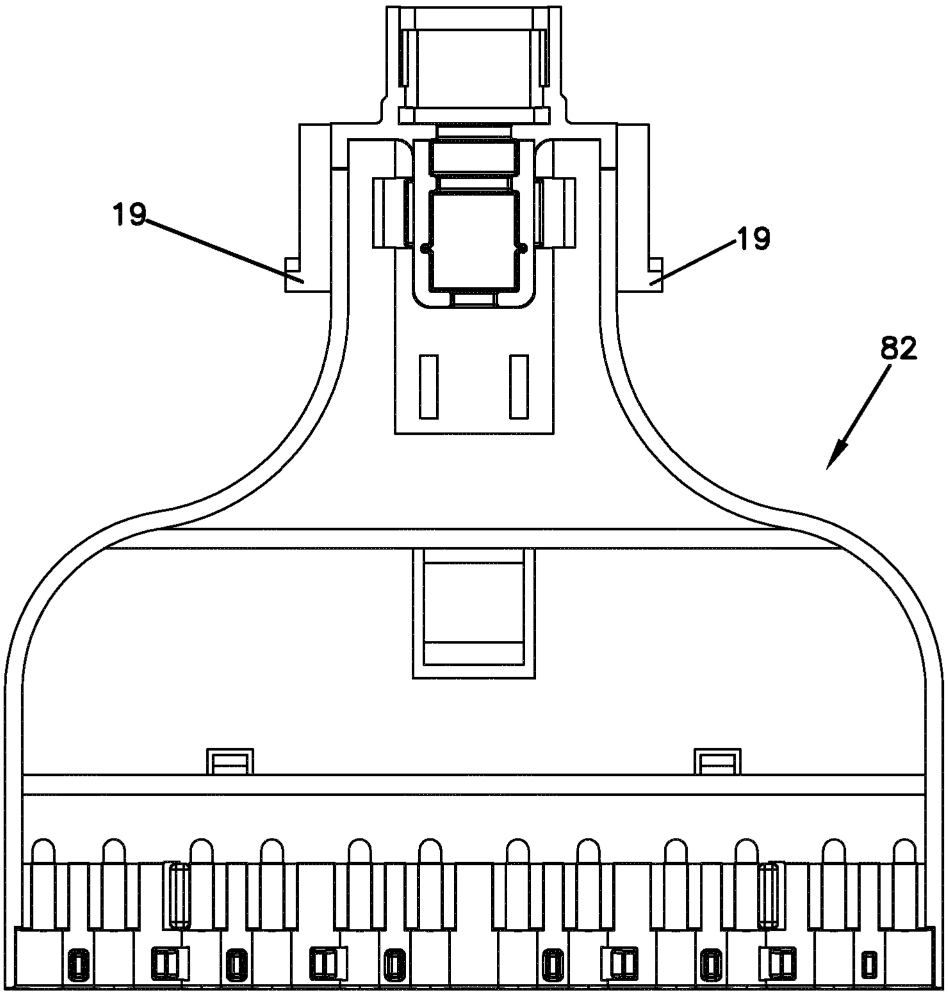
FIG. 23 is a top plan view of the base of FIG. 21.
Figure 24:
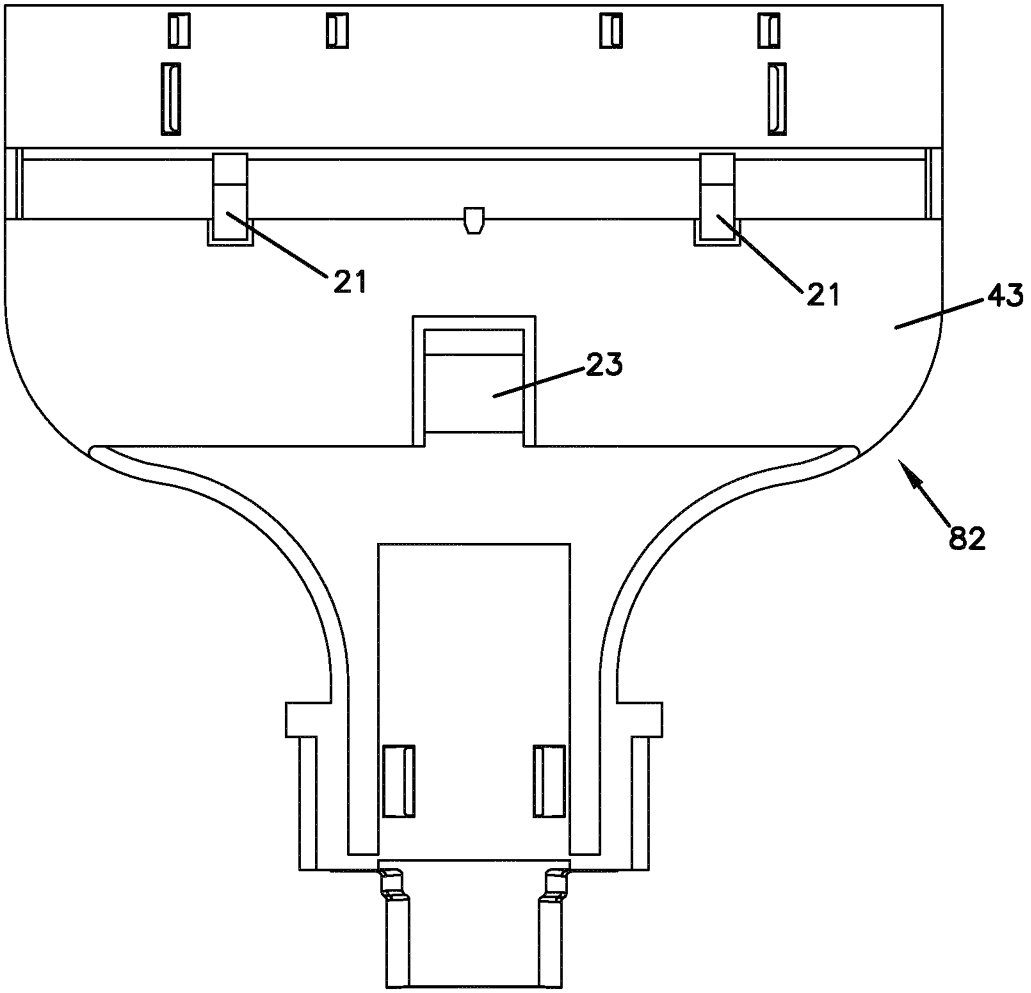
FIG. 24 is a bottom plan view of the base of FIG. 21.
Figure 25:
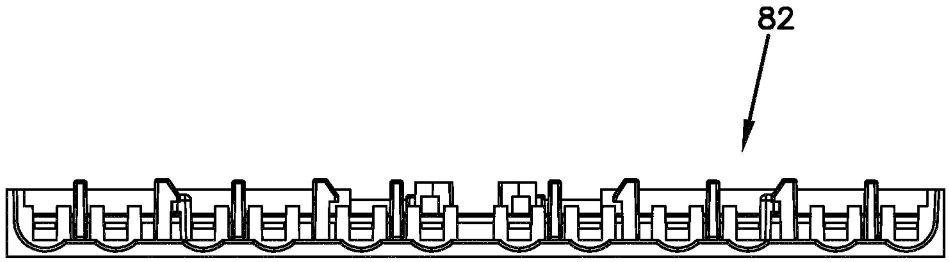
FIG. 25 is a front elevational view of the base of FIG. 21.
Figure 26:
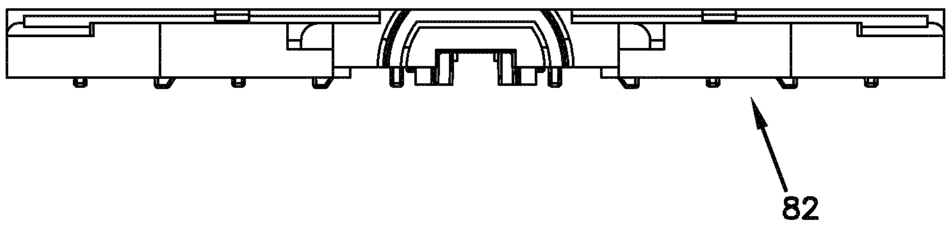
FIG. 26 is a rear elevational view of the base of FIG. 21.
Figure 27:
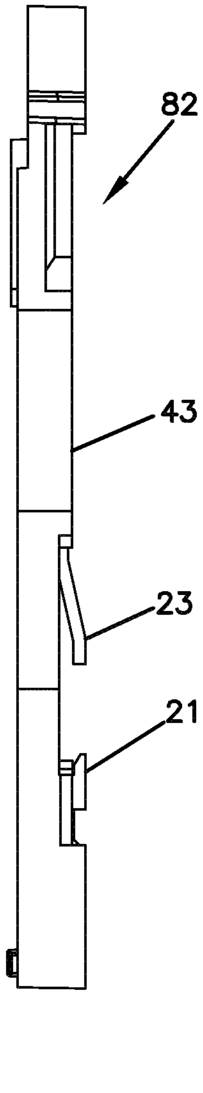
FIG. 27 is a right side view of the base of FIG. 21.
Figure 28:
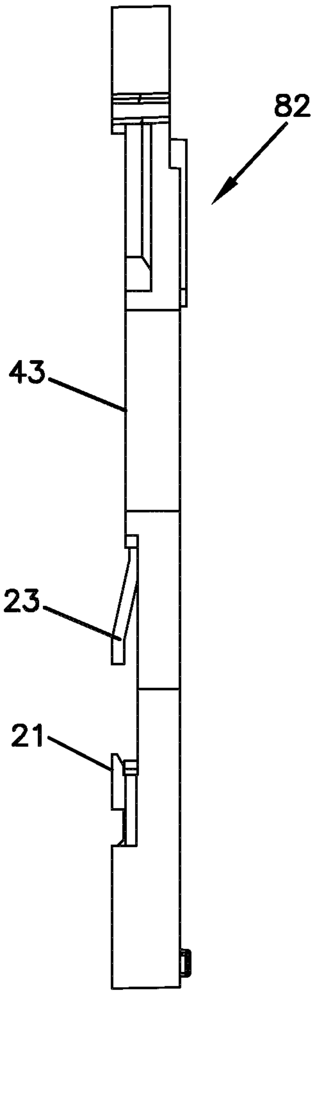
FIG. 28 is a left side view of the base of FIG. 21.
Figure 29:
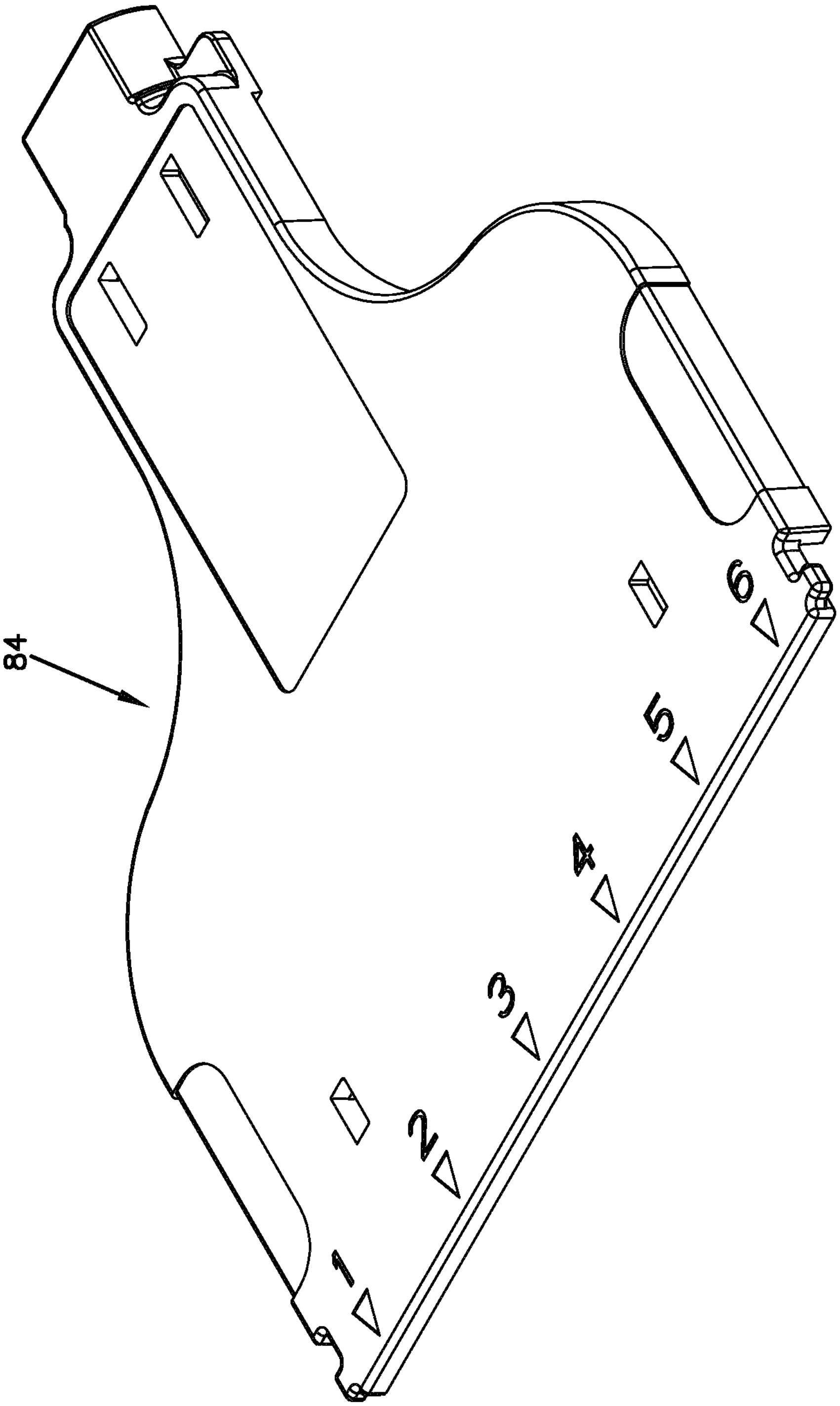
FIG. 29 is a top, front, right side perspective view of a cover of the fiber optic cassette of FIG. 20.
Figure 30:
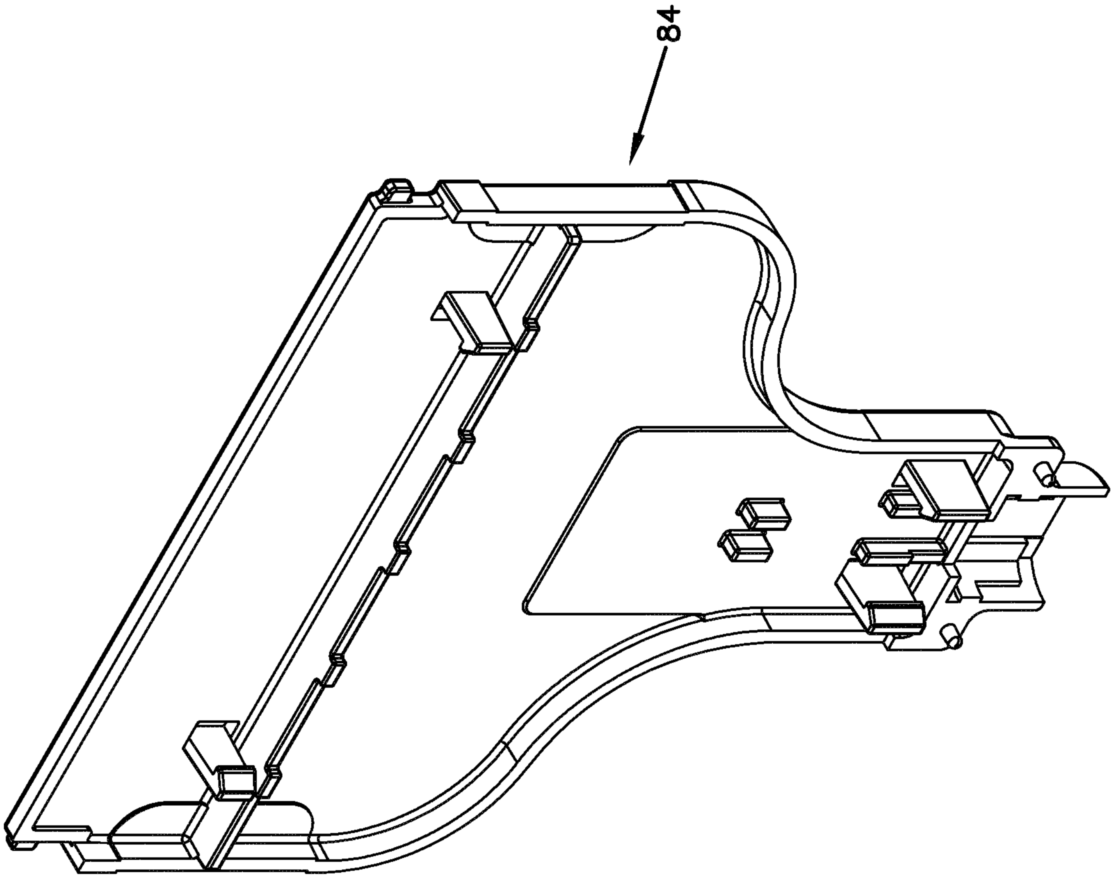
FIG. 30 is a bottom, front, right side perspective view of the cover of FIG. 29.
Figure 31:
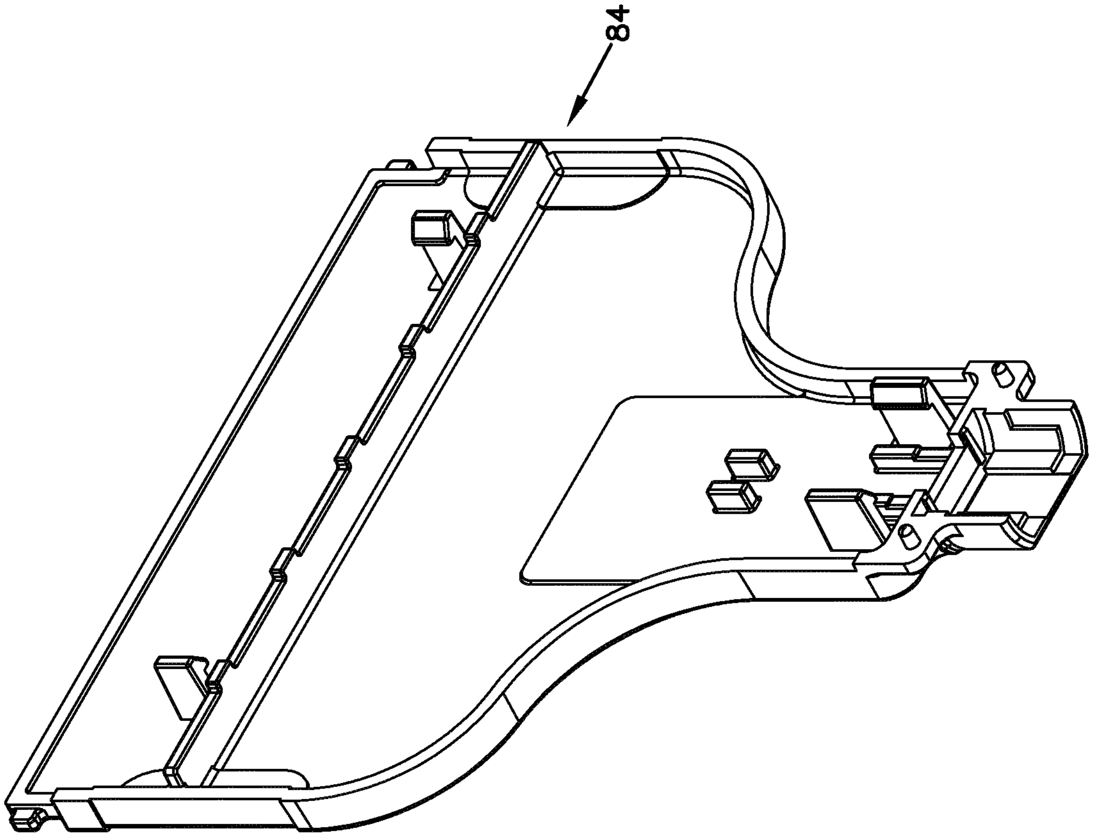
FIG. 31 is a bottom, rear, left side perspective view of the cover of FIG. 29.
Figure 32:
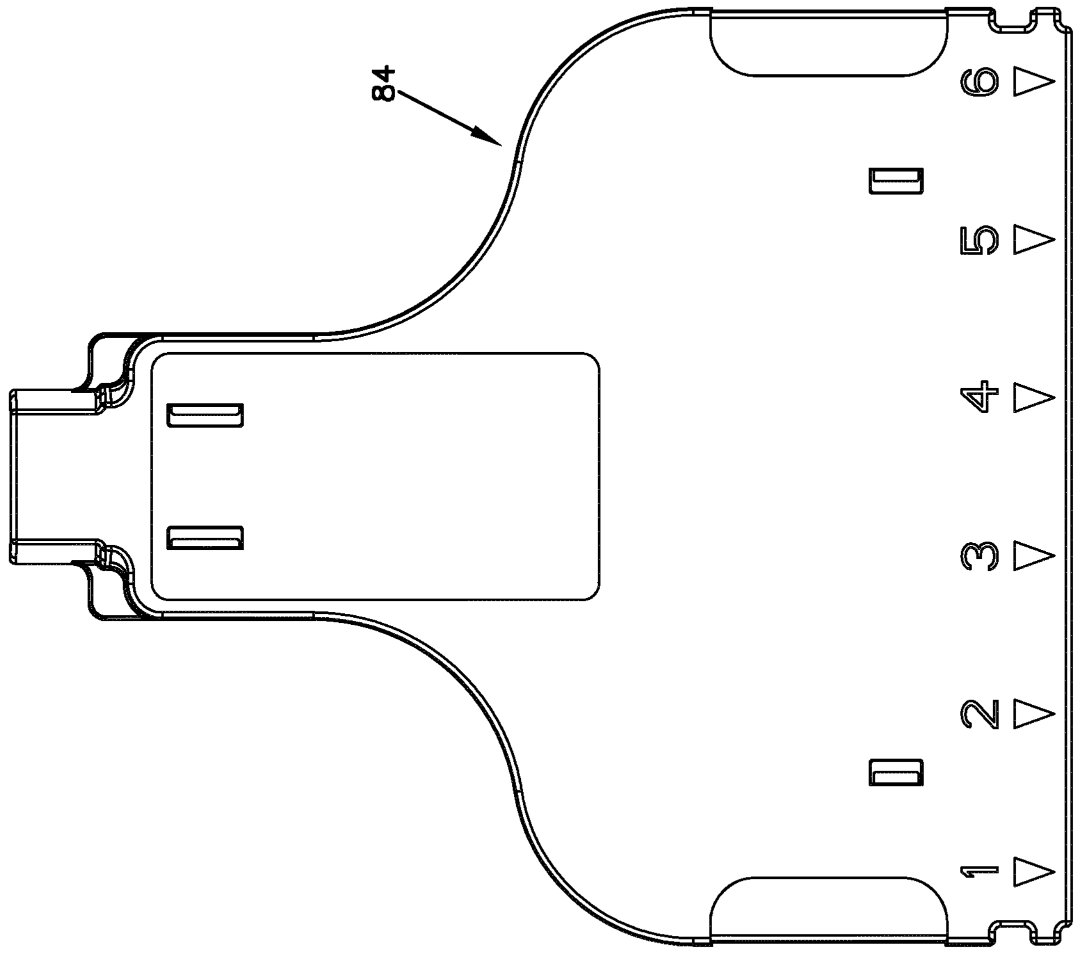
FIG. 32 is a top plan view of the cover of FIG. 29.
Figure 33:
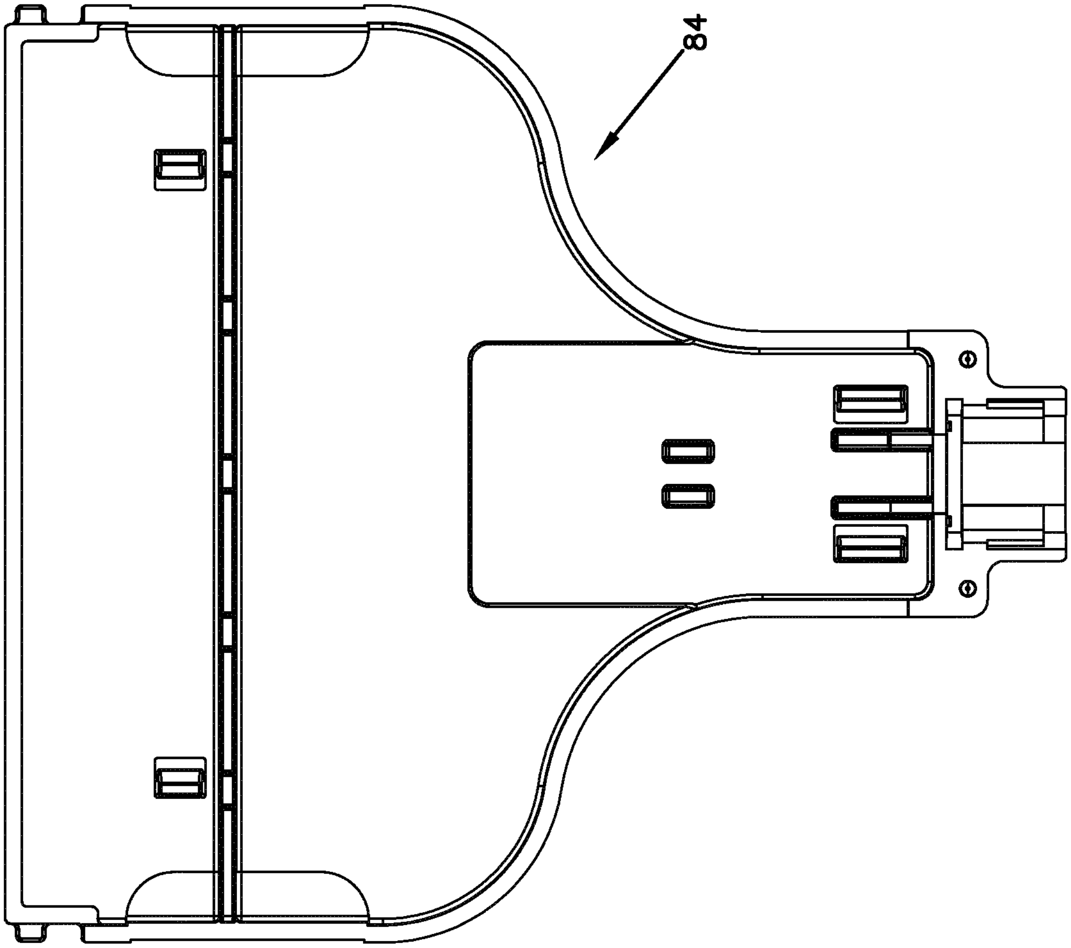
FIG. 33 is a bottom plan view of the cover of FIG. 29.
Figure 34:
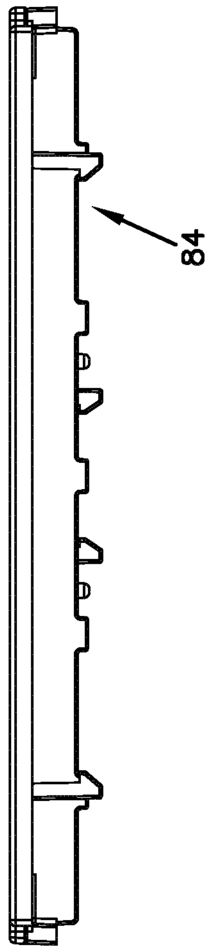
FIG. 34 is a front elevational view of the cover of FIG. 29.
Figure 35:
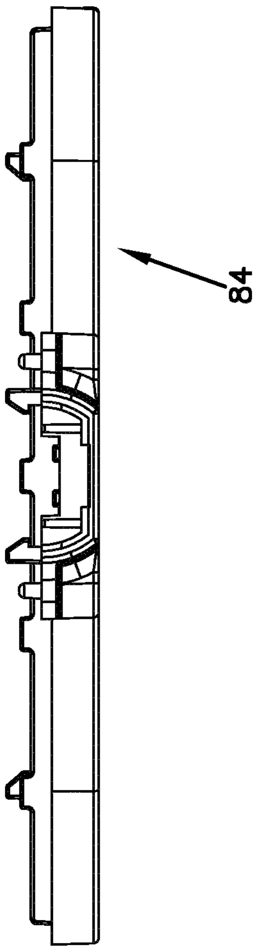
FIG. 35 is a rear elevational view of the cover of FIG. 29.
Figure 36:
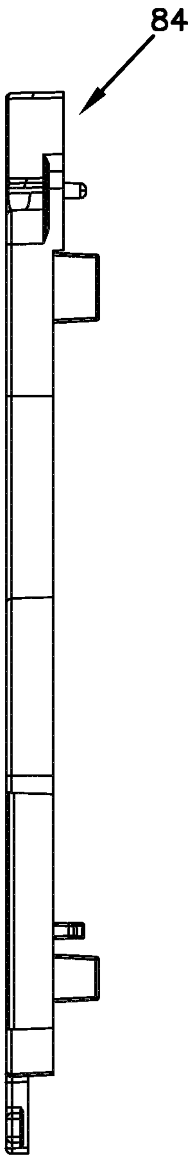
FIG. 36 is a right side view of the cover of FIG. 29.
Figure 37:
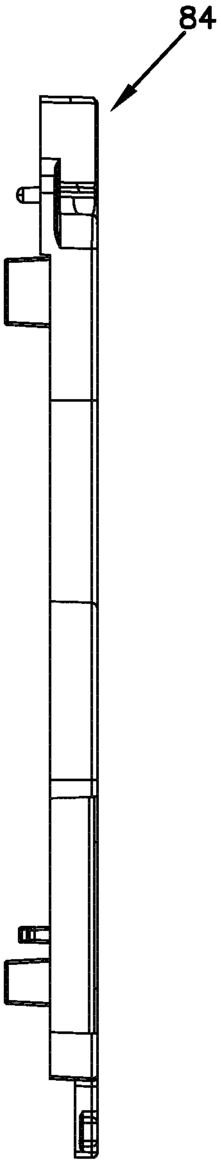
FIG. 37 is a left side view of the cover of FIG. 29.
Figure 38:
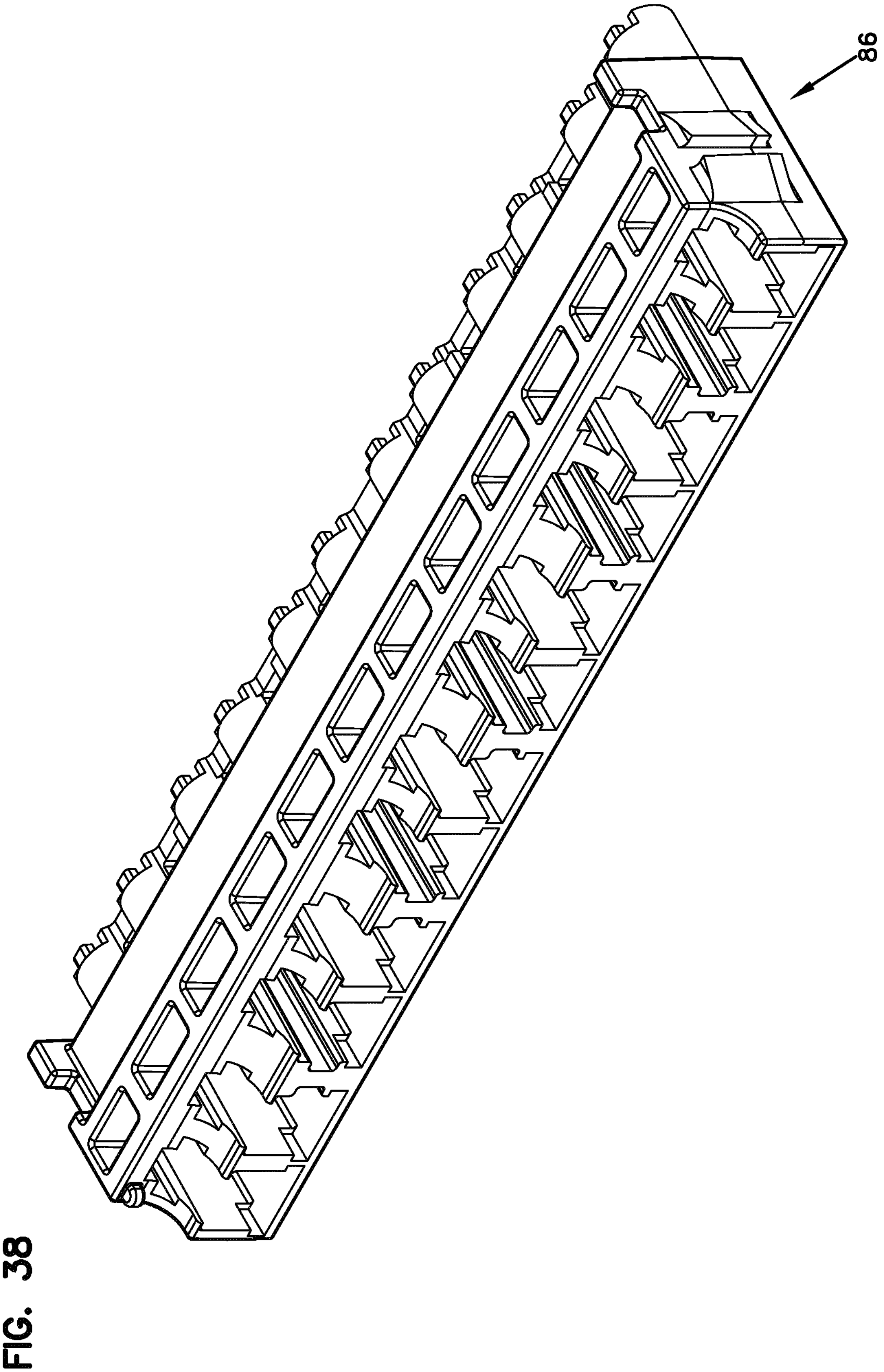
FIG. 38 is a top, front, right side perspective view of an adapter block of the fiber optic cassette of FIG. 20.
Figure 39:
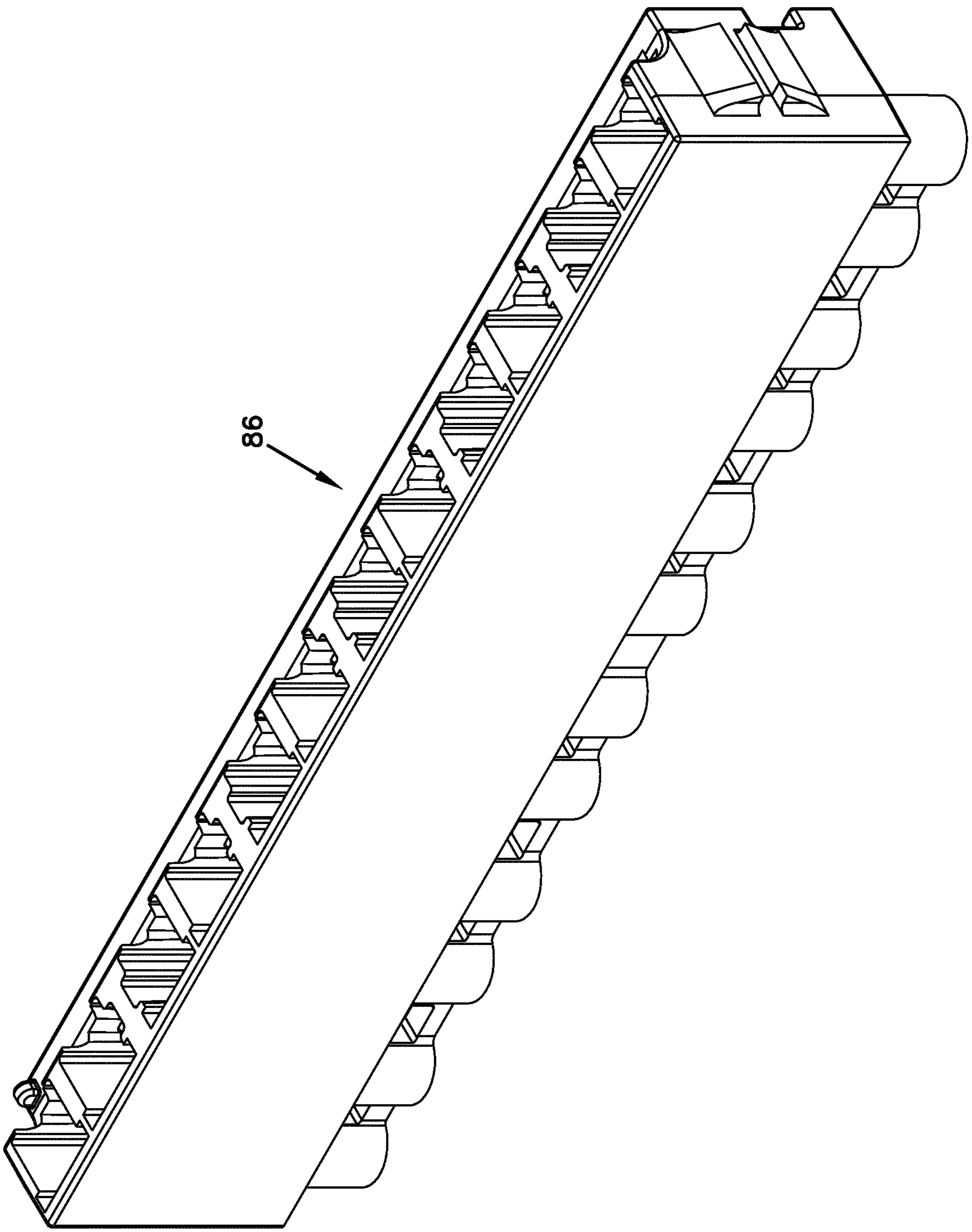
FIG. 39 is a bottom, front, right side perspective view of the adapter block of FIG. 38.
Figure 40:
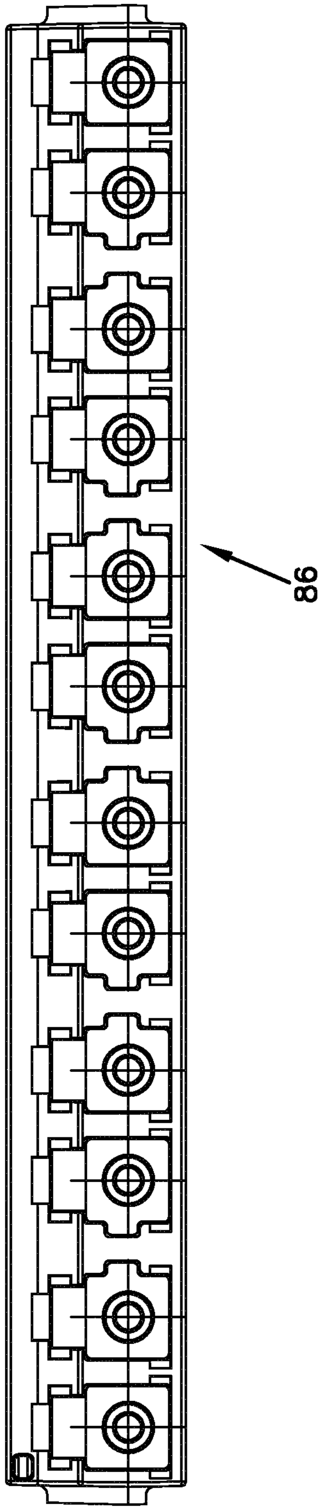
FIG. 40 is a front elevational view of the adapter block of FIG. 38.
Figure 41:
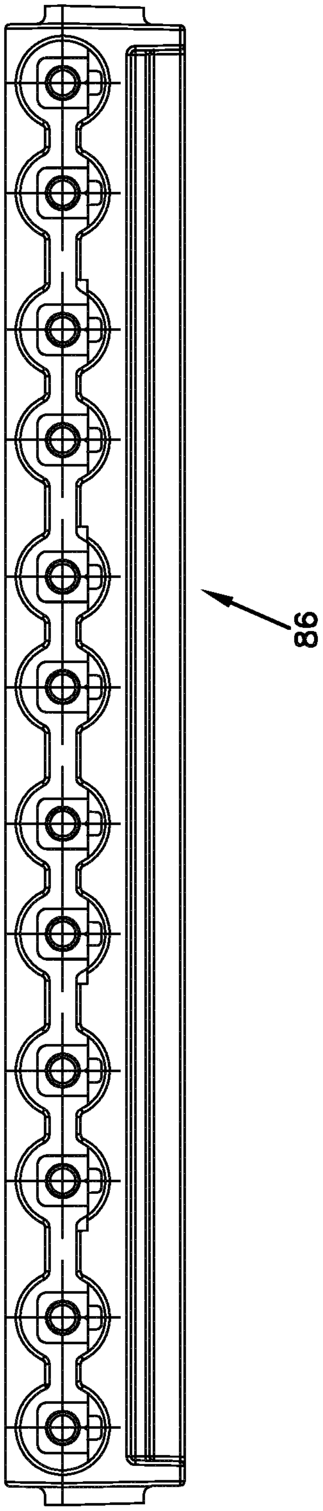
FIG. 41 is a rear elevational view of the adapter block of FIG. 38.
Figure 42:
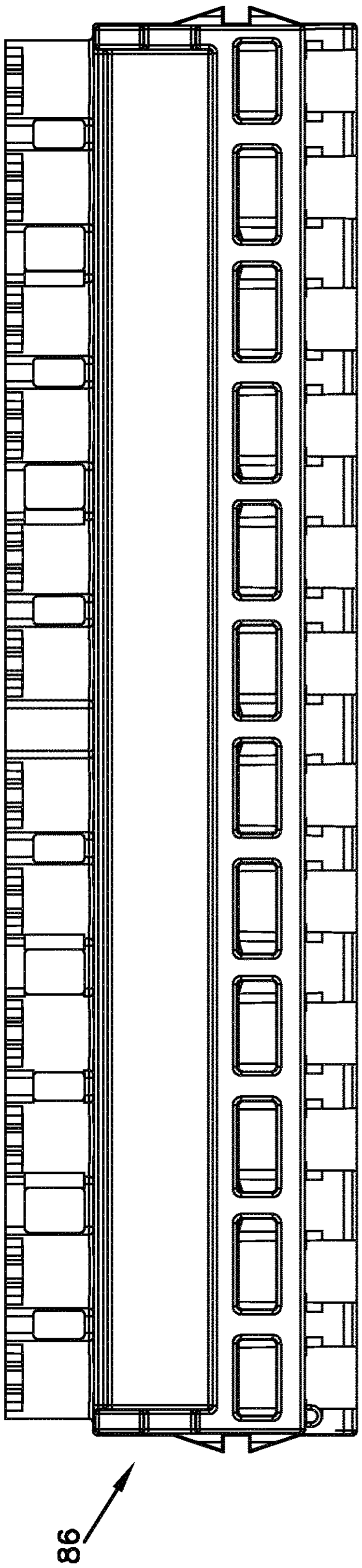
FIG. 42 is a top plan view of the adapter block of FIG. 38.
Figure 43:
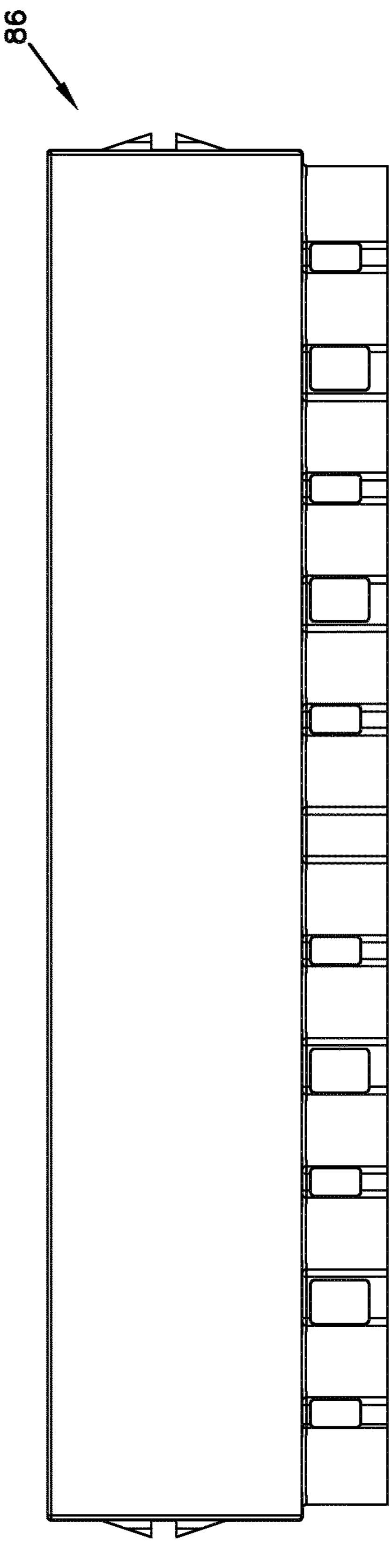
FIG. 43 is a bottom plan view of the adapter block of FIG. 38.
Figure 45:
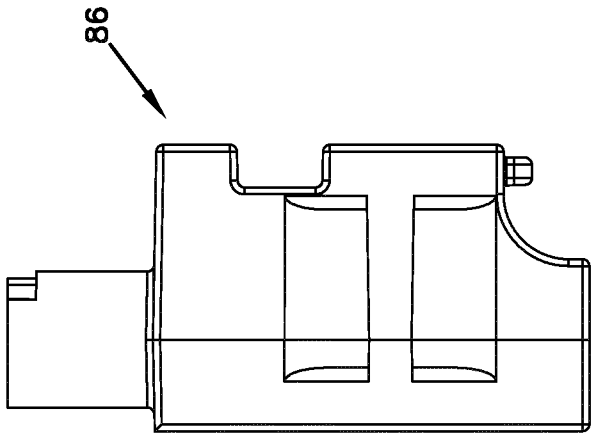
FIG. 45 is a left side view of the adapter block of FIG. 38.
Figure 44:
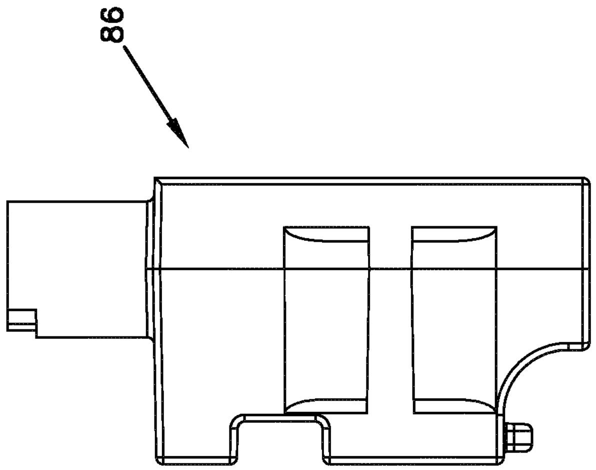
FIG. 44 is a right side view of the adapter block of FIG. 38.

Still referring to FIGS. 1-11, in the depicted telecommunications system 10, the blades 40 of the chassis 14 are shown to include devices in the form of fiber optic cassettes 60 with cable management devices 61 located between each of the cassettes 60. In the depicted embodiment, each blade 40 is configured to hold five fiber optic cassettes 60 along a row within the 19-inch standard rack spacing. One example of a cassette 60 that is configured for mounting on the chassis is shown in FIG. 20 in isolation, further details of which will be described below. The depicted cassette 60 is configured to provide twelve connection locations 62 defined by standard LC format adapters 64 at the front 66 of the cassette 60 as will be discussed in further detail below. With five cassettes 60 located on each blade 40 and with eight blades 40 located on each chassis 14, the chassis 14 can accommodate 480 standard LC format connections within a 2 RU rack spacing. A similar 1 RU chassis can, thus, accommodate 240 standard LC format connections within that 1 RU spacing.

The cable managers 61 located between each fiber optic cassette 60 help preserve the high density provided by the system 10. As depicted, each cable manager 61 defines wider portions 68 at the front 70 and rear ends 72 thereof that transition to a middle section 74 having a thinner profile 76. The wider portions 68 define split-ring configurations 78 for receiving and retaining cables extending to and from the cassettes 60. The split-ring configurations 78 at the rear ends 72 thereof are formed at least partially by the upwardly extending portions 541 of the rear extensions 540 of the blades 40. The thinner profile sections 74 are positioned between the cassettes 60 when the cable managers 61 are mounted to the blades 40 to preserve the overall density within the 19-inch rack 12.

Now referring to FIGS. 20-45, the parts that make up the housing 80 of a cassette 60 are shown. The cassette housing 80 is defined by a base 82 (shown in FIGS. 21-28), a cover 84 (shown in FIGS. 29-37), and an adapter block 86 (shown in FIGS. 38-45) configured for mounting to a front end 88 of the base 82 and captured thereagainst by the cover 84.

Within an interior 90 defined by the cassette housing 80, the cassette 60 is configured to utilize a flexible optical circuit for transition of fibers between a multi-fibered connector positioned at one end of the cassette 60 and individual connectors positioned at the opposite end of the cassette 60. Even though not illustrated specifically in the cassette 60 shown in FIGS. 20-45, such a flexible optical circuit 192 is shown in a similar version of the cassette 160 illustrated in FIGS. 55-56.

Flexible optical circuits 192 are passive optical components that comprise one or more (typically, multiple) optical fibers embedded on a flexible substrate, such as a Mylar™ material or other flexible polymer substrate. Commonly, although not necessarily, one end-face of each fiber is disposed adjacent one longitudinal end of the flexible optical circuit substrate and the other end face of each fiber is disposed adjacent the opposite longitudinal end of the flexible optical circuit substrate. The fibers extend past the longitudinal ends of the flexible optical circuit (commonly referred to as pigtails) so that they can be terminated to optical connectors, which can be coupled to fiber optic cables or other fiber optic components through mating optical connectors.

Flexible optical circuits 192 essentially comprise one or more fibers sandwiched between two flexible sheets of material, such as Mylar™ material or another polymer. An epoxy may be included between the two sheets in order to adhere them together. Alternately, depending on the sheet material and other factors, the two sheets may be heated above their melting point to heat-weld them together with the fibers embedded between the two sheets.

The use of flexible optical circuits 192 within the fiber optic cassettes 60, 160 of the present disclosure provides a number of advantages. For example, the substrate of a flexible optical circuit 192 is mechanically flexible, being able to accommodate tolerance variations in different cassettes, such as between connector ferrules and the housings that form the cassettes. The flexibility of the optical circuits 192 also allow for axial movement in the fibers to account for ferrule interface variation. Also, by providing a supportive (rigid in certain embodiments) substrate within which the fibers are positionally fixed, use of flexible optical circuits allows a designer to optimize the fiber bend radius limits and requirements in configuring the cassettes, thus, achieving reduced dimensions of the cassettes. The bend radius of the fibers can thus be controlled to a minimum diameter. By utilizing optical fibers such as bend insensitive fibers (e.g., 8 mm bend radius) in combination with a flexible substrate that fixes the fibers in a given orientation, allowing for controlled bending, small form cassettes may be produced in a predictable and automated manner. Manual handling and positioning of the fibers within the cassettes may be reduced and eliminated through the use of flexible optical circuits.

According to one example embodiment, in the fiber optic cassette, the flexible optical circuit 192 is configured to transition optical fibers between an MPO type multi-fiber connector at the rear of the cassette housing and a plurality of non-conventional connectors at the opposite front end of the cassette housing, wherein portions of a substrate of the flexible optical circuit are physically inserted into the non-conventional connectors.

It should be noted that the term "non-conventional connector" may refer to a fiber optic connector that is not of a conventional type such as an LC or SC connector and one that has generally not become a recognizable standard footprint for fiber optic connectivity in the industry.

The elimination of conventional mating connectors inside the cassette may significantly reduce the overall cost by eliminating the skilled labor normally associated with terminating an optical fiber to a connector, including polishing the end face of the fiber and epoxying the fiber into the connector. It further allows the fiber optic interconnect device such as the optical cassette to be made very thin.

As noted above, for the cassette 60 shown in FIGS. 20-45, a signal entry location 93 may be provided by an MPO style adapter 94, which in the illustrated embodiment may be positioned at the rear 95 of the cassette housing 80. A pocket 96 is configured to seat an MPO style connector 97, and the pocket 96 forms a portion of an MPO style adapter 94 that can mate an incoming conventional MPO connector to the MPO style connector 97 found within the cassette 60. Fiber pigtails extending out from a rear end of the substrate forming the flexible optical circuit are ribbonized for termination to an MT ferrule of the MPO style connector.

The adapter block 86 at the front end 88 of the cassette housing is configured to mate non-conventional connectors positioned at a rear end 71 of the block 86 to conventional connectors (e.g., LC format) coming in from the front of the cassette 60. As shown in the similar cassette 160 of FIGS. 55-56, the non-conventional connectors 101 that are positioned adjacent the front 188 of the cassette 160 each defines a hub 102 mounted over the ferrule 103. A split sleeve 104 is also provided for ferrule alignment between the hub 102 and ferrule 103 of each non-conventional connector 101 and a ferrule of another mating connector that enters the cassette 160 from the front. Each ferrule 103 is configured to terminate one of the fibers 105 extending out from the flexible circuit 192. The fiber pigtails 105 extending out from a front end 106 of the substrate 107 are individually terminated to the ferrules 103 to be positioned at the front of the cassette 160. As shown in the example of the cassette 160 illustrated in FIGS. 55-56, the substrate 107 defines front extensions 108 (one per fiber) each provided in a spaced apart configuration for providing some flexibility to the substrate 107. The individual fibers 105 are separated out from the ribbonized section at the rear of the substrate 107 and are routed through the substrate 107 to the individual front extensions 108. Each ferrule hub 102 receives front portions of the front extensions 108 of the substrate 107.

The cassette 160 defines pockets 111 at the rear end 113 of the adapter block 199 that match the exterior shape of the ferrule hubs 102 (e.g., having square footprints), wherein the pockets 111 are configured to fully surround the ferrule hubs 102. After the adapter block 199 is mounted to the cassette housing 180, the cassette 160 is ready to receive fiber optic connections. Mating conventional connectors entering the cassette 160 from the front of the cassette 160 may be connected through fiber optic adapters 115 that are defined by the adapter block 199.

Further details relating to fiber optic cassettes including flexible optical circuits are found in U.S. Application No. 61/707,323 and Ser. No. 13/707,371, filed, Sep. 28, 2012, the entire disclosures of which are incorporated herein by reference.

Referring now to FIGS. 12-19 and 46-51, the mounting of the cassettes 60 and the cable managers 61 to the blades 40 is shown. As shown specifically in FIGS. 12-19, which illustrate the blades 40 in isolation, each blade 40 defines a cassette mounting location 5 for each cassette 60 and a cable manager mounting location 7 between each cassette mounting location 5. In the depicted embodiment, as noted above, each blade 40 defines five cassette mounting locations 5 and four cable manager mounting locations 7 that are positioned between the cassette mounting locations 5.

Figure 46:
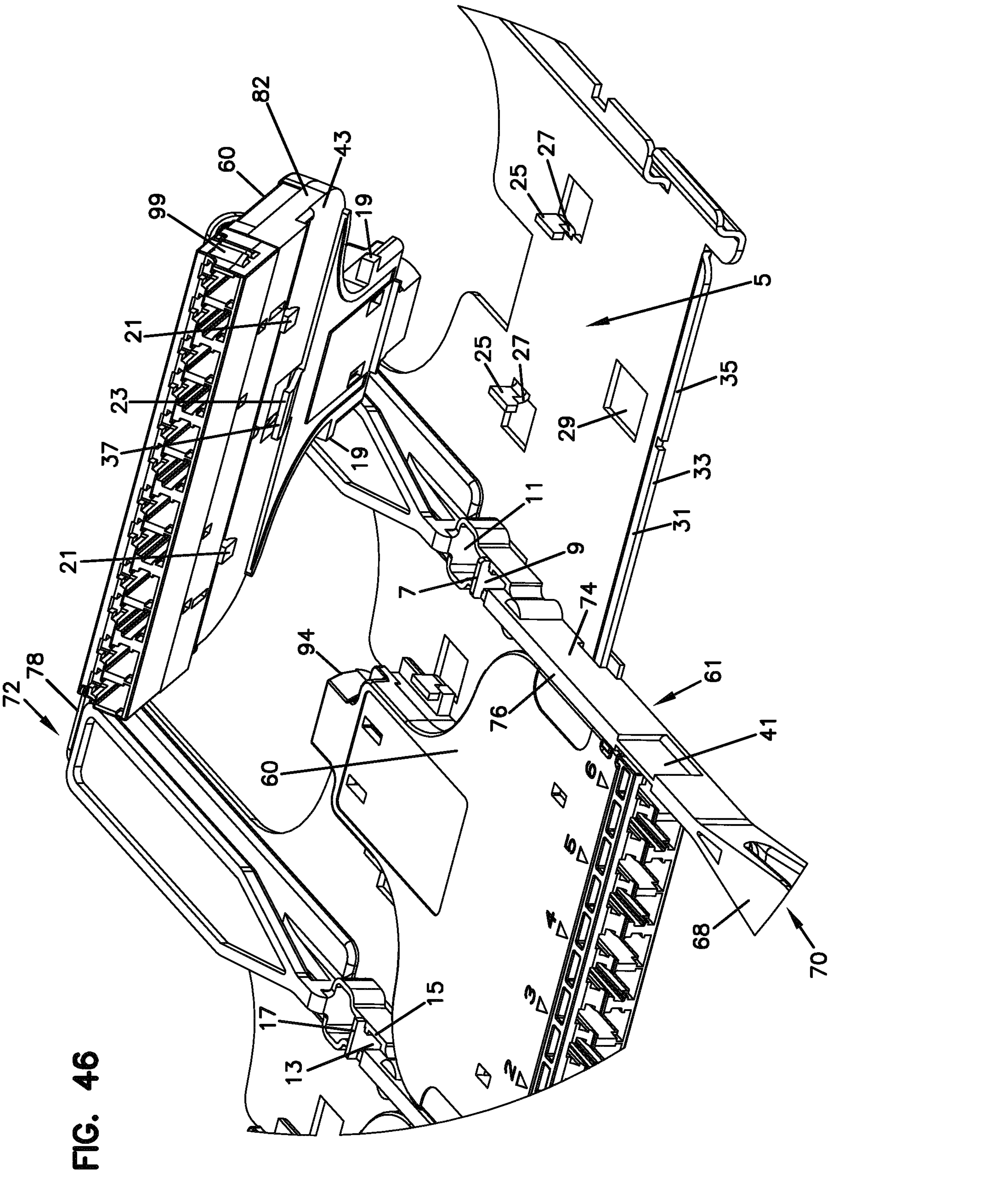
FIG. 46 illustrates the mounting of the fiber optic cassette of FIG. 20 onto one of the chassis blades shown in FIGS. 12-19, wherein the blades are shown in isolation removed from the chassis of the system of FIG. 1.
Figure 47:
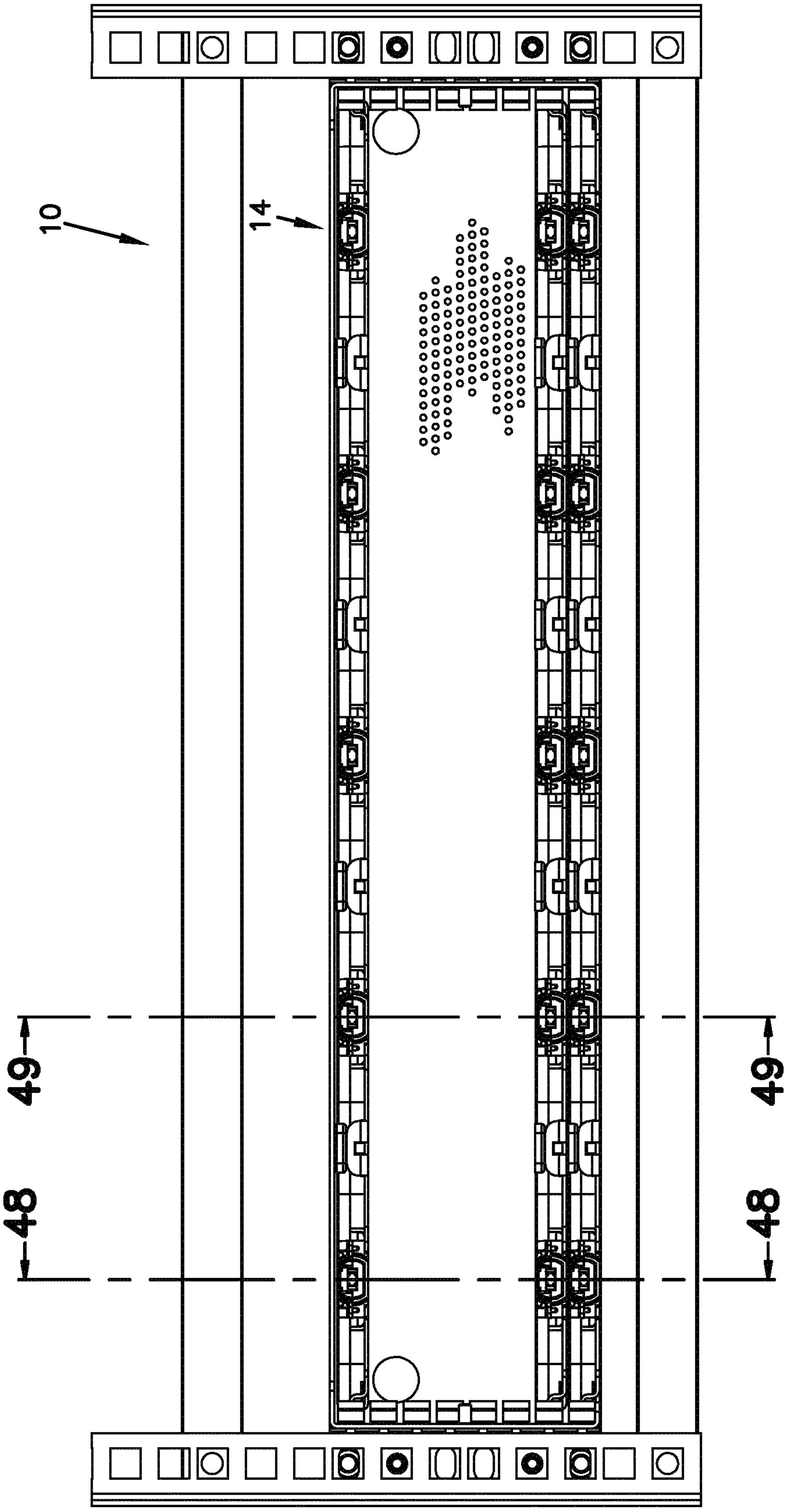
FIG. 47 is another rear elevational view of the telecommunications system of FIG. 1.

Referring now specifically to FIG. 46, the cable manager mounting location 7 is defined by a T-shaped tab 9. When mounting the cable manager 61, the T-shaped tab 9 is inserted into an insertion pocket 11 of the cable manager 61, and, thereafter, the cable manager 61 is slid rearwardly to slide the vertical portion 13 of the T-shaped tab 9 into a slot 15 provided on the cable manager 61. The horizontal portion 17 of the T-shaped tab 9 of the blade 40 abuts the cable manager 61 and prevents removal thereof. If the cable manager 61 needs to be removed, the cable manager 61 first has to be slid forwardly. The rear extensions 540 of the blades 40 provide support surfaces for the cable managers 61.

In mounting a fiber optic cassette 60 to the blade 40, a pair of tabs 19 adjacent the back of the cassette housing 80, a pair of tabs 21 adjacent the front of the housing 80, and a spring tab 23 defined at the bottom of the base 82 of the housing 80 are used.

As shown in FIG. 46, each cassette mounting location 5 of the blade 40 defines a pair of L-shaped catches 25 toward the rear of the blade 40, each defining a notch 27, and a slot 29 adjacent the front of the blade 40. A raised front lip 31 is also defined on each blade 40. The front end 33 of the raised lip 31 defines a front catch 35 used in mounting the cassettes 60 to the blade 40.

Figure 51:
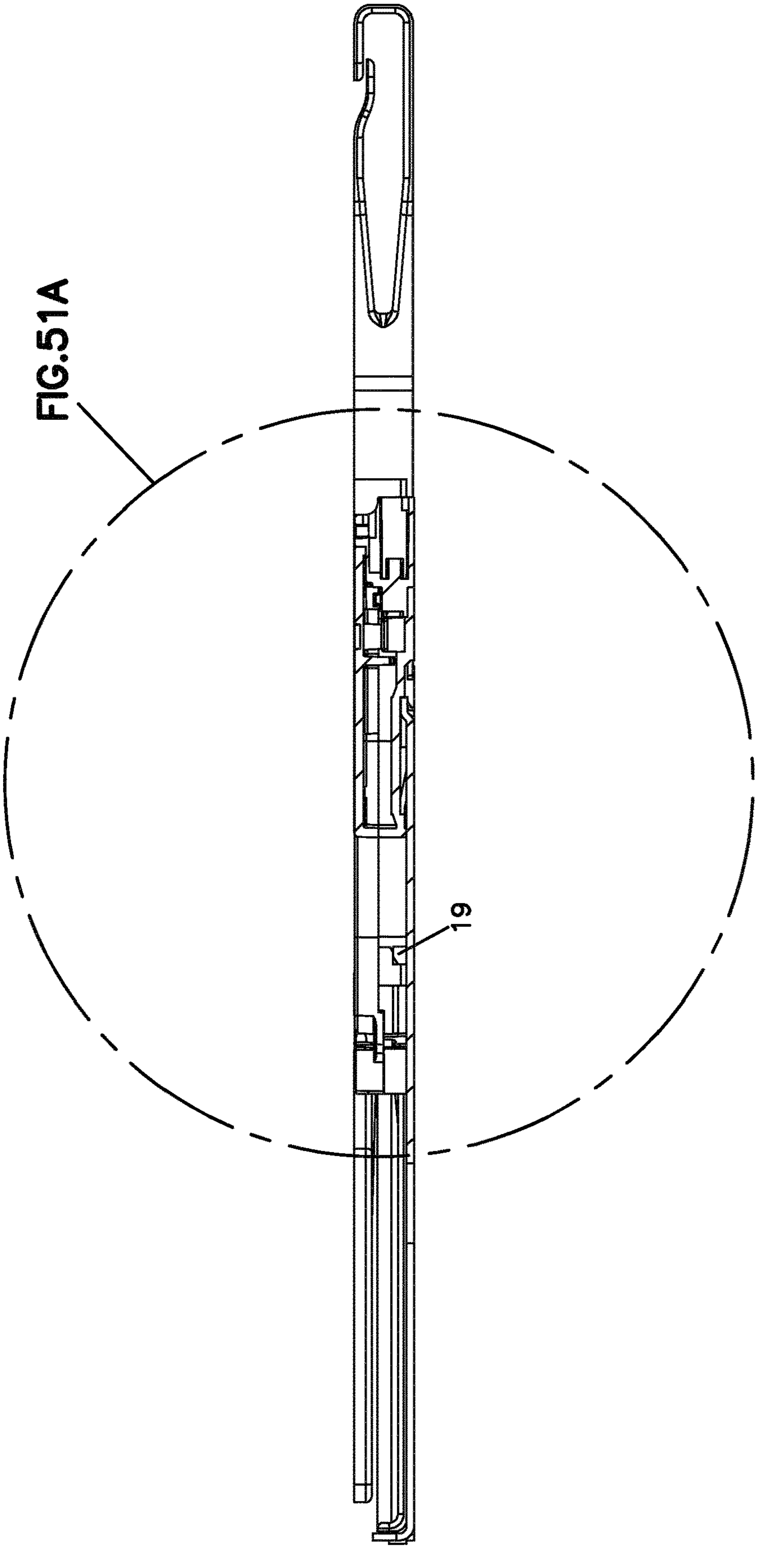
FIG. 51 is a cross-sectional view taken along line 51-51 of FIG. 50.
Figure 51A:
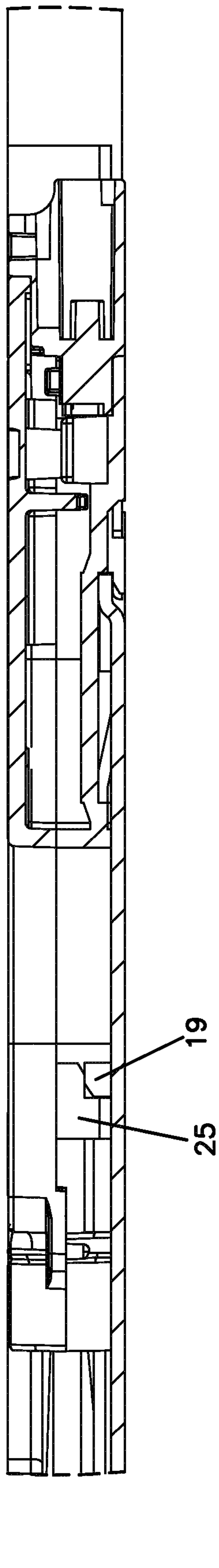
FIG. 51A is a close-up view of a portion of the blade and the fiber optic cassette mounted thereon of FIG. 51.

When mounting a fiber optic cassette 60 to the blade 40, the cassette 60 is positioned above the blade 40 and slid rearwardly until the back tabs 19 of the cassette 60 engage the notches 27 defined by the L-shaped catches 25 of the blade 40 (see FIG. 51A). As the cassette 60 is slid rearwardly and the back tabs 19 engage the L-shaped catches 25, the front tabs 21 of the cassette 60 slide under the front raised lip 31 of the blade 40. The cassette 60 is slid rearwardly until the spring tab 23 snaps into the front slot 29 of the blade 40. Once the spring tab 23 snaps into the slot 29, a front face 37 of the spring tab 23 abuts an opposing face 39 on the blade 40 to prevent the cassette 60 from moving forward (sec FIGS. 48-49). The rear tabs 19 and catches 25 and the front tabs 21 and the front catch 35 defined by the raised lip 31 prevent the cassette 60 from moving rearwardly or being lifted upwardly.

As shown in FIG. 46, each cable manager 61 defines a notch 41 on both sides of the thin middle portion 74 of the cable manager 61. The notches 41 accommodate portions of the adapter block 99 that forms a part of the cassette housing 80. In this manner, the cable managers 61 essentially allow the fiber optic cassettes 60 to be mounted in a side-by-side configuration, adding only nominal thickness to the overall horizontal stack.

In removing the cassette 60, the spring tab 23 is pushed upwardly from the bottom side of the blade 40 until the front face 37 of the spring tab 23 clears the opposing face 39. At the same time, the cassette 60 is slid forwardly until the rear and front tabs 19, 21 of the cassette leave the rear and front catches 25, 35 of the blade 40, respectively.

Now referring to FIGS. 24, 27, 28, 46, 48, and 49, the blades 40 and the cassettes 60 are configured such that portions (e.g., at the bottom) of the base 82 of the cassette 60 are configured to receive portions of the blade 40 to decrease the overall thickness of the mounted unit. The cassette 60 defines a notched area 43 that extends a majority of the length of the cassette 60, essentially from where the adapter block 99 is mounted to the base 82 to the rear area forming the MPO style adapter pocket 96. As such, according to one example embodiment, when a cassette 60 is mounted on a blade 40, the blade 40 lies flush with the cassette housing 80 and the thickness of the blade 40 is accommodated by the notched area 43. The portions of the cassette 60 that protrude from the base 82 and extend into the notched area 43 (such as the spring tab 23 or the front tabs 21 of the cassette 60) are accommodated by the thickness of the blade 40. For example, the spring tab 23 is positioned within the slot 29 on the blade 40 and the front tabs 21 lie underneath the raised lip 31 of the blade 40. As such, when a cassette 60 is mounted on the blade 40, the blade 40 can lie against the cassette 60 without substantially adding to the overall thickness of the cassette 60. According to one example embodiment, the entire thickness of the blade 40 is accommodated by the notched area 43. According to another example embodiment, at least a portion of the thickness of the blade 40 is accommodated by the notched area 43. According to yet another example embodiment, at least a portion of the notched area 43 is used in accommodating the thickness of the blade 40 such that the blade body does not add to the maximum overall height of the cassette 60.

This configuration allows four cassette-loaded blades 40 to be mounted in a vertical stack in a 1 RU rack space and eight cassette-loaded blades 40 to be mounted in a vertical stack in a 2 RU rack space. The thin portions 74 of the cable managers 61 also allow five cassettes 60, each holding up to twelve connections, to be mounted on blades 40 along a horizontal stack within the width defined by a standard 19" telecommunications rack 12. And, with four cassette-loaded blades 40 mounted in a vertical stack in a 1 RU rack space, the system 10 of the present disclosure achieves significant connectivity densities.

According to one example embodiment, 480 connections each using a standard LC connector footprint are achieved in a standard 19-inch telecommunications rack 12 within a 2 RU rack space. According to another example embodiment, 240 connections each using a standard LC connector footprint are achieved in a standard 19-inch telecommunications rack 12 within a 1 RU rack space.

Figure 52:
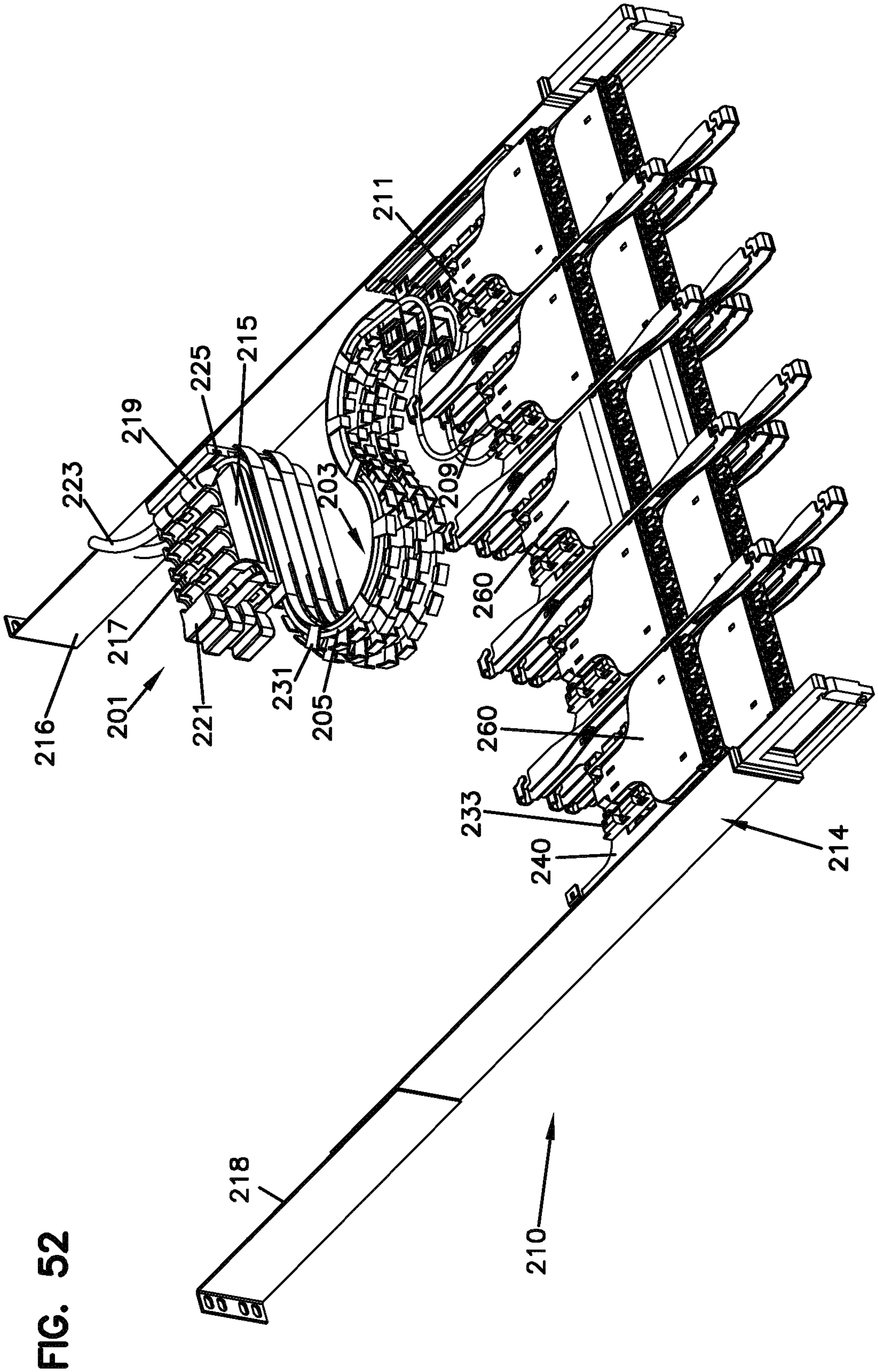
FIG. 52 is another version of a telecommunications chassis having features that are examples of inventive aspects in accordance with the present disclosure, the telecommunications chassis configured to be mounted on a telecommunications rack as in the system of FIG. 1, the chassis also including at least one blade slidably mounted on the telecommunications chassis, and at least one fiber optic cassette removably mounted on the blade, the chassis further including a fiber breakout module mounted at one of the sides of the chassis and a flexible cable manager for guiding cables between the fiber breakout module and the fiber optic cassettes mounted on the chassis.

FIG. 52 illustrates another embodiment of a telecommunications system 210 having features that are examples of inventive aspects of the present disclosure. The system 210 illustrated in FIG. 52 is depicted as a 1 RU chassis or panel 214. The system 210 illustrated in FIG. 52 is similar to the system 10 illustrated in FIGS. 1-51 and is shown with certain additional features that can be incorporated into the system 10 of FIGS. 1-51.

For example, the system 210 of FIG. 52 is shown with a fiber breakout module 201 and a flexible cable manager 203 that is configured to guide cables 205 from the breakout module 201 to the rears of the cassettes 260 located on the blades 240. The cables 205 that are terminated with conventional MPO connectors 209 mate with the MPO style connectors within the cassette 260 through the MPO style adapter 211 found at the rear of the cassette 260.

Still referring to FIG. 52, the breakout module 201 defines slidable trays 215. Each tray 215 defines a plurality of pockets 217 for supporting transition devices or breakouts 219 and a handle 221 for sliding the tray 215. The transition devices or breakouts 219 each are configured for transitioning first cable 223 coming in to the rack or chassis to the second cable 205 terminated with an MPO connector 209 that can lead to the rear end of the cassette 260.

In the depicted embodiment, the slide portions of the trays 215 are mounted to mounting slots 225 positioned at the inner right wall 216 of the chassis 214 similar to the mounting slots 225 used for the blades 240. Each tray 215 is positioned at the same height as its corresponding blade 240. Each tray 215 is independently slidable to enable access to the transition devices 219. As shown, the trays 215 are mounted in a staggered configuration from the top toward the bottom to facilitate using the handles 221 in sliding the trays 215 for access.

It should be noted that the breakout module 201 can be mounted to either the right wall 216 or the left wall 218 of the chassis 214 and can be incorporated into a chassis such as the chassis 14 shown in FIGS. 1-51.

Still referring to FIG. 52, as noted above, the chassis 214 is shown with a flexible cable manager 203, which can also be incorporated into a chassis such as the chassis 14 shown in FIGS. 1-51. According to one example embodiment, the flexible cable manager 203 is defined by a single integral piece that has the ability to bend under loading. When the blades 240 are pulled forwardly or pushed rearwardly, the cable manager 203 is able to flex to accommodate the change in distance without violating minimum bend radius requirements for the optical fibers. The flexible cable manager 203 defines cable fingers 231 for retaining the cables 205 therein.

In the version of the chassis 214 shown in FIG. 52, the cassettes 260 are not mounted directly to the blades 240 as in the chassis 14 of FIGS. 1-51 but use intermediate mounting structures 233 that are first snap-fit on the blades 240. Once the intermediate mounting structures 233 are placed on the blades 240, the cassettes 260 are slid rearwardly to engage the mounting structures 233 and to lock the cassettes 260 in place. All of the features relating to preserving the overall thickness of a cassette mounted on a blade discussed above with respect to the system 10 of FIGS. 1-51 are also applicable to the system 210 shown in FIG. 52, wherein the cassettes define notched areas for accommodating the thickness of the blades on which they are mounted. All of the features relating to preserving the overall width of the horizontally stacked devices discussed above, such as the thinner portions of the cable managers, is also applicable to the system 210 shown in FIG. 52.

Figure 53:
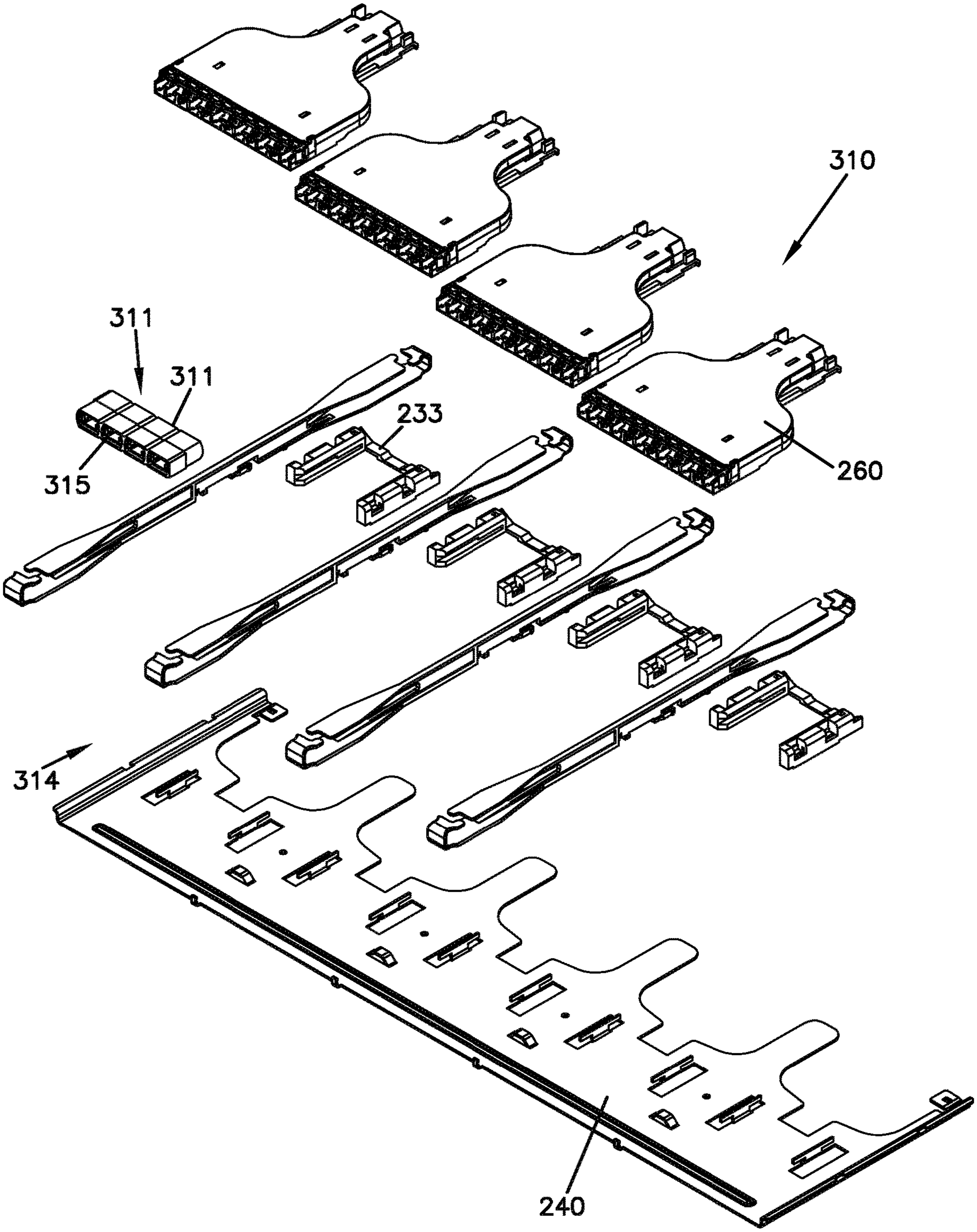
FIG. 53 is an exploded view of an example fiber optic distribution arrangement for mounting on the chassis of FIG. 52, the arrangement including a slidable blade and a plurality of fiber optic cassettes and an MPO adapter block configured for mounting on the slidable blade to convert the chassis of FIG. 52 into a front-access chassis.
Figure 54:
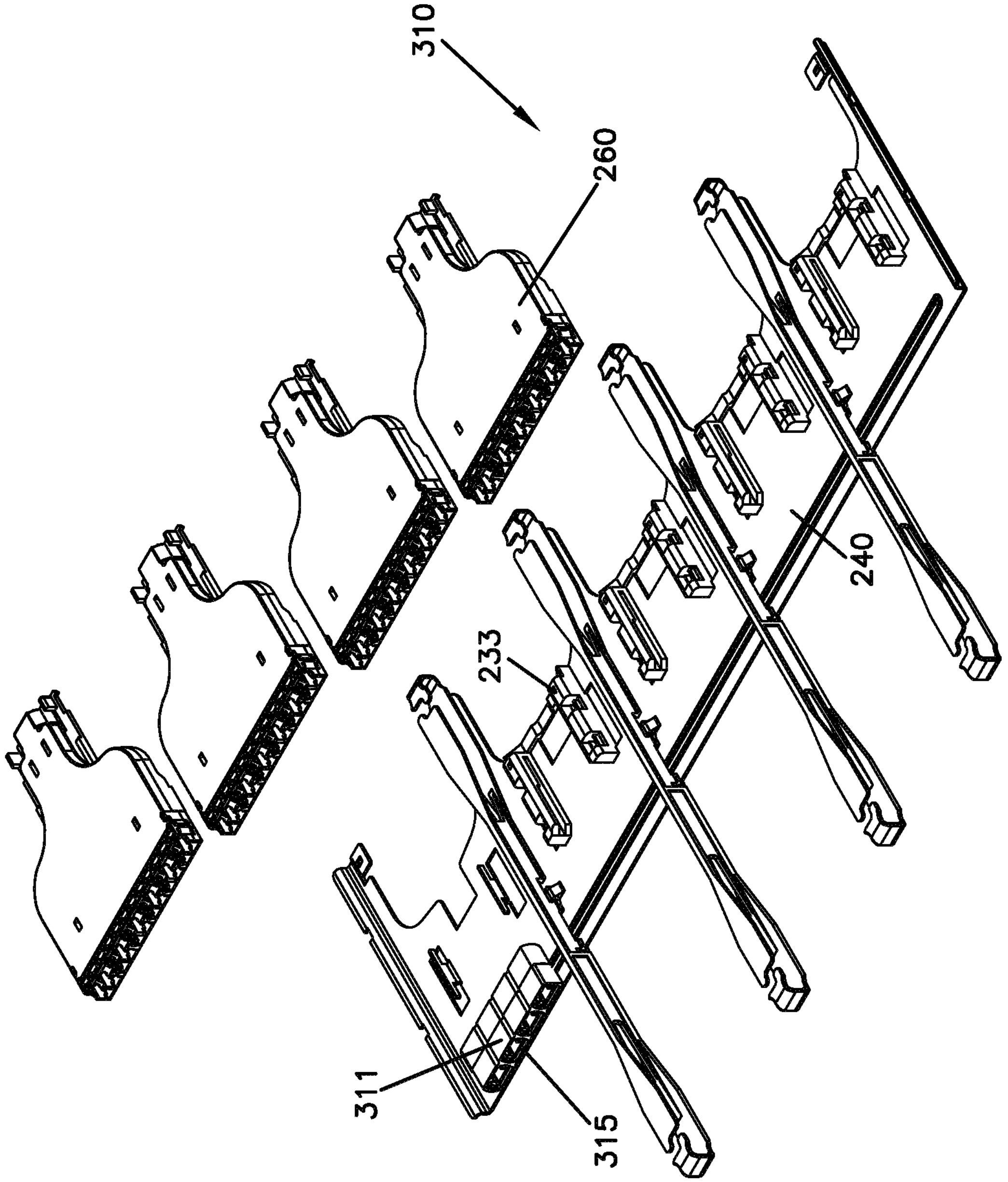
FIG. 54 shows a partially assembled view of the arrangement of FIG. 53.

FIGS. 53-54 illustrate the flexibility of a system such as the one shown in FIGS. 1-51 or FIG. 52 in being able to provide different types of connectivity arrangements. In the example system 310 shown in FIGS. 53-54, an MPO adapter block 311 is mounted at one of the mounting locations on the blade 240 along with four of the fiber optic cassettes 260. With this type of an arrangement, a chassis such as the chassis 214 shown in FIG. 52 can be converted into a front-access chassis 314.

In a chassis such as the chassis 214 shown in FIG. 52, incoming cables 205, terminated by MPO connectors 209, would normally enter the rack and the chassis through the rear thereof and be connected to the cassettes 260 via the MPO style adapter formed at the back of the cassettes 260. In an arrangement such as the system 310 in FIGS. 53-54, the MPO adapter block 311 provides a connection location wherein MPO connector terminated cables can extend from the rear 313 of the adapter block 311 to the rear of the cassettes 260, and the front 315 of the adapter block 311 provides a front access point for the chassis 314 for bringing in an MPO connector terminated cable for the input signal. The LC connectors of the cassettes 260 would be used in the same way as discussed with respect to the earlier embodiments. The front-access type of an arrangement, however, decreases the density that might be available if all of the cassette mounting locations of the blades 240 were populated with the cassettes 260.

It should be noted that the MPO adapter block 311 may be located at any of the mounting locations in the blade 240 instead of being mounted to the leftmost location as shown in the example embodiment. Furthermore, instead of populating the cassette mounting locations with optical equipment, any of the mounting locations can be used for other purposes such as labeling, providing connectivity instructions, etc. The removability of the cassettes 260 provides significant flexibility in configuring the connectivity system as desired. For example, the blades 240 may be populated and the cassettes 260 arranged differently depending upon the densities needed and the different types and sizes of cabling used (e.g., 12 fiber 10-gig cabling, 24 fiber 40-gig cabling, or 48 fiber 100-gig cabling).

The removability of the cassettes and the blades of the systems of the present disclosure allows different arrangements to be provided depending upon the connectivity need. Cassettes can be added for increasing connectivity, removed for decreasing connectivity, or replaced if needing repair. The connection locations can be varied both in number and type. For example, the types of optical equipment (e.g., the types of cassettes) can be varied within each blade or within the different levels within a chassis. Certain mounting locations of the blades can be left unpopulated and used for other purposed such as labeling, etc.

Figure 55:
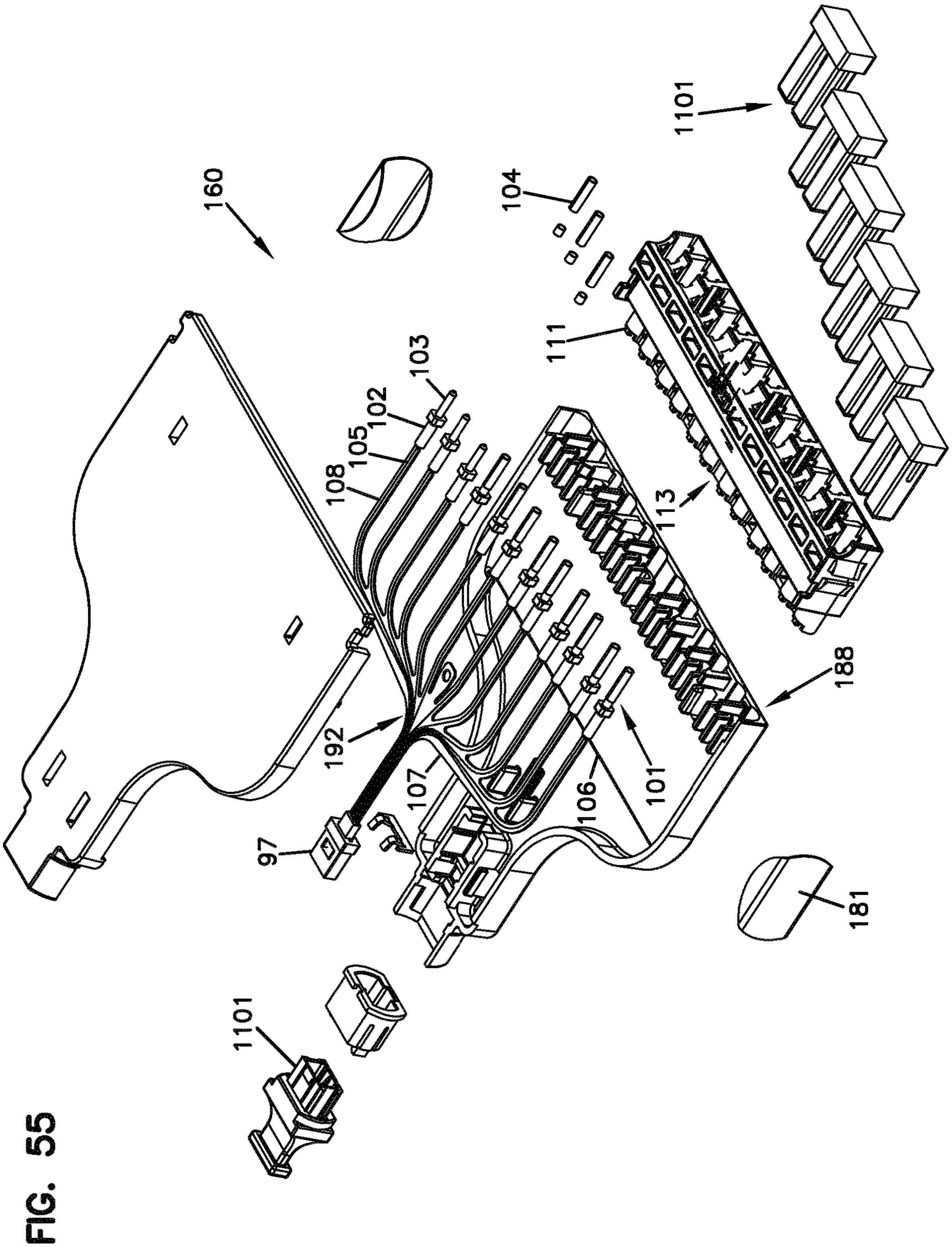
FIG. 55 is a fully exploded view of an example of a single-level fiber optic cassette that may be used with a telecommunications chassis similar to that shown in FIG. 1 or FIG. 52.
Figure 56:
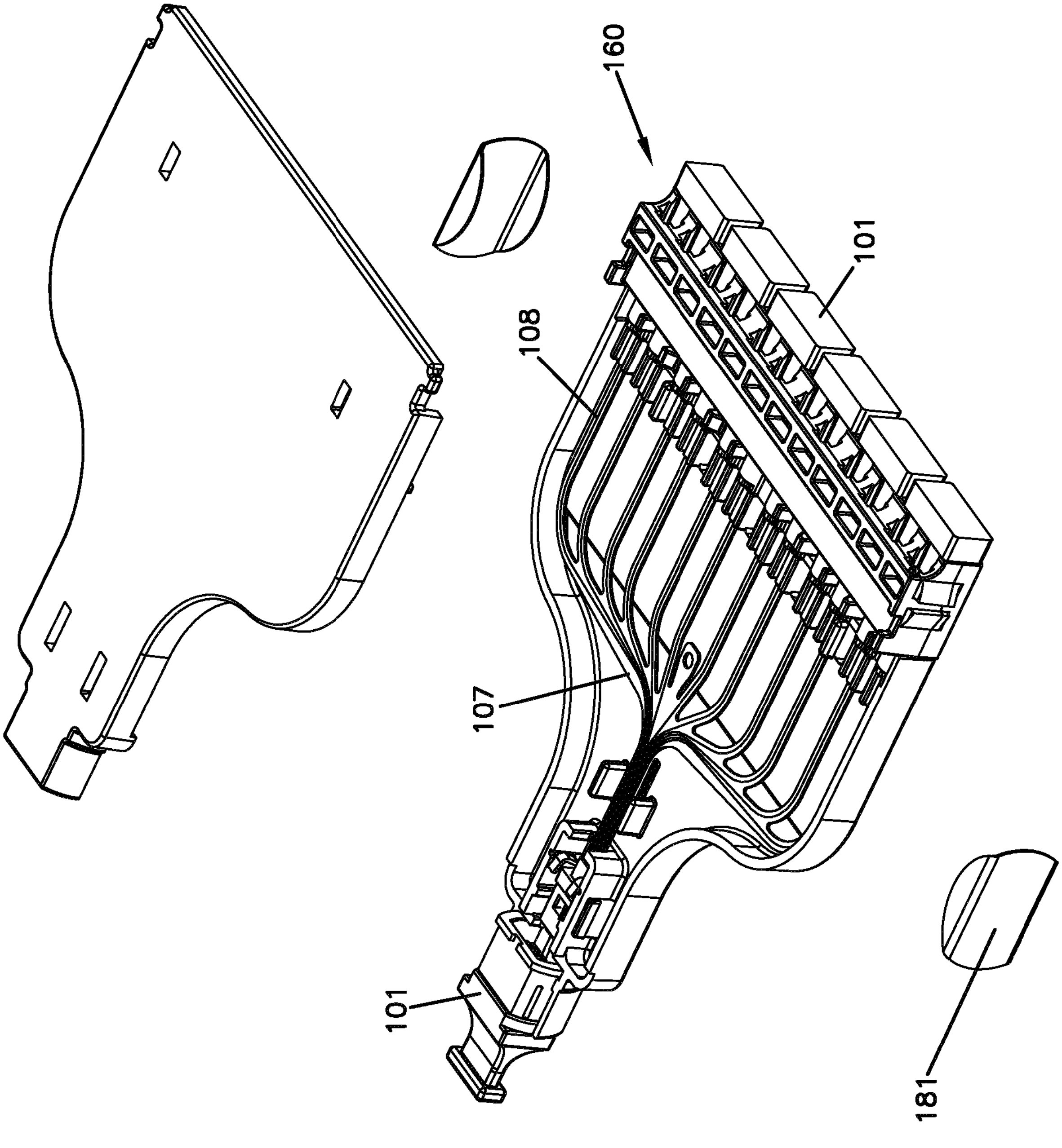
FIG. 56 illustrates the cassette of FIG. 55 in a partially assembled configuration.

Now referring to FIGS. 55-65, different types of fiber optic cassettes that may be used with systems such as the ones shown in FIGS. 1-54 are illustrated. For example, FIGS. 55-56 illustrate a single-layer flexible circuit cassette 160 that may be used with a telecommunications chassis 14, 214, 314 similar to that shown in FIG. 1 or FIGS. 52-54. The cassette 160 is shown with dust plugs 1101 at both ends of the cassette 160. Tamper-resistant labels 181 may also be used as shown.

Figure 57:
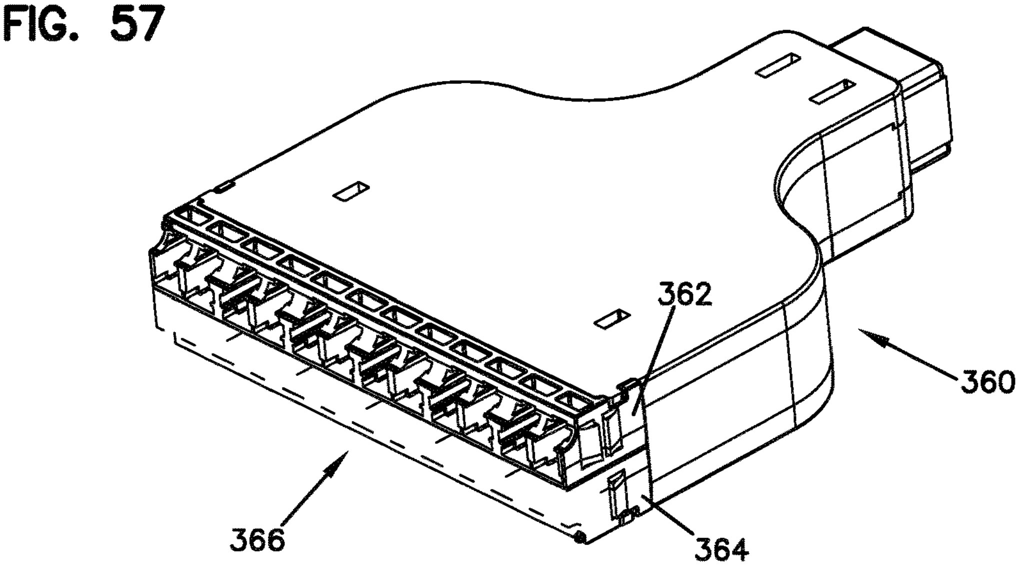
FIG. 57 illustrates another fiber optic cassette having a dual-level configuration that may be used with a telecommunications chassis similar to that shown in FIG. 1 or FIG. 52.
Figure 58:
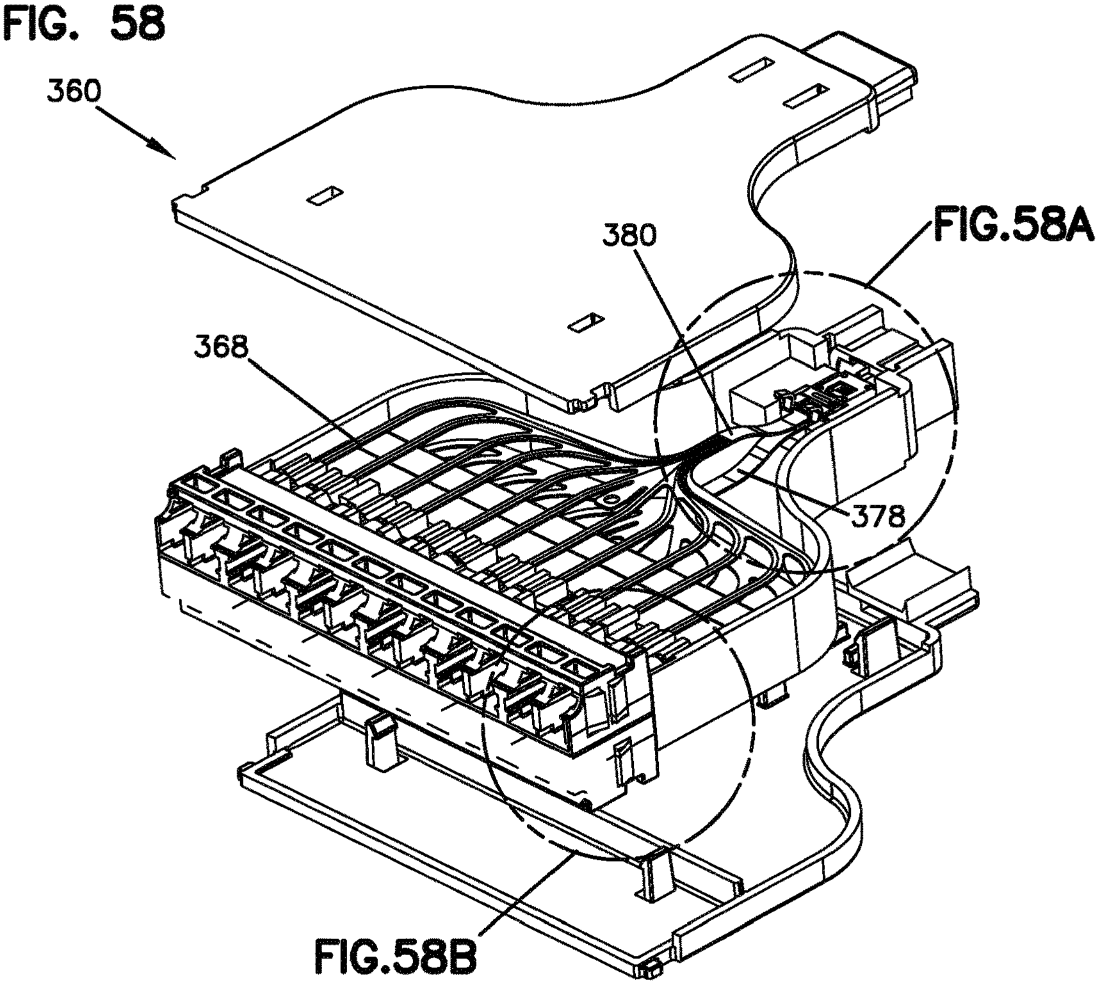
FIG. 58 is a partially exploded front perspective view of the cassette of FIG. 57.
Figure 58A:
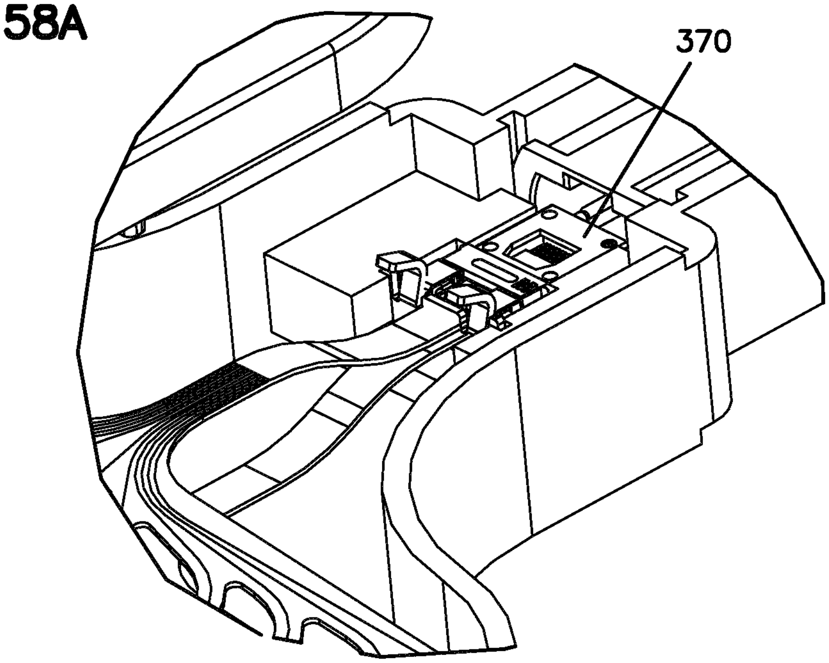
FIG. 58A is a close-up view of a rear portion of the cassette of FIG. 58.
Figure 58B:
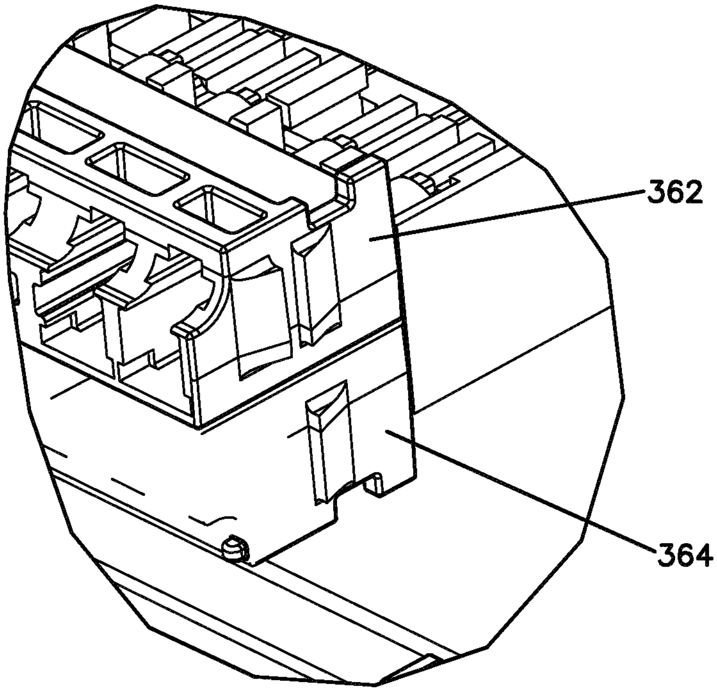
FIG. 58B is a close-up view of a front portion of the cassette of FIG. 58.
Figure 59:
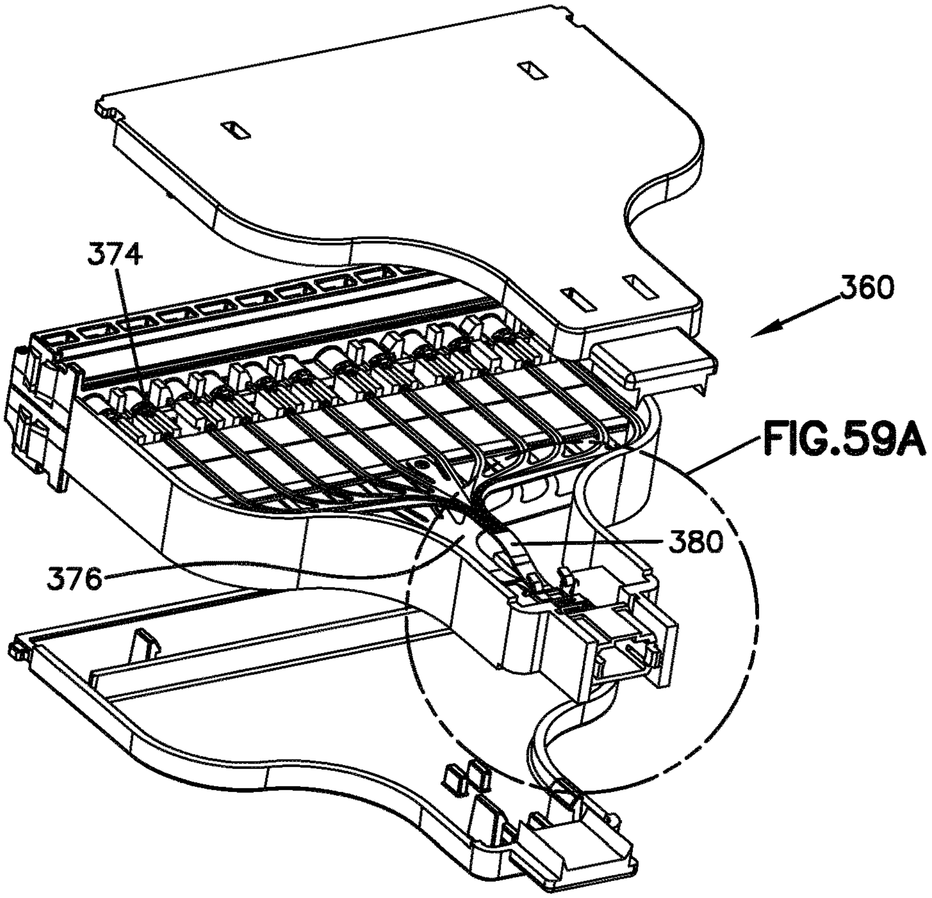
FIG. 59 is a partially exploded rear perspective view of the cassette of FIG. 57.
Figure 59A:
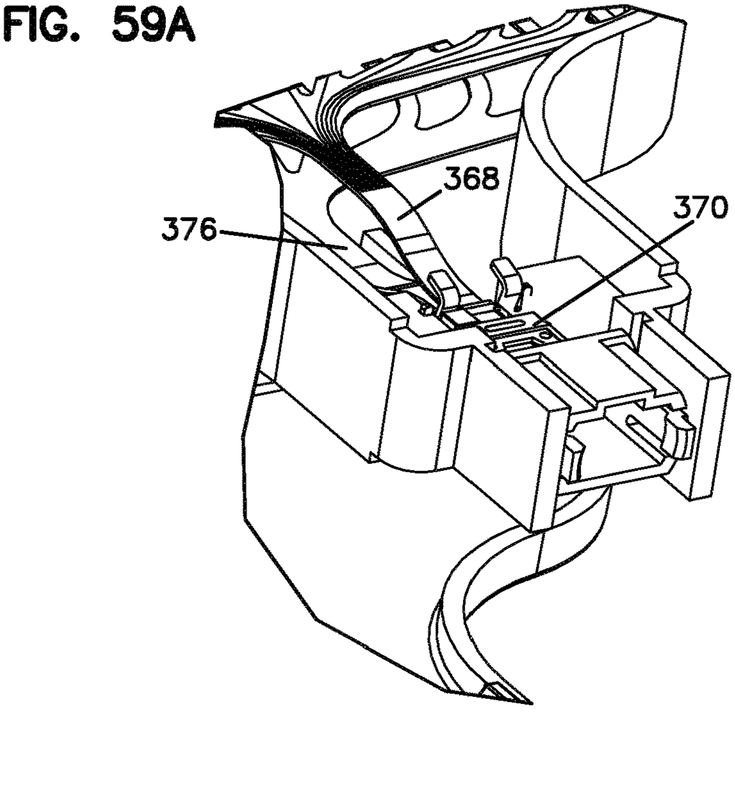
FIG. 59A is a close-up view illustrating the MPO connector located at the rear of the cassette of FIG. 59.
Figure 60:
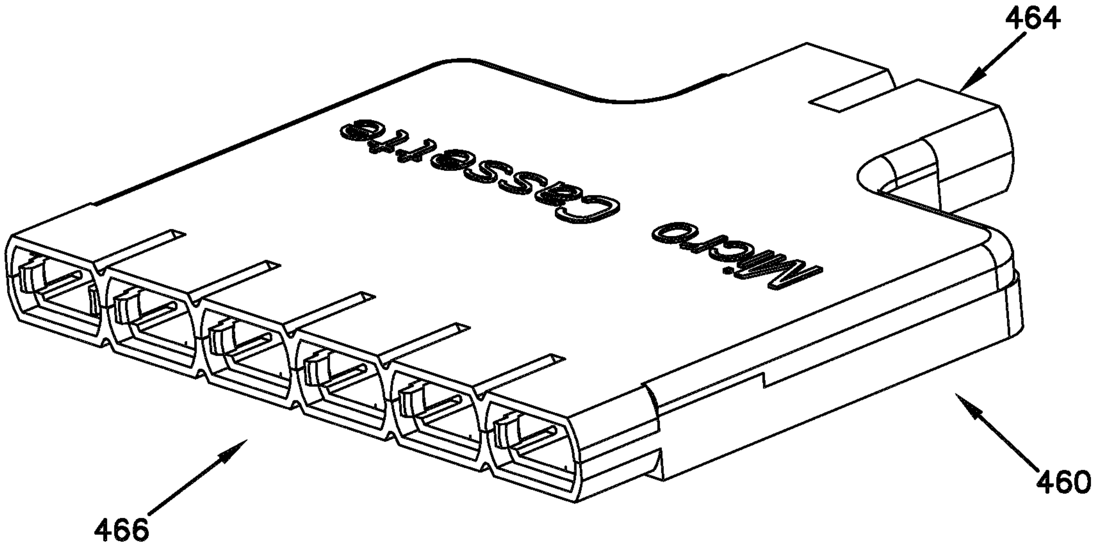
FIG. 60 illustrates a front, top, right side perspective view of another fiber optic cassette that may be used with a telecommunications chassis similar to that shown in FIG. 1 or FIG. 52, the cassette including MPO format connections at both the rear end and the front end of the cassette.
Figure 61:
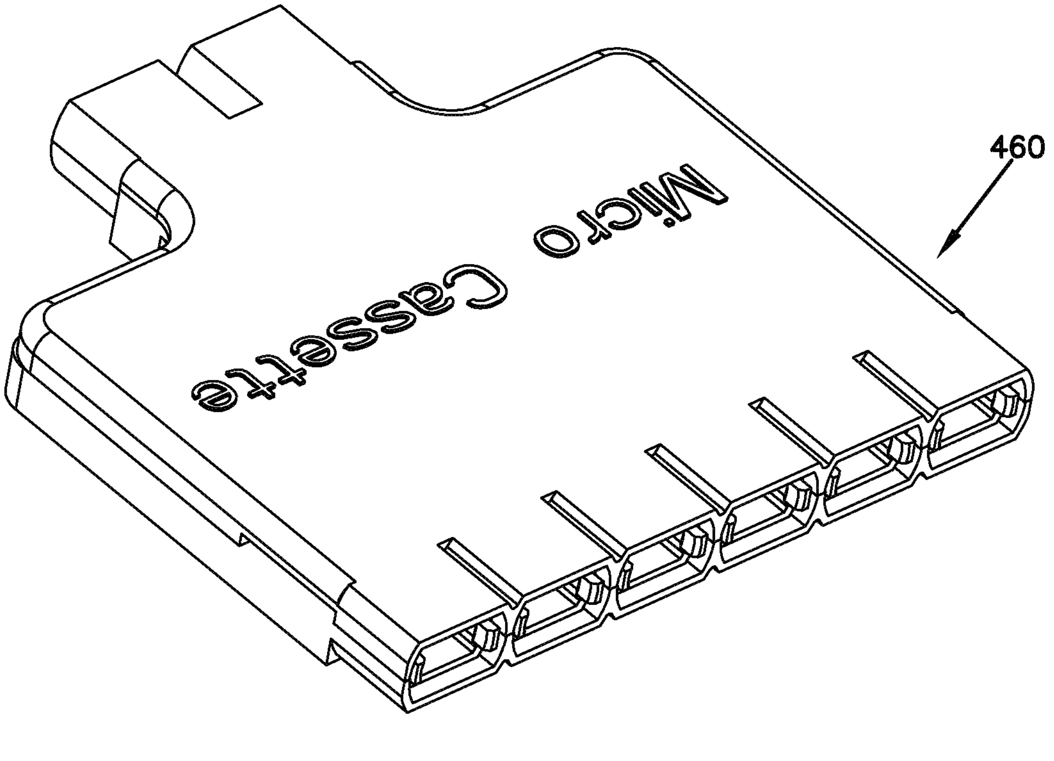
FIG. 61 is a front, top, left side perspective view of the fiber optic cassette of FIG. 60.
Figure 62:
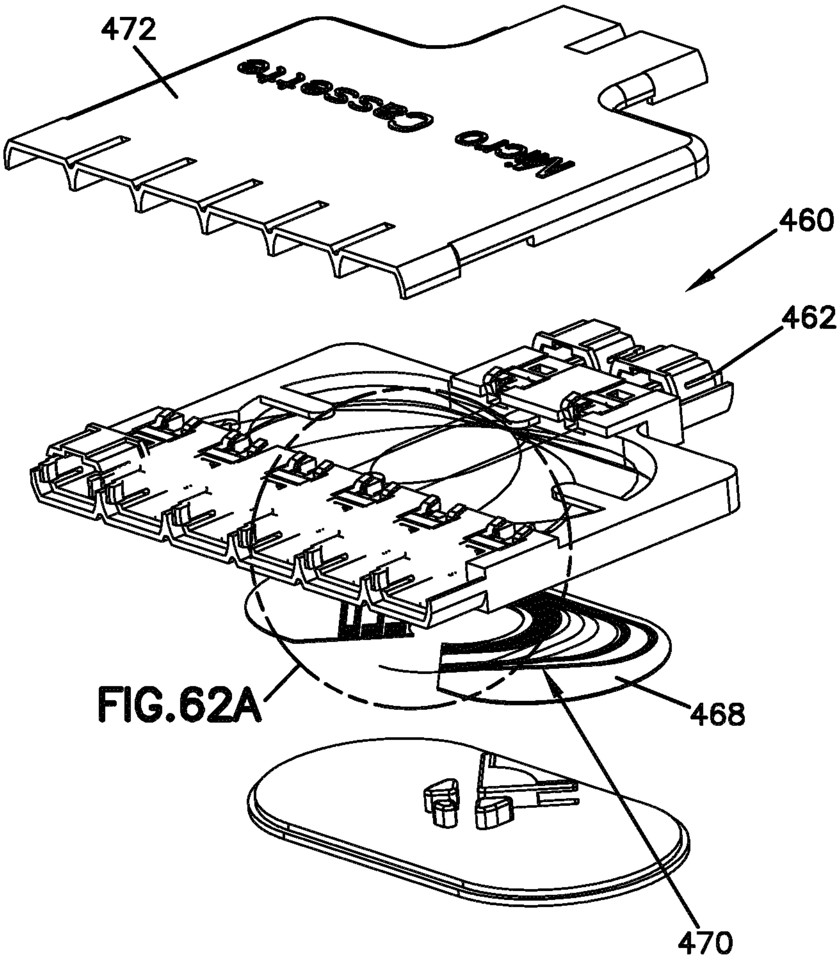
FIG. 62 illustrates a front exploded view of the cassette of FIG. 60.
Figure 62A:
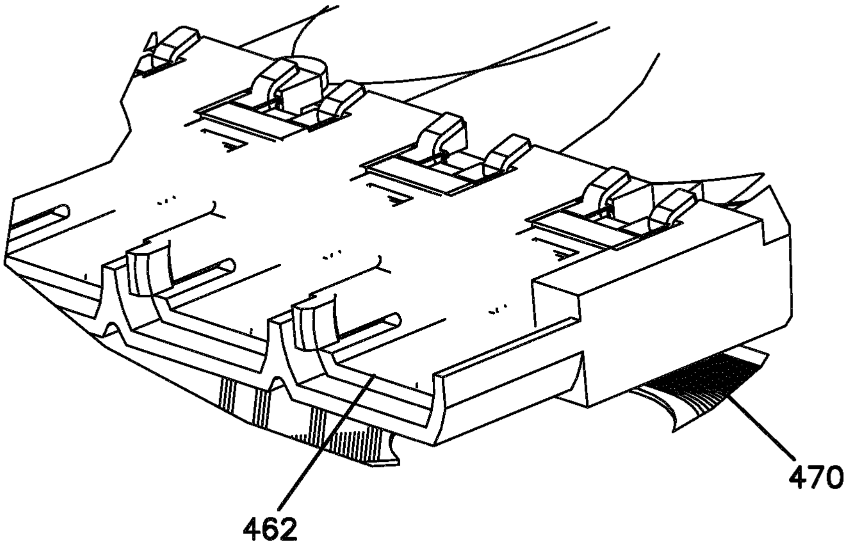
FIG. 62A is a close-up view of a front portion of the cassette of FIG. 62.
Figure 63:
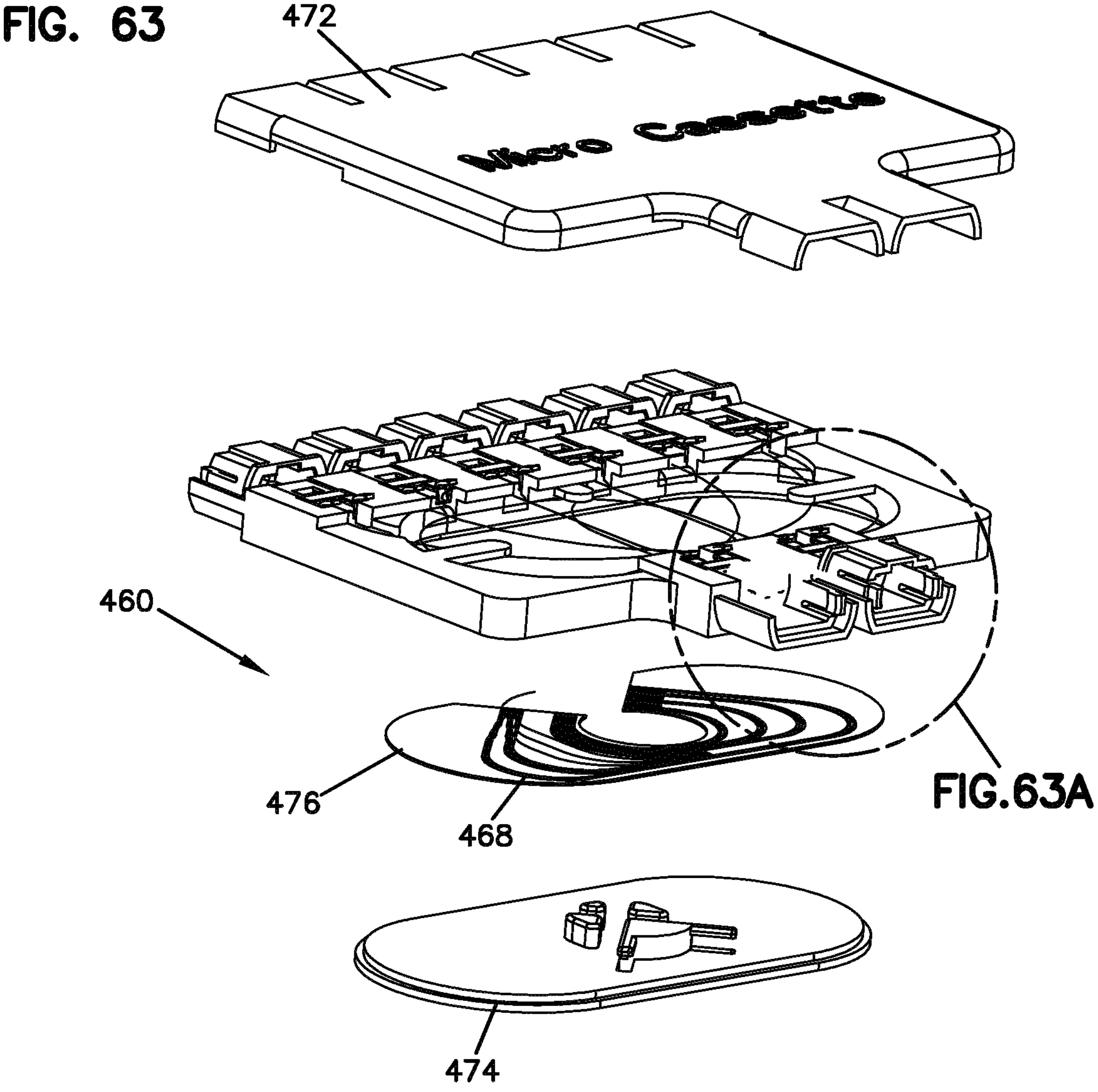
FIG. 63 illustrates a rear exploded view of the cassette of FIG. 60.
Figure 63A:
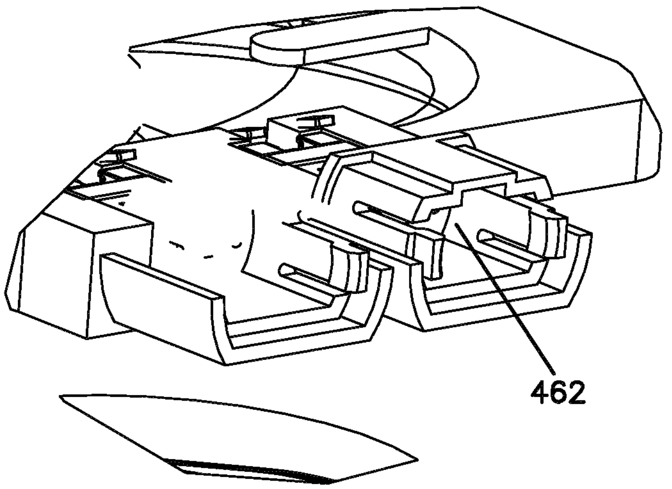
FIG. 63A is a close-up view of a rear portion of the cassette of FIG. 63.

FIGS. 57-59 a dual-layer flexible circuit cassette 360 that may be used with a telecommunications chassis 14, 214, 314 similar to that shown in FIG. 1 or FIGS. 52-54. In the example of the cassette 360 shown in FIGS. 57-59, an upper adapter block 362 and a lower adapter block 364 are mounted at the front 366 of the cassette 360. An upper flexible circuit 368 extends from an MPO style connector 370 (e.g., a 24-fiber connector) at the rear 372 of the cassette 360 to the non-conventional connectors 374 formed as part of the upper adapter block 362, and a lower flexible circuit 376 extends from the MPO style connector 370 at the rear 372 of the cassette 360 to the non-conventional connectors 374 formed as part of the lower adapter block 364. As shown, the substrates 378 of the flexible circuits 368, 376 include bends 380 that are in a direction perpendicular to the longitudinal axis of the cassette 360 that provide separation between the two circuits 368, 376, wherein the upper one can extend to the upper adapter block 362 and the lower one can extend to the lower adapter block 364. The upper and lower adapter blocks 362, 364, as well as the upper and lower flexible circuits 368, 376, are captured with respect to the base 382 of the cassette 360 with upper and lower covers 384, 386, respectively. It should be noted a cassette such as the dual-level cassette 360 of FIGS. 57-59 may require more spacing between the blade levels when mounting on a chassis.

FIGS. 60-63 illustrate example of a fiber optic cassette 460 that may be used with a telecommunications chassis 14, 214, 314 similar to that shown in FIG. 1 or FIGS. 52-54. The cassette 460 includes MPO format connections 462 at both the rear end 464 and the front end 466 of the cassette 460 with a flexible optical circuit 468 supporting the optical fibers 470 extending therebetween. The cassette 460, as shown, may include a top cover 472 and a bottom cover 474 for capturing the substrate 476 of the flexible optical circuit 468.

Figure 64:
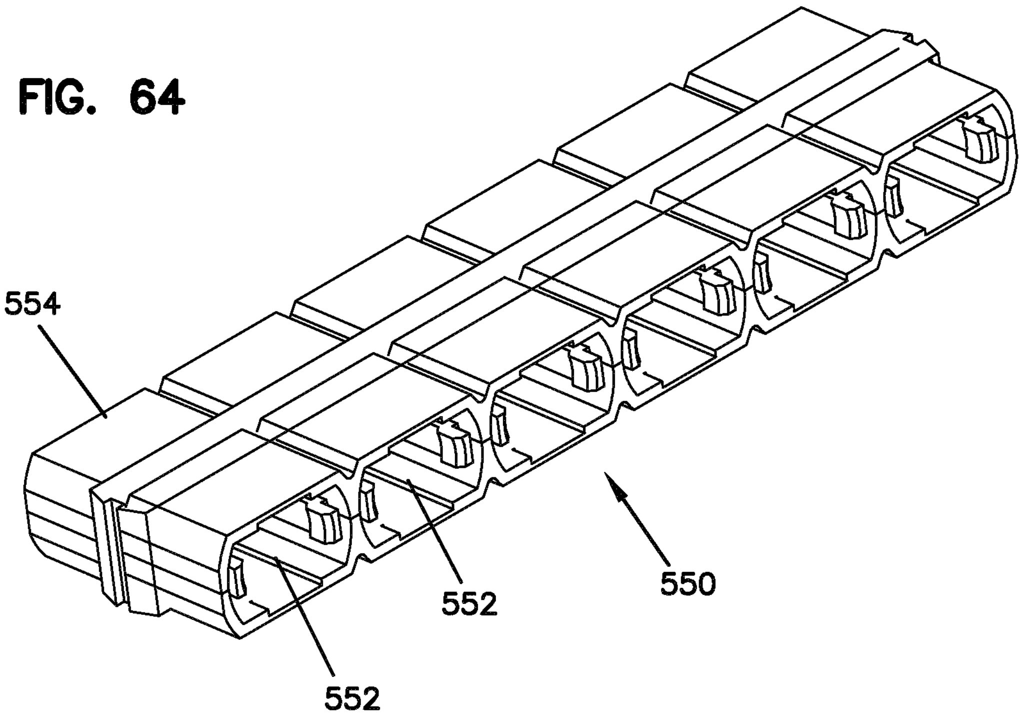
FIG. 64 is an MPO style adapter block that may be used on fiber optic cassette similar to that shown in FIG. 60.
Figure 64A:
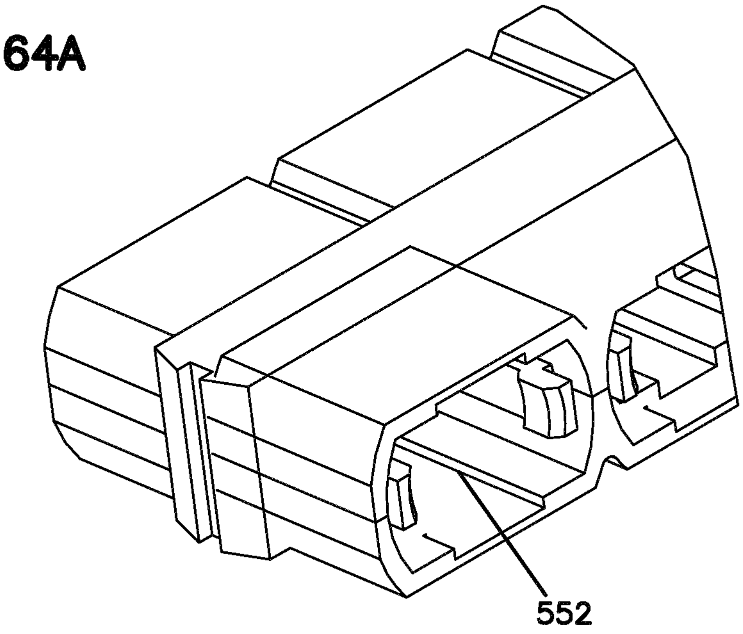
FIG. 64A is a close-up view of a portion of the adapter block of FIG. 64.
Figure 65:
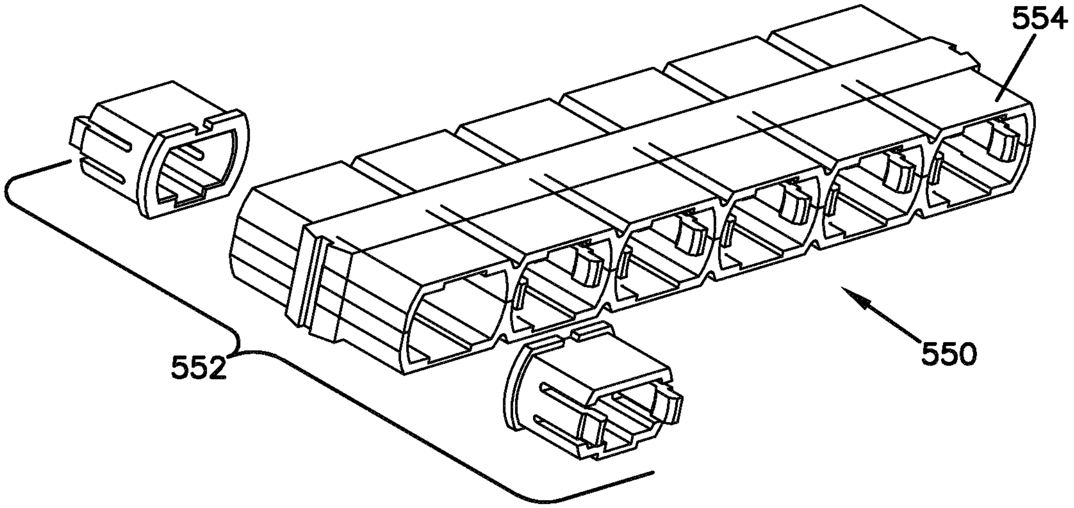
FIG. 65 illustrates the adapter block of FIG. 64 in a partially exploded configuration.
Figure 65A:
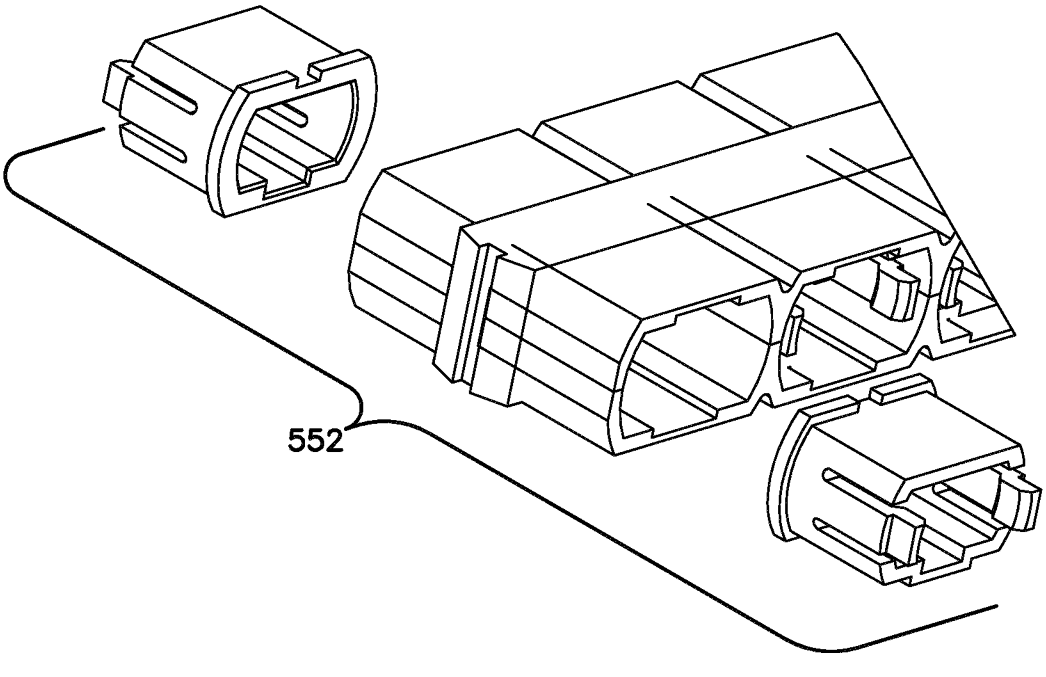
FIG. 65A is a close-up view of a portion of the adapter block of FIG. 65.

FIGS. 64-65 illustrate an MPO style adapter block 550 that may be used on a fiber optic cassette similar to that shown in FIGS. 60-63. Instead of integrally molding portions of each of the MPO style adapters with the front of the cassette (as in FIGS. 60-63), the adapter block 550 of FIGS. 64-65 combines the adapters 552 into a single removable piece 554. This type of a design may increase flexibility and manufacturing efficiency. It should be noted that an MPO style adapter block such as the block 550 shown in FIGS. 64-65 can also be mounted on the chassis in isolation as shown in FIGS. 53-54 to reconfigure the chassis in different connectivity arrangements.

Now referring to FIGS. 66-75, another embodiment of a telecommunications chassis 614 having features similar to the telecommunications chassis 14 of FIG. 1 and the telecommunications chassis 214 of FIG. 52 is illustrated. Similar to the chassis 14, 214 of FIGS. 1 and 52, the chassis 614 of FIGS. 66-75 is configured to receive blades 640 that are configured to hold fiber optic cassettes 660. Similar to the chassis 14, 214 of FIGS. 1 and 52, the depicted chassis 614 is configured to slidably receive four blades 640 in a stacked arrangement, with each blade 640 housing five fiber optic cassettes 660. Also similar to the chassis 14, 214 of FIGS. 1 and 52, the chassis 614 also includes cable rings 630 adjacent the front 626 of the chassis 614 for managing cables leading to or away from the optical devices housed within the chassis 614.

In FIGS. 66 and 70-72, the chassis 614 is shown from a rear perspective view to illustrate a cable breakout manager 601 having features that are examples of inventive aspects in accordance with the present disclosure. The chassis 614 is shown without a cover thereof to illustrate its internal features.

The cable breakout manager 601 is configured to house transition devices or breakouts 219 that transition a first type of cables 223 coming into the chassis 614 to a second type of cables 205 that are directed to the fiber optic cassettes 660 within the chassis 614. In the depicted embodiment, the second cables 205 may be terminated with conventional MPO connectors that mate with the MPO style connectors within each cassette 660 on a blade 640 through an MPO style adapter found at the rear of each cassette 660.

It should be noted that although a cable breakout manager 601 is shown on each side of the chassis 614 in FIGS. 66-75, only one manager 601 is normally used for a given chassis 614. The figures illustrate a breakout manager 601 on both the right side 634 and the left side 636 of the chassis 614 to illustrate the various options and not an actual connectivity set up. Accordingly, the features of the chassis 614 and the breakout manager 601 will be described herein with reference to a single unit.

The chassis 614 of FIGS. 66-75 and each cable breakout manager 601 is configured such that the cable breakout manager 601 may be mounted in one of at least two orientations. In the depicted embodiment, the two orientations are 90 degrees apart. For example, the breakout manager 601 may be mounted, as shown in FIGS. 66-71, to receive first cables 223 coming in from a side 634/636 of the chassis 614. The breakout manager 601 may also be mounted, as shown in FIGS. 72-75, to receive first cables 223 coming in directly from the rear 628 of the chassis 614. Thus, the breakout manager 601 is adaptable to different routing configurations around the chassis 614.

Another aspect of the breakout manager 601 relates to its modular arrangement as will be discussed in further detail below. The breakout manager 601 is configured to provide access to individual layers of breakouts 219 associated with each blade 640 of the chassis 614 by providing removable modular elements.

Referring now to FIGS. 66-91, each cable breakout manager 601 is formed from a manager bracket or housing 603 and a plurality of trays 605 that are configured for slidable mounting to the bracket 603. The cable breakout manager 601 is shown in isolation, removed from the chassis 614, in FIGS. 76-82. The bracket 603 of the manager 601 is shown in isolation in FIGS. 83-86 and one of the trays 605 is shown in isolation in FIGS. 87-90.

Referring to FIGS. 83-86, in the depicted embodiment, the bracket 603 defines a rear wall 607, a bottom wall 609, an open top 611, an open front 613, and a pair of opposing side walls 615. It should be noted that although terms such as "rear wall" or "bottom wall" or "open front" have been used to facilitate description of the various aspects of the breakout manager 601, no orientation is implied by the use of these terms. As noted above, the breakout manager 601 may be mounted in various different orientations within the chassis 614, and, depending upon the orientation, the "rear wall" may in fact be positioned at a "side" of the chassis 614.

Still referring to FIGS. 83-86, each of the opposing sidewalls 615 includes slots 617 therein that define individual slide portions 619 for the bracket 603. As will be noted in further detail, the slide portions 619 are configured to slidably receive the individual trays 605 of the breakout manager 601. In the depicted embodiment, the bracket 603 includes four slots 617, each one defined by upper and lower slide portions 619 for receiving the trays 605. The four slots 617 correspond to the four levels of blades 640 provided on the chassis 614.

One of the trays 605 for housing the breakouts 219 is shown in isolation in FIGS. 87-90. Each tray 605 defines a first end 621 and a second end 623 and opposing closed sides 625 that extend between the first and second ends 621, 623.

Each of the opposing closed sides 625 includes a catch 627 with a ramped tab 629. The catch 627 is configured to latch into one of the latch openings 631 that are provided on the rear wall 607 of the manager bracket 603 when the tray 605 is slidably loaded thereinto. The catch 627 is inserted through the latch opening 631 and the tab 629 catches against the rear wall 607 of the bracket 603. When a tray 605 needs to be removed, the catch 627 may be lifted to clear the latch opening 631. In certain embodiments, the catch 627 may be elastically flexible and may be lifted elastically to clear the latch opening 631.

It should be noted that each of the closed sides 625 includes a catch 627 such that the trays 605 can be loaded into the manager bracket 603 in either orientation depending upon which side of the chassis 614 the manager 601 is mounted on.

At the first and second ends 621, 623, the tray 605 defines upper and lower slide grooves 633. The slide grooves 633 are configured to slidably receive the slide portions 619 defined by the side walls 615 of the manager bracket 603 when the trays 605 are being loaded thereinto.

At the first end 621, the tray 605 also defines a first set of retention fingers 635 with retention tabs 637. At the second end 623, the tray 605 defines a second set of retention fingers 639 with retention tabs 641. As shown for the depicted embodiment, the first set of retention fingers 635 are spaced apart further than the second set of retention fingers 639 and are configured to receive a larger diameter incoming cable 223. The second set of retention fingers 639 are spaced for accommodating a smaller diameter cable 205 that may be directed to the fiber optic cassettes 660 of the chassis 614.

Figure 92:
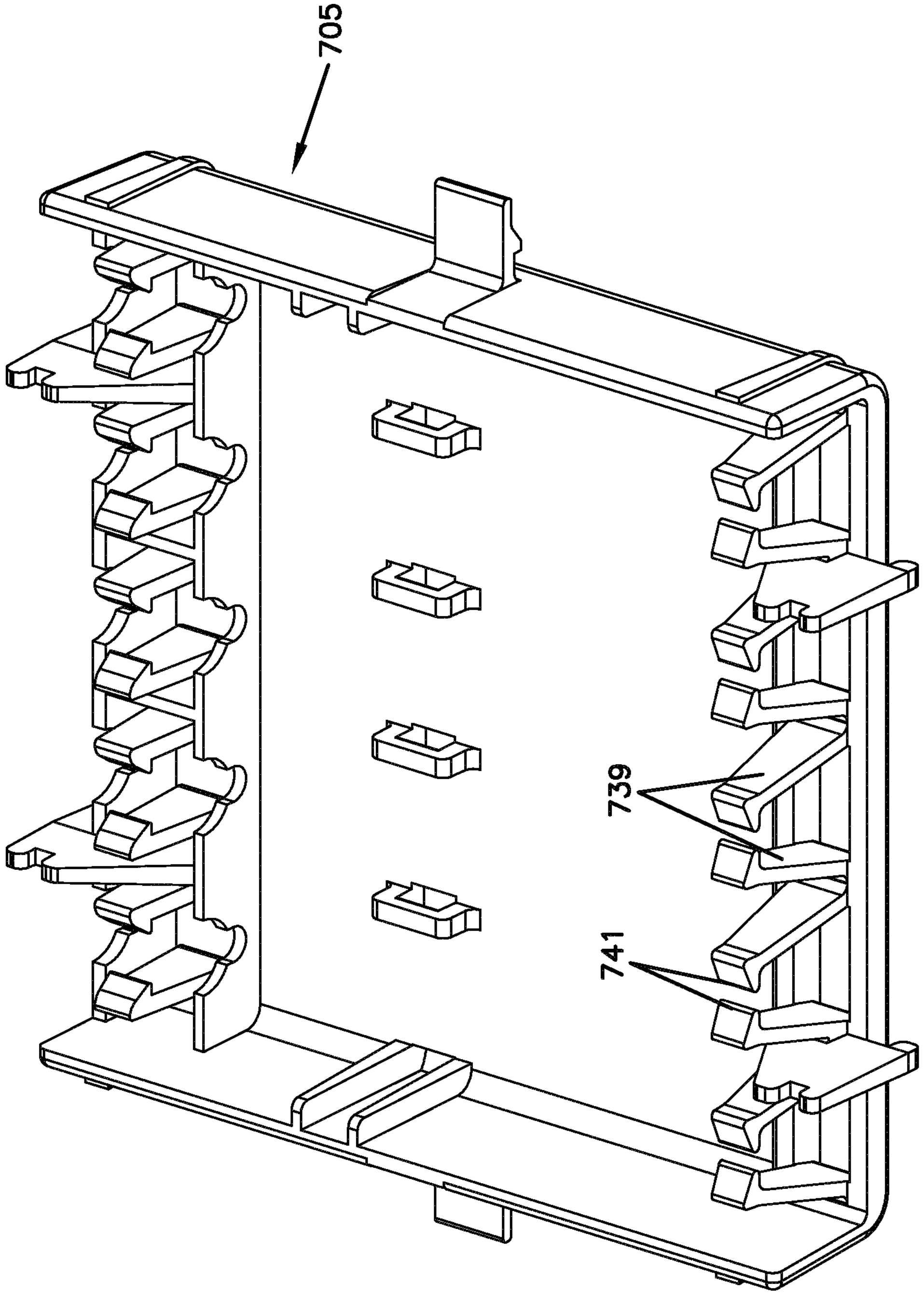
FIG. 92 is a perspective view of another embodiment of a tray that can be used on a cable breakout manager similar to the manager of FIGS. 76-81.

It should be noted that in other embodiments of the trays, the second set of retention fingers with the retention tabs may be configured to accommodate a variety of different cable sizes (e.g., both a smaller diameter cable or a large diameter cable that is directed to the fiber optic cassettes of the chassis). For example, referring to FIG. 92, a perspective view of another embodiment of a tray 705 that can be used on a cable breakout manager similar to the manager 601 of FIGS. 76-81 is illustrated. The tray 705 includes a second set of retention fingers 739 that extend upwardly at a taper, where the retention fingers 739 get closer to each other as they extend upwardly instead of straight vertically upwardly as provided in the fingers 639. In this manner, the retention fingers 739 can elastically accommodate not only smaller cables that fit under retention tabs 741 but also larger cables which may be placed further toward the base of the retention fingers 739.

Referring back to the example of FIGS. 87-90, the first and second retention fingers 635, 639 are configured to elastically flex apart in receiving the cables 223, 205, respectively, from an open top 643 of the tray 605, with the tabs 637, 641 retaining the cables 223, 205, and, thus the breakouts 219, within the trays 605.

With the use of the retention fingers 635, 639, cables at either end of the individual breakouts 219 are fixed and managed without the use of conventional cable-ties/tie-wraps.

A pocket 645 is formed between each of the first set and second set of retention fingers 635, 639 within the tray 605 for accommodating the breakouts 219. In the depicted example, each tray 605 may define five pockets 645 for receiving five breakouts 219, one for each cassette 660 on a blade 640.

Although the first and second retention fingers 635, 639 hold the cables 223, 205 in place, each tray 605 can also trap the breakout 219 directly below it to retain it in place. In the top tray 605, the top breakout 219 can be trapped by the cover of the chassis 614.

Figure 82:
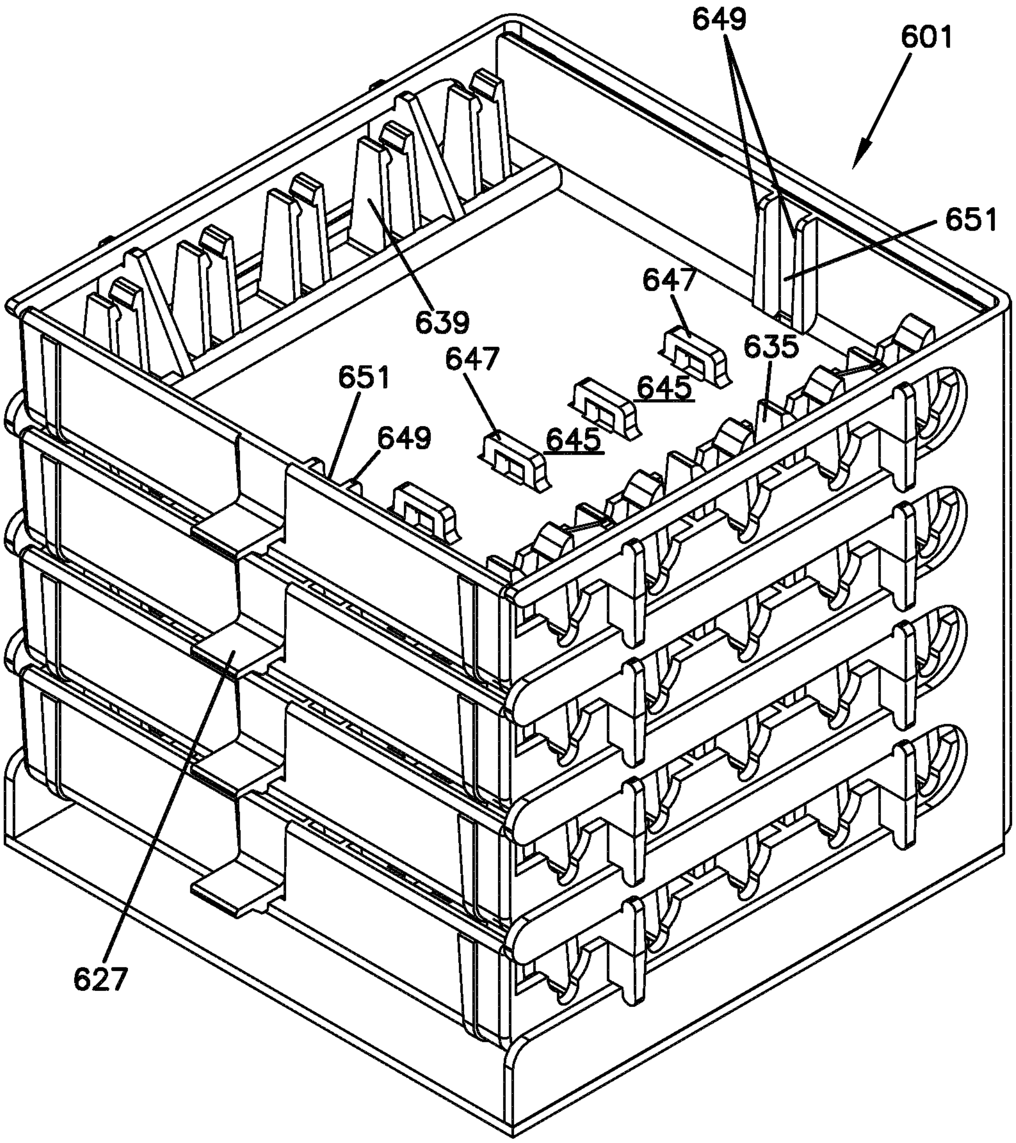
FIG. 82 illustrates the cable breakout manager of FIGS. 76-81 with the breakouts/transition devices removed from the manager.
Figure 84:
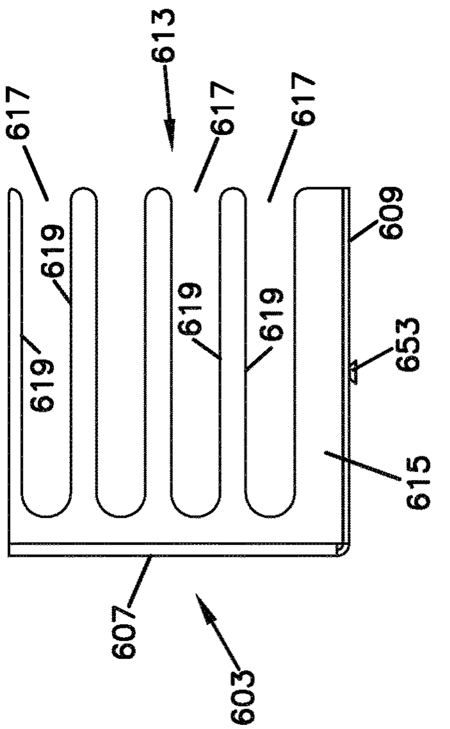
FIG. 84 is a side view of the bracket/housing of FIG. 83.
Figure 86:
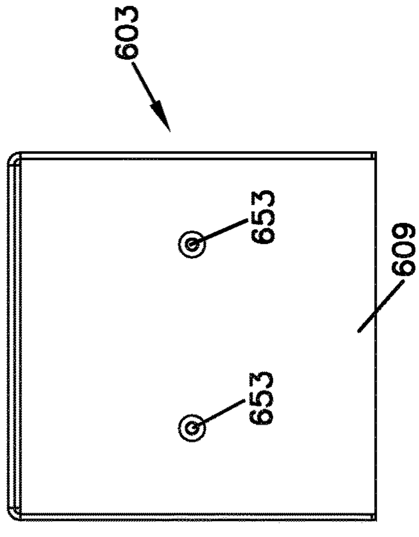
FIG. 86 is a bottom view of the bracket/housing of FIG. 83.
Figure 83:
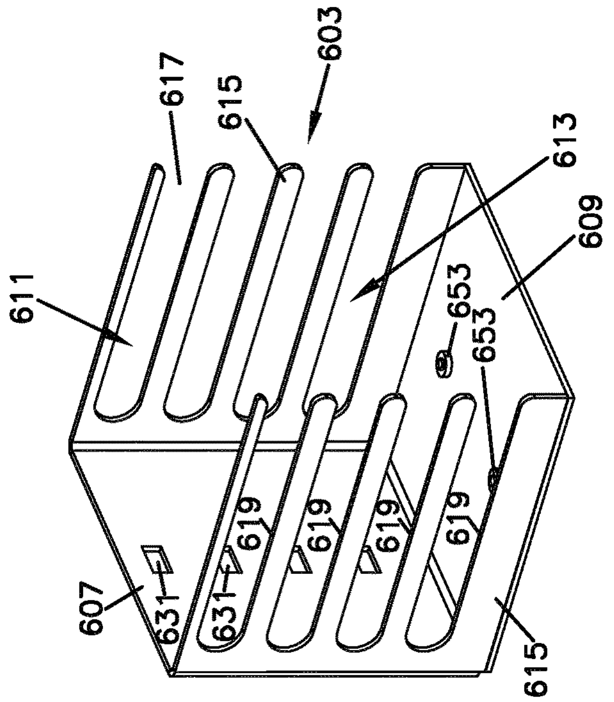
FIG. 83 is a perspective view of the bracket/housing of the cable breakout manager shown in isolation with all of the trays removed therefrom.
Figure 85:
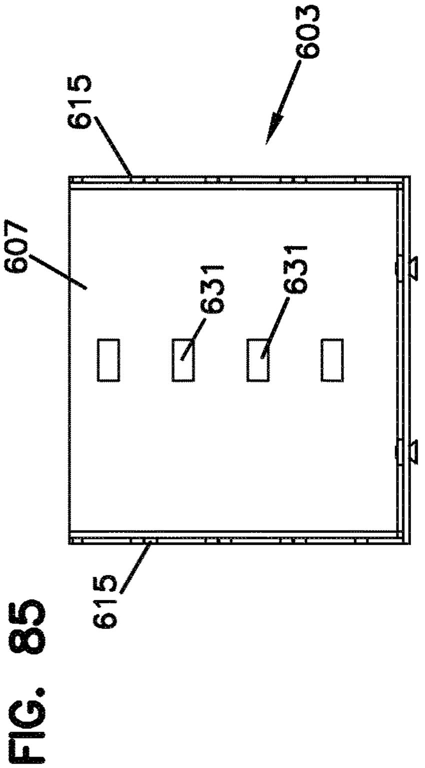
FIG. 85 is a front view of the bracket/housing of FIG. 83.
Figure 90:
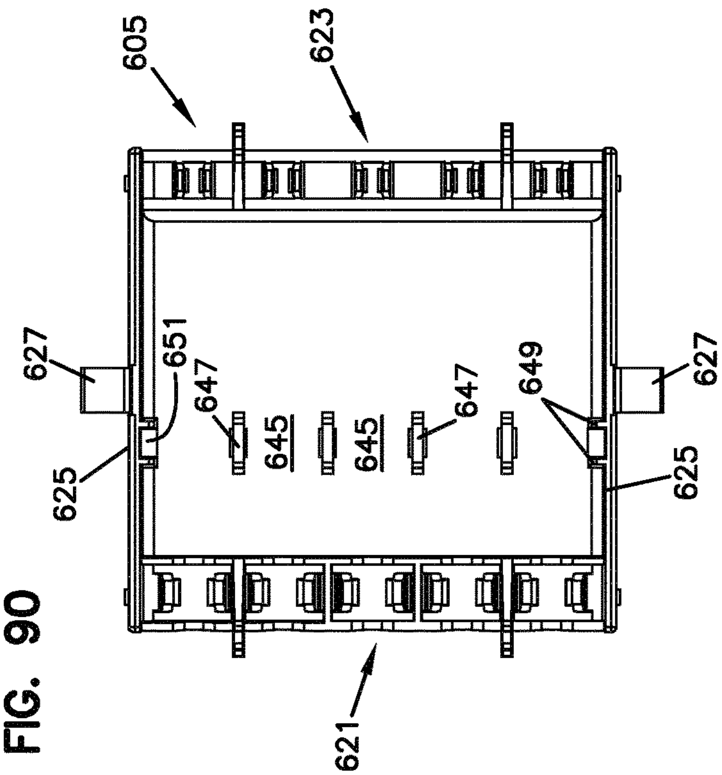
FIG. 90 is a top view of the tray of FIG. 87.

As shown in FIGS. 82 and 90, between each pocket 645, the tray 605 may also define a tie-loop 647 separating the pockets 645. The tie-loops 647 are for receiving cable ties. The tie-loops 647 provide an alternative or additional solution to fixing the cables 223, 205 with respect to the trays 605.

Figure 87:
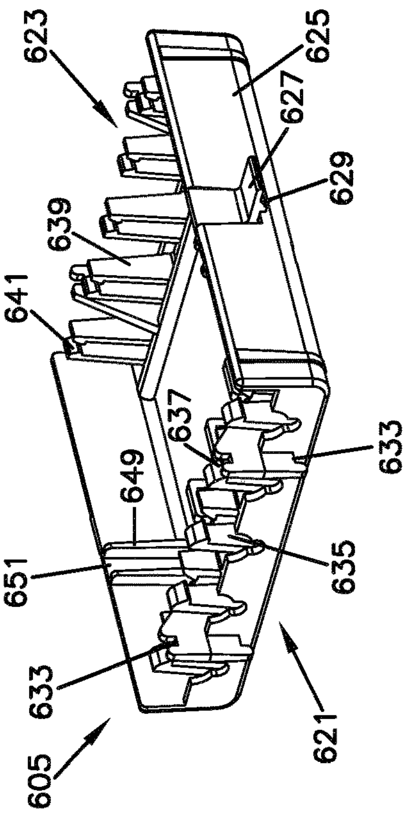
FIG. 87 is a perspective view of one of the trays of the cable breakout manager shown in isolation, removed from the bracket/housing of the manager.
Figure 88:
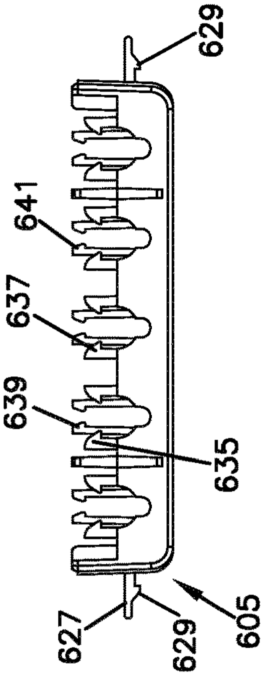
FIG. 88 is an end view of the tray of FIG. 87.
Figure 89:
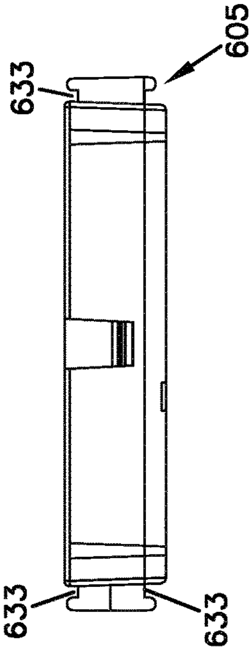
FIG. 89 is a side view of the tray of FIG. 87.

As also shown in FIGS. 82, 87, and 90, a pair of spacers 649 is positioned at each of the opposing sides 625 of the tray 605. The spacers 649 are configured to space the breakouts 219 from the closed sides 625. The spacers 649 cooperatively define a tie-pocket 651 for accommodating a cable tie that may be used in fixing cables 223, 205 using the tie-loops 647 within the tray 605.

As noted above, each cable breakout manager 601 may be mounted to the chassis 614 in one of at least two orientations. In the depicted embodiment, the two orientations are 90 degrees apart. The breakout manager 601 may be mounted, as shown in FIGS. 66-71, to receive first cables 223 incoming from a side of the chassis 614. The breakout manager 601 may also be mounted, as shown in FIGS. 72-75, to receive first cables 223 incoming directly from a rear 628 of the chassis.

When the cable manager 601 is mounted in a "side-entry" orientation as shown in FIGS. 66-71, the trays 605 may be slidably loaded or removed along a front to back direction. When the cable manager 601 is mounted in a "rear-entry" orientation as shown in FIGS. 72-75, the trays 605 may be slidably loaded or removed along a right to left direction.

With the manager 601 of the present disclosure, each tray 605 that corresponds to a desired blade 640 may be individually removed and each breakout 219 that corresponds to a desired cassette 660 may be individually removed for servicing.

For mounting the cable breakout managers 601 in the different orientations, the bracket or housing 603 of each manager 601 defines fastener mounts 653 at the bottom wall 609. Fasteners 655 are inserted through the fastener mounts 653 in mounting the manager 601 to a rear portion 657 of the chassis 614.

Figure 91:
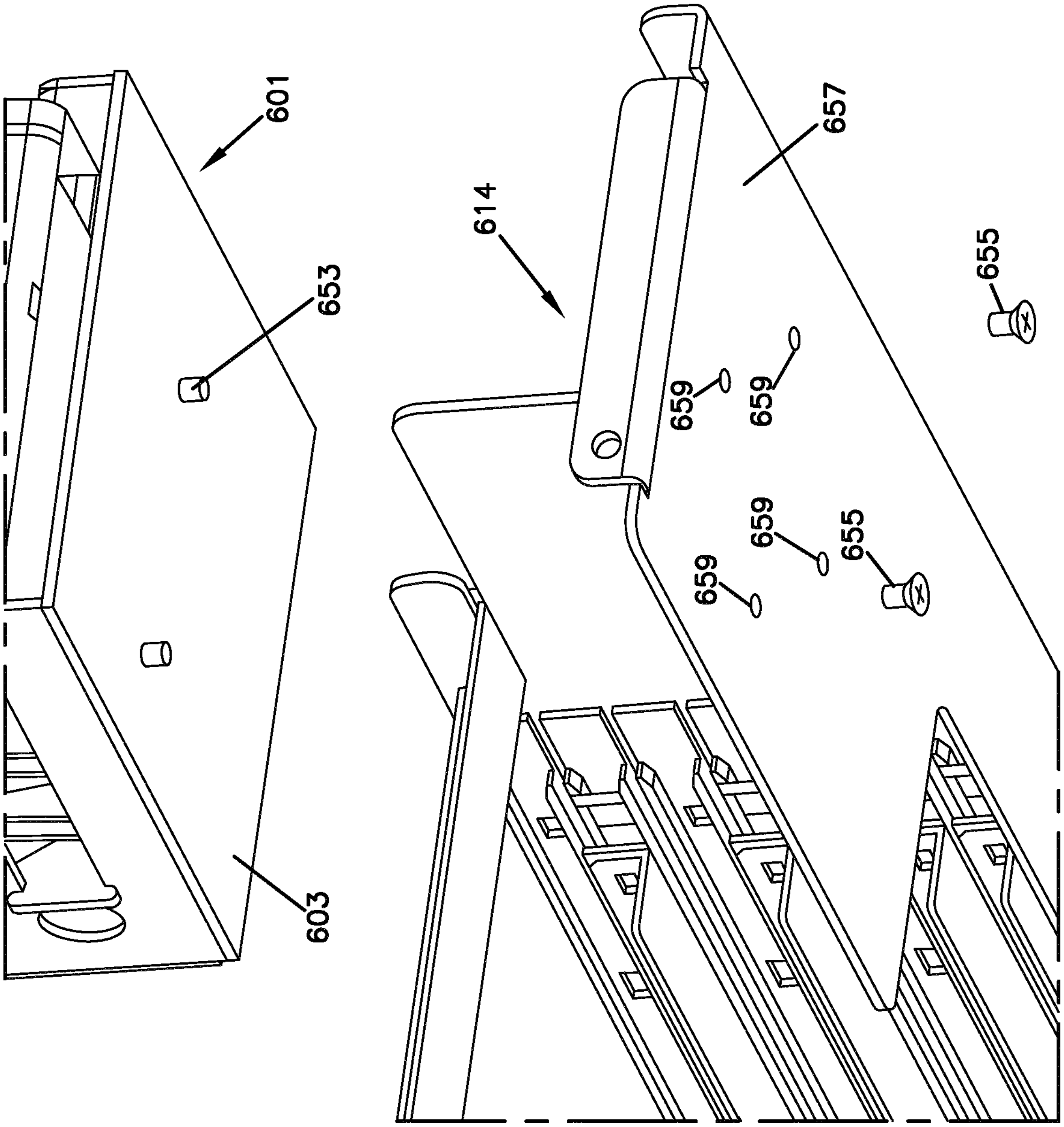
FIG. 91 shows the cable breakout manager exploded from the chassis of FIGS. 66-75, illustrating the mounting of the cable breakout manager to a rear portion of the chassis.

As shown in FIG. 91, the rear portion 657 of the chassis 614 is configured with two sets of mounting openings 659, one for each of the two 90-degree orientations. Depending upon the desired orientation, the breakout manager 601 is turned accordingly and one of the two sets of mounting openings 659 is used in combination with the fastener mounts 653 at the bottom wall 609 of the manager housing 603 in mounting the manager 601 to the chassis 614.

It should be noted that although the depicted cable breakout manager 601 has been shown and described to be mountable in at least two different orientations 90 degrees apart, wherein the orientations correspond to "side entry" and "rear entry" of the cables, in other embodiments, the cable breakout manager 601 can be mounted at any desired angle with respect to the chassis 614.

Thus, the breakout manager 601 of the present disclosure is configured for servicing high density environments such as the described chassis 614 of the present disclosure. The breakout manager 601 allows rear or side entry of cables and allows access to individual layers of breakouts. The breakout manager 601 also provides solutions that are an alternative or in addition to conventional cable ties used for retaining cables.

It should be noted that although the breakout manager 601 has been described with respect to housing fiber optic transition devices or breakouts 219, in other embodiments, the breakout manager may be used to manage electrical/copper or hybrid cables and corresponding transition devices.

Figure 66:
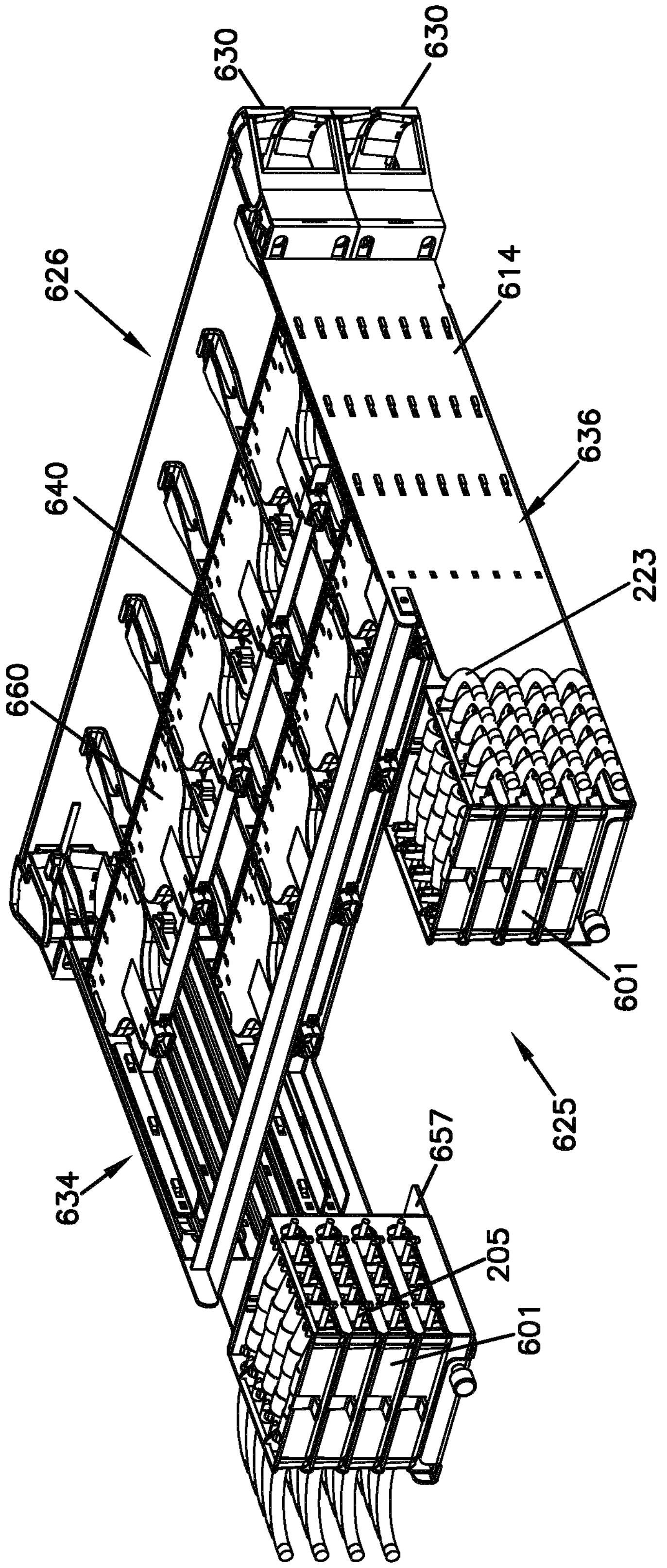
FIG. 66 illustrates another embodiment of a telecommunications chassis having features similar to the telecommunications chassis of FIG. 1 and the telecommunications chassis of FIG. 52, the telecommunications chassis shown from a rear perspective view to illustrate a cable breakout manager having features that are examples of inventive aspects in accordance with the present disclosure.
Figure 67:
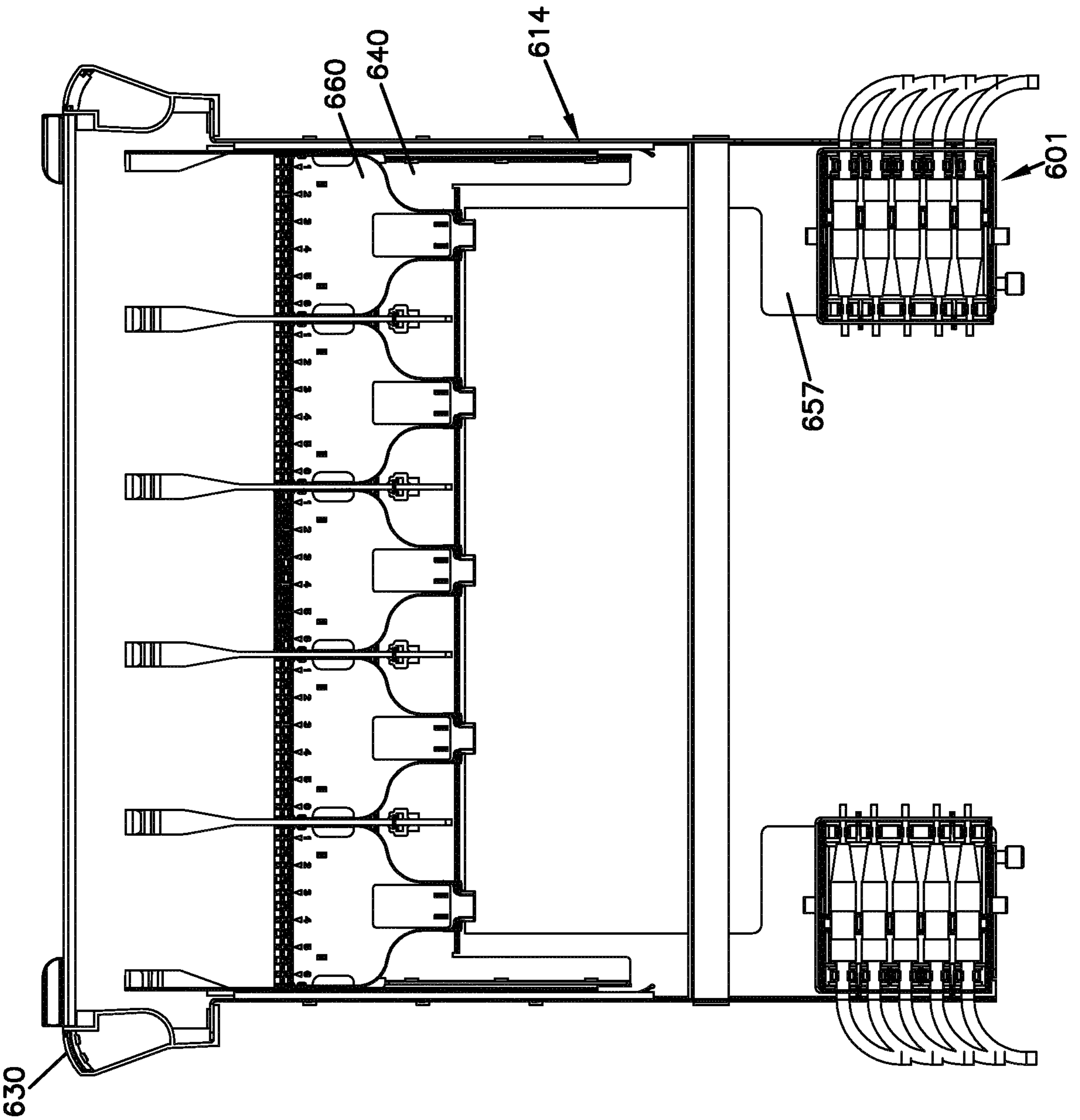
FIG. 67 is a top view of the telecommunications chassis of FIG. 66.
Figure 68:
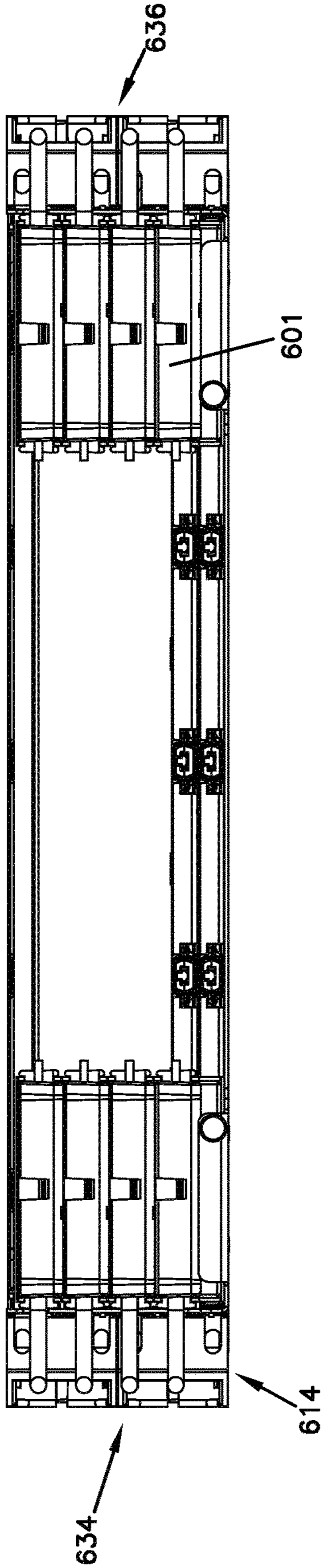
FIG. 68 is a rear view of the telecommunications chassis of FIG. 66.
Figure 69:
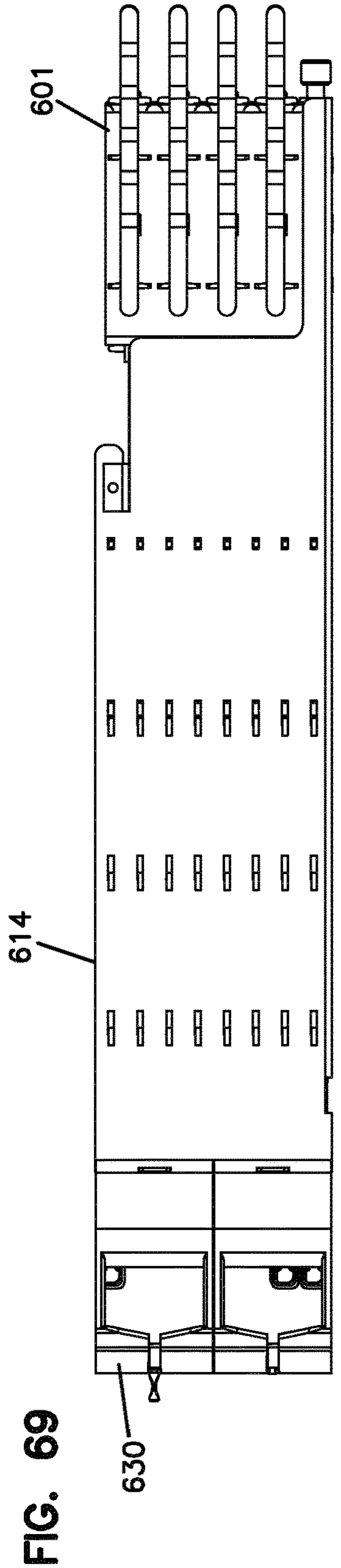
FIG. 69 is a right side view of the telecommunications chassis of FIG. 66.
Figure 70:
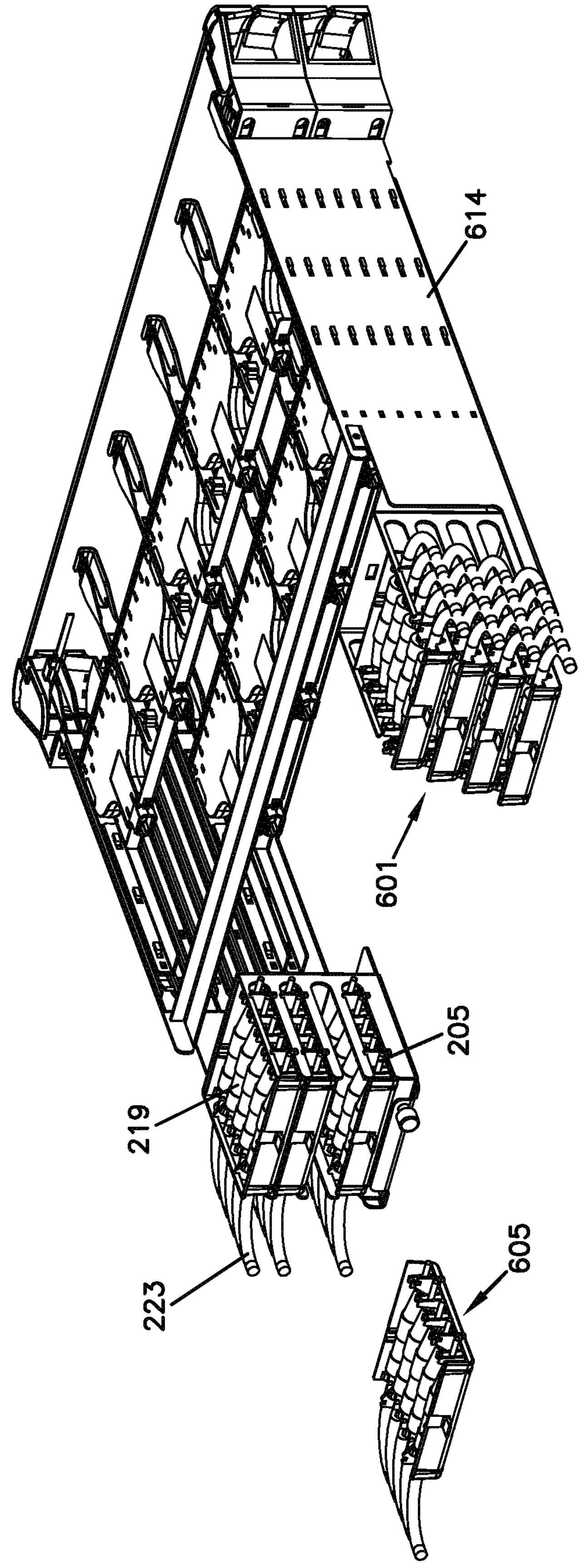
FIG. 70 illustrates the telecommunications chassis of FIG. 66 with a number of the trays of the cable breakout manager exploded off the manager.
Figure 71:
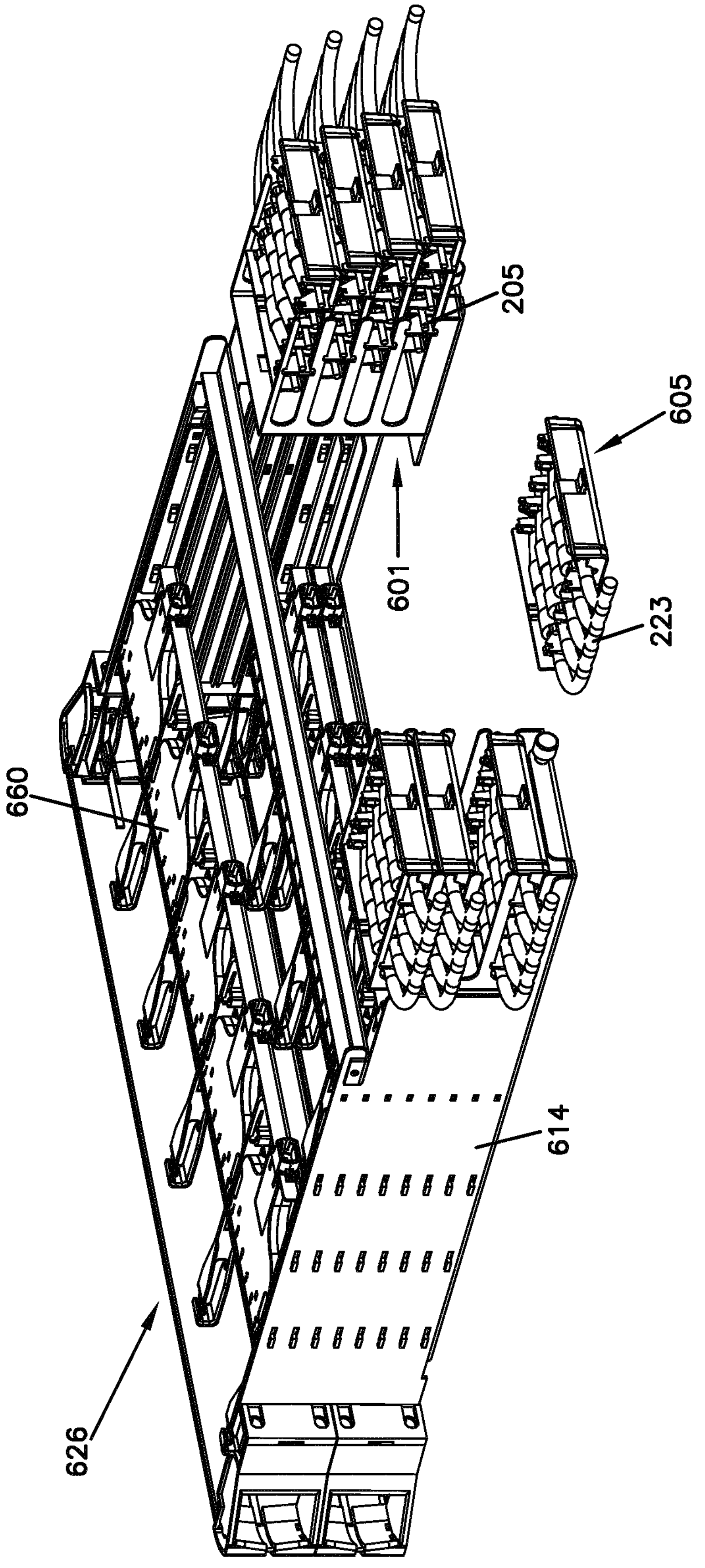
FIG. 71 illustrates the telecommunications chassis of FIG. 70 from a rear, right side, top perspective view.
Figure 72:
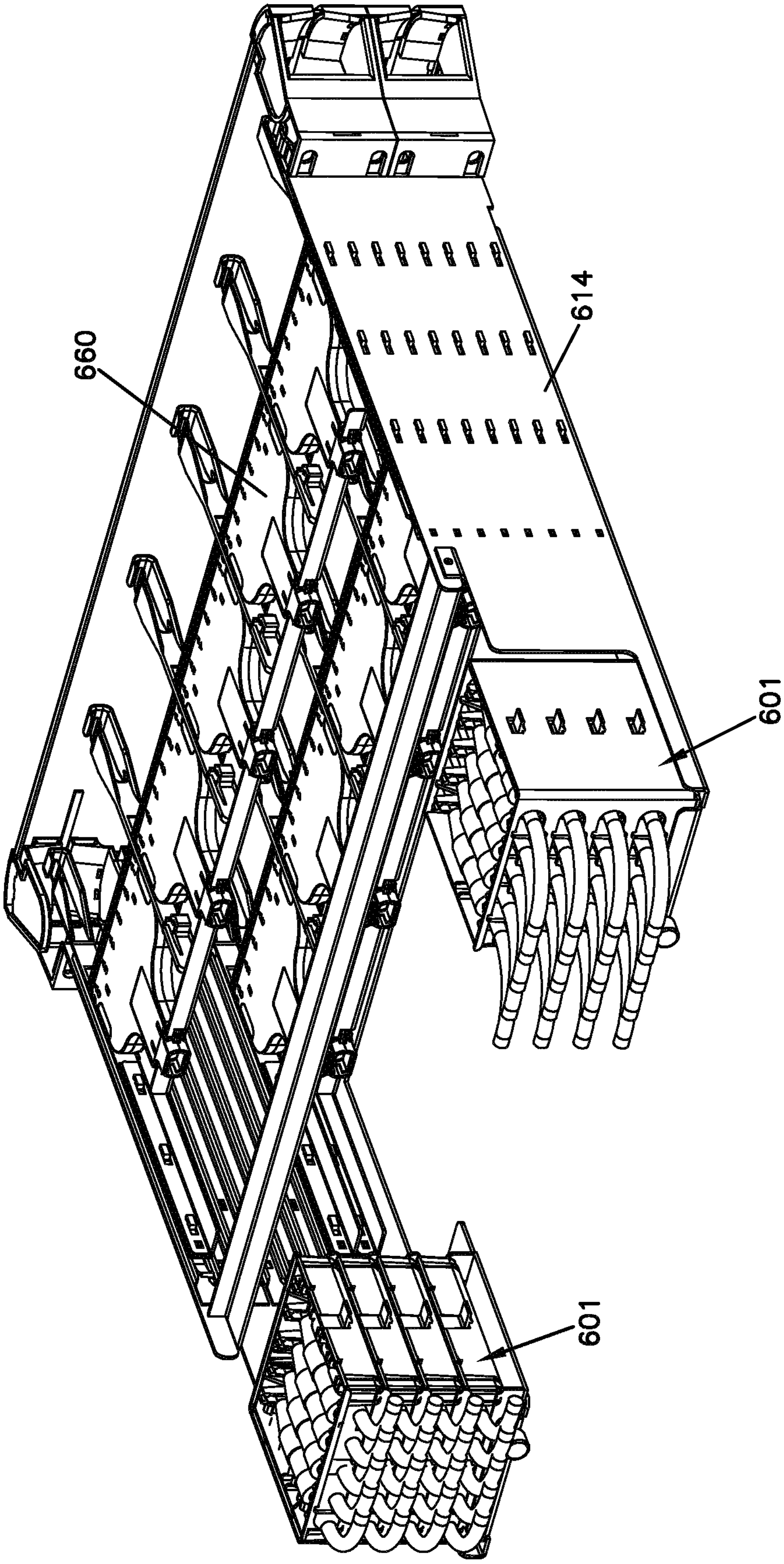
FIG. 72 illustrates the telecommunications chassis of FIG. 66 with the cable breakout managers mounted in another orientation, wherein each cable breakout manager is mounted for receiving incoming cables from a rear of the chassis.
Figure 73:
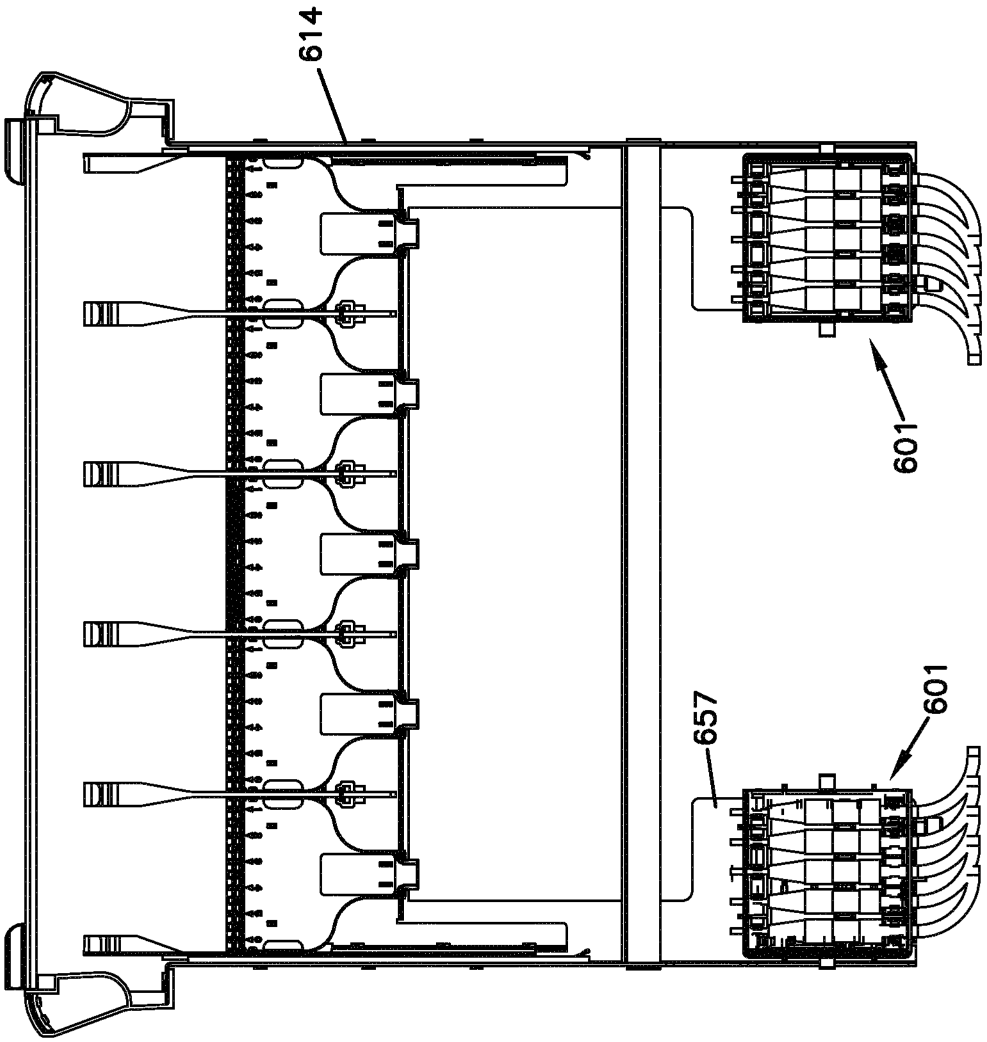
FIG. 73 is a top view of the telecommunications chassis of FIG. 72.
Figure 74:
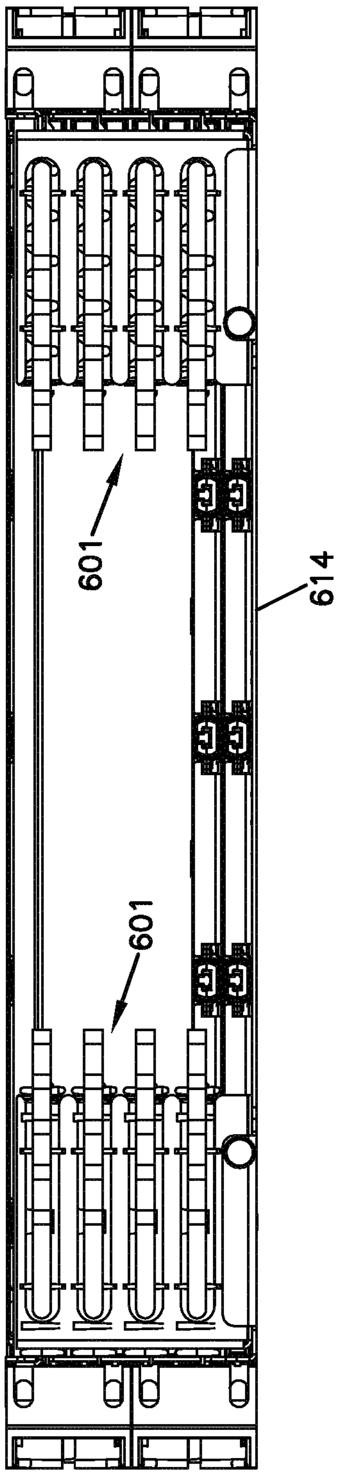
FIG. 74 is a rear view of the telecommunications chassis of FIG. 72.
Figure 75:
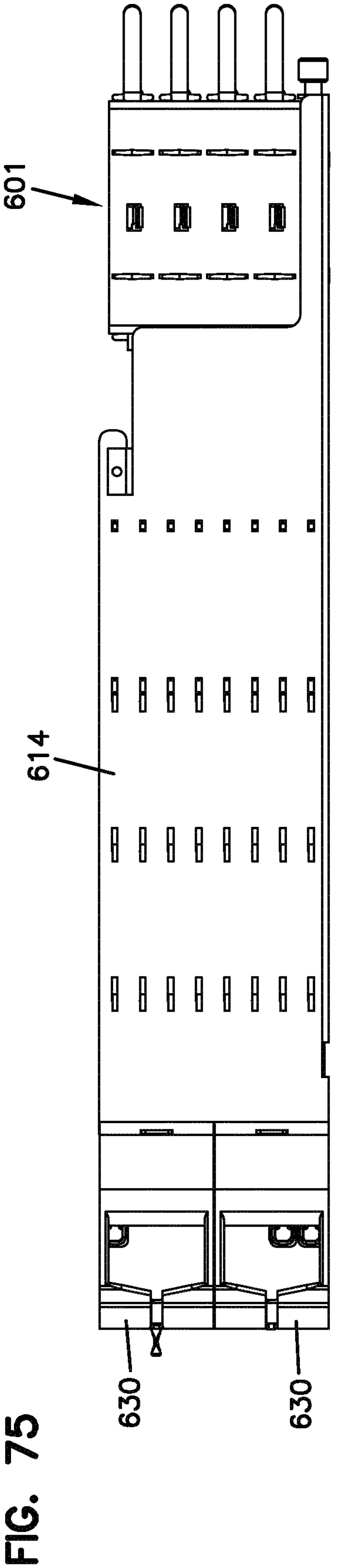
FIG. 75 is a right side view of the telecommunications chassis of FIG. 72.
Figure 76:
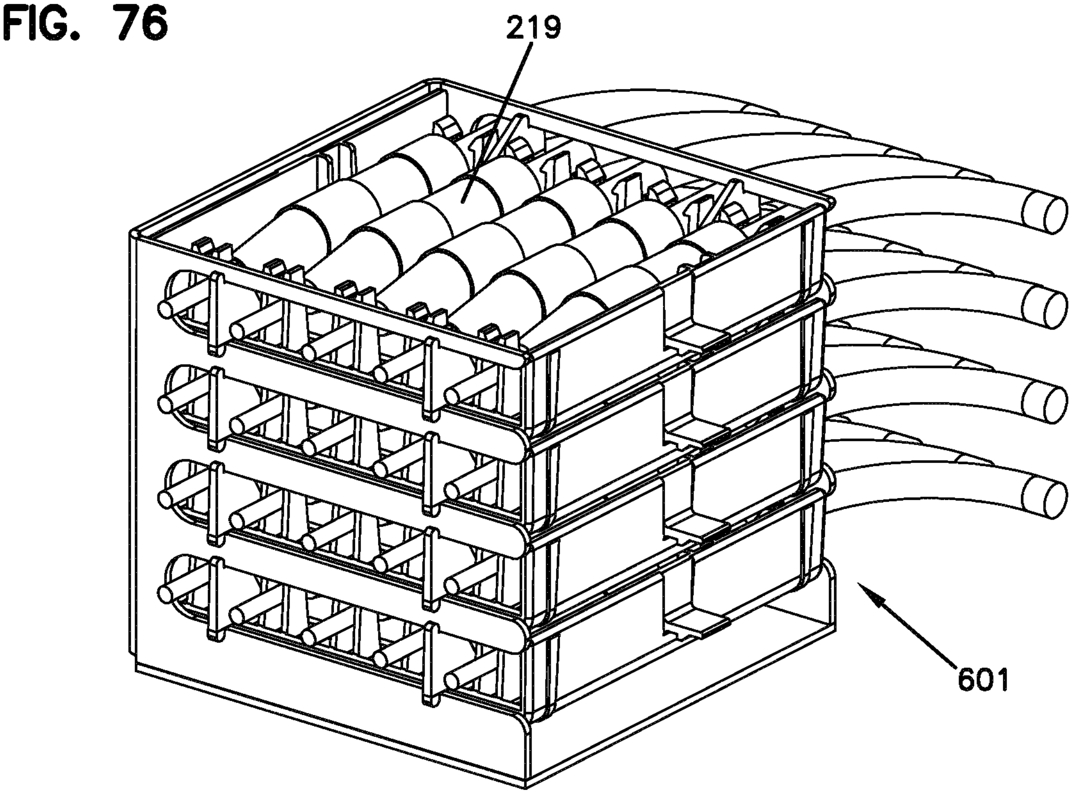
FIG. 76 illustrates the cable breakout manager of FIGS. 66-75 in isolation removed from the chassis.
Figure 77:
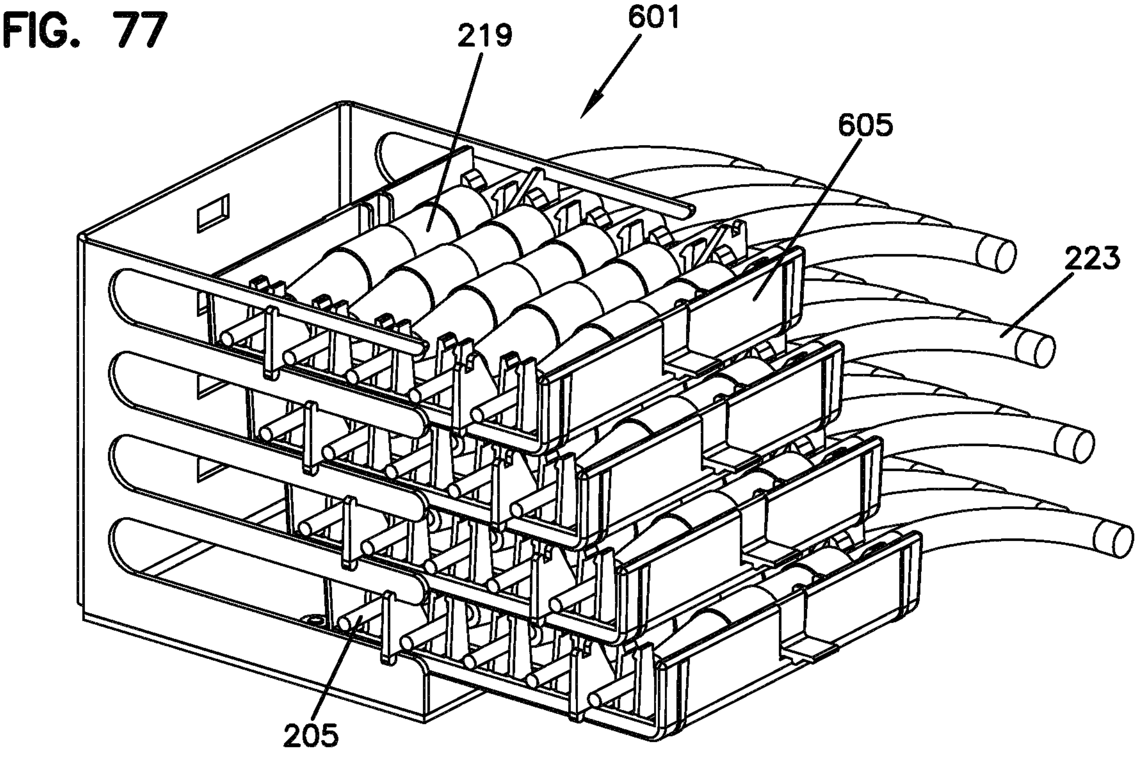
FIG. 77 shows the cable breakout manager of FIG. 76 with the trays thereof partially removed from the housing of the manager.
Figure 78:
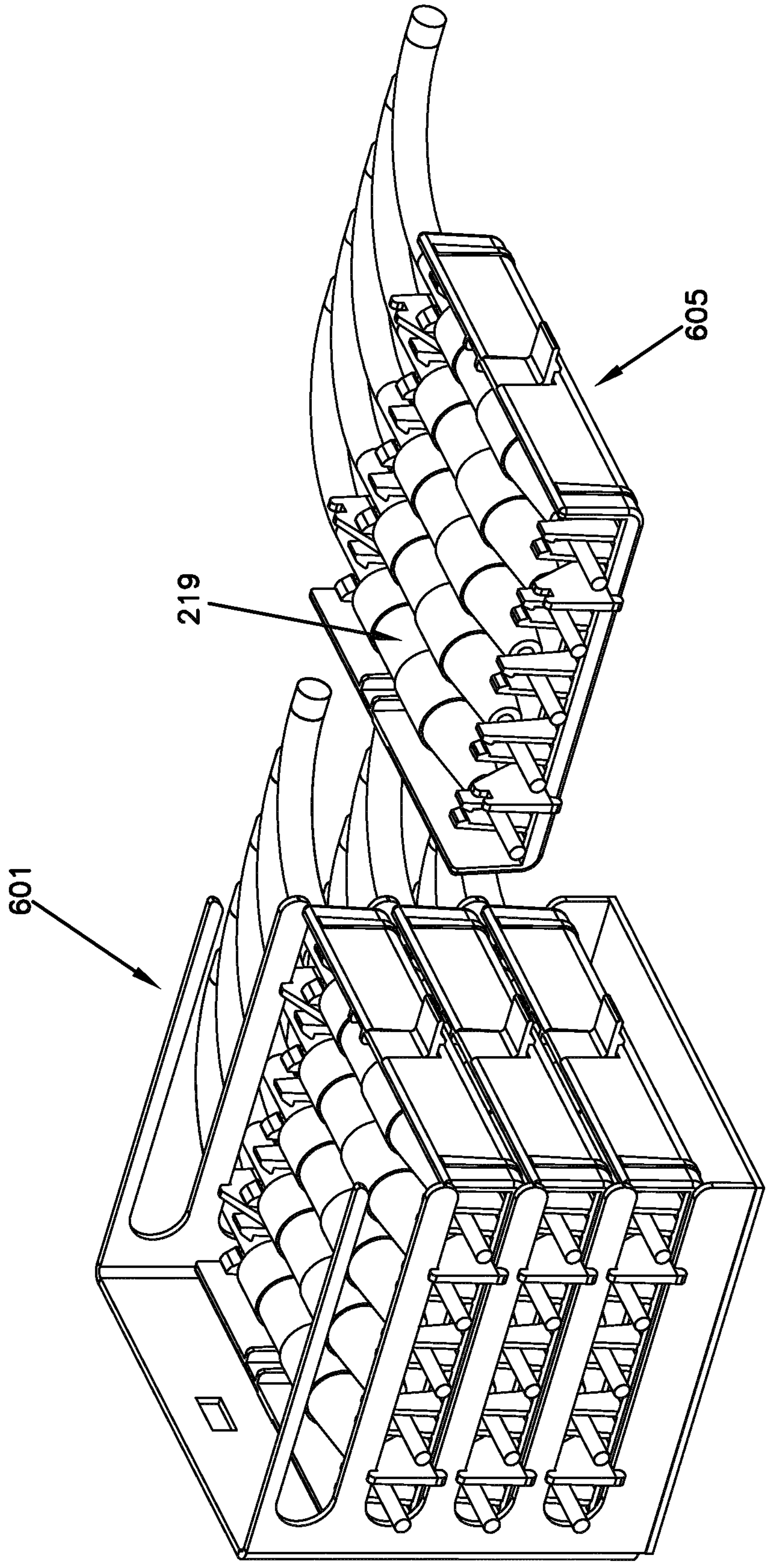
FIG. 78 shows the cable manager of FIG. 76 with one of the trays fully removed from the housing of the manager.
Figure 79:
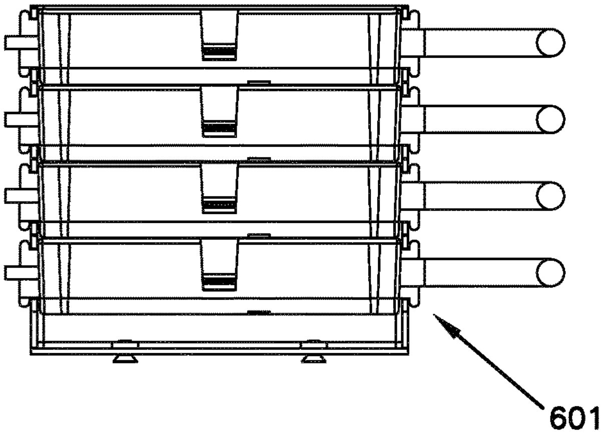
FIG. 79 is a front view of the cable breakout manager of FIG. 76.
Figure 80:
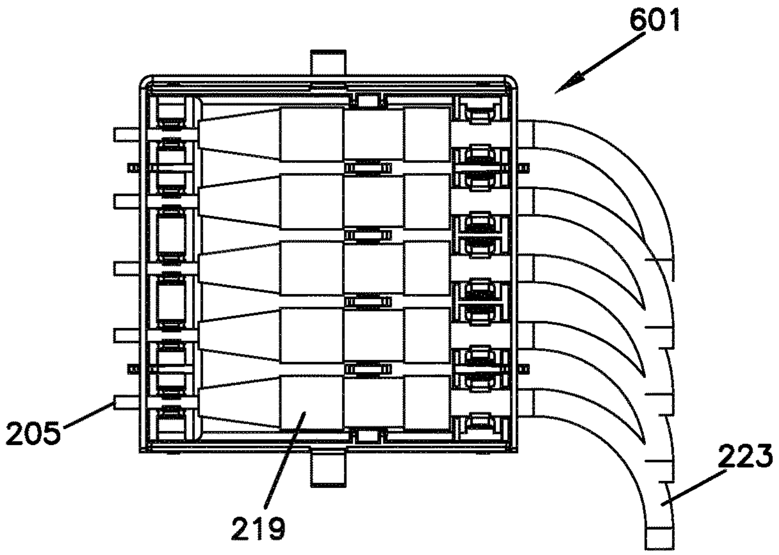
FIG. 80 is a top view of the cable breakout manager of FIG. 76.
Figure 81:
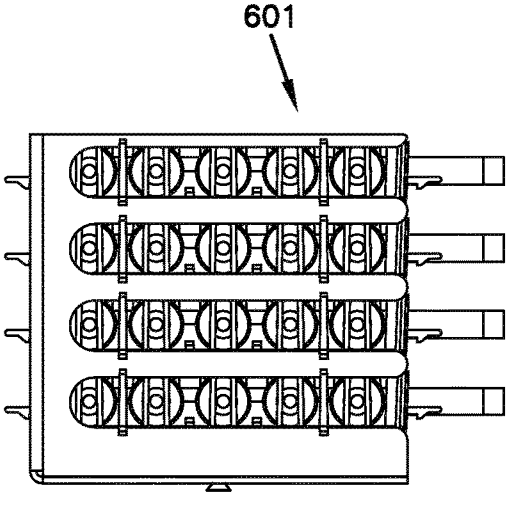
FIG. 81 is a side view of the cable breakout manager of FIG. 76.
Figure 93:
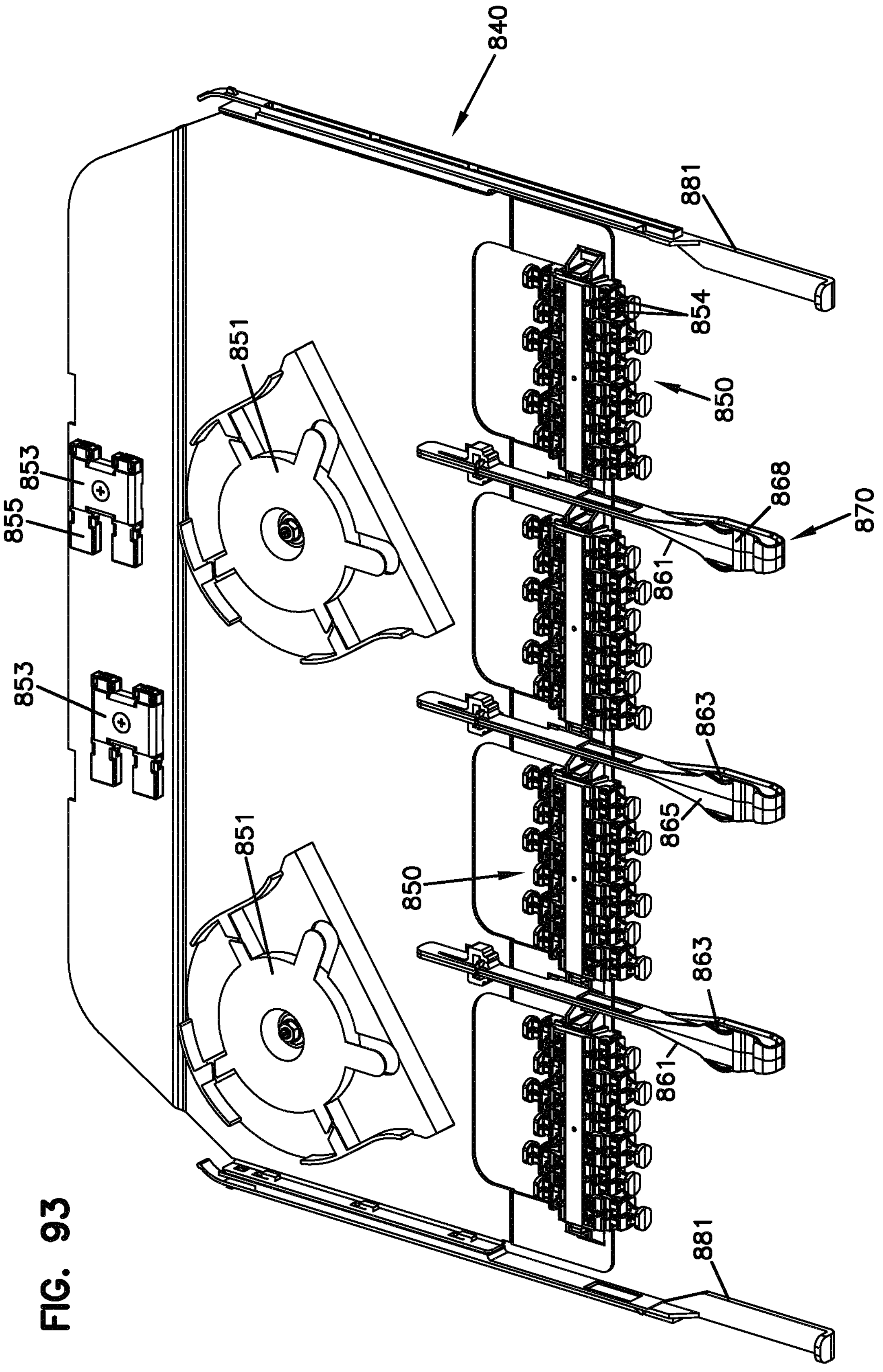
FIG. 93 illustrates another embodiment of a slidable blade that is configured to be mounted on a telecommunications chassis such as the chassis of FIG. 1, the chassis of FIG. 52, or the chassis of FIG. 66, the slidable blade having features that are examples of inventive aspects in accordance with the present disclosure.
Figure 94:
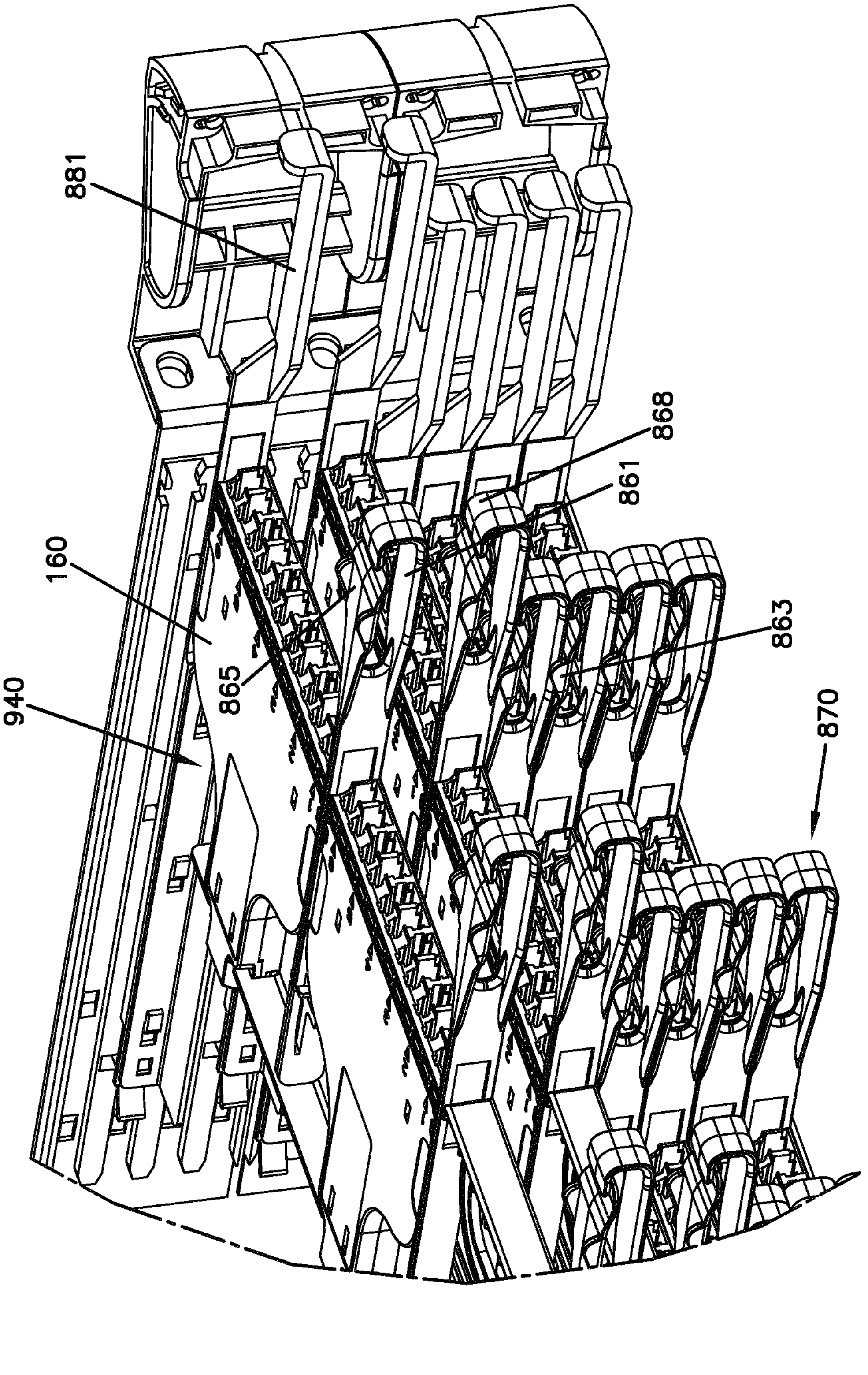
FIG. 94 illustrates a partial view of a telecommunications chassis that is shown with a plurality of blades similar to the blade of FIG. 93, the blades shown with fiber optic cassettes including LC type adapter openings instead of the staggered LC type fiber optic adapter blocks of the blade of FIG. 93.

Referring now to FIGS. 93-94, a couple of different embodiments of slidable blades 840, 940 that may be mounted on a telecommunications chassis such as the chassis 14 of FIG. 1, the chassis 214 of FIG. 52, or the chassis 614 of FIG. 66 are shown. The blades 840, 940 of FIGS. 93 and 94 share certain features that will be discussed below in detail. Regarding the differences between the blades 840, 940, the blade 840 shown in FIG. 93 includes LC style adapter blocks 850 with the adapters 854 mounted in a staggered configuration, whereas the blades 940 shown in FIG. 94 include fiber optic cassettes 160 with LC type adapter openings instead of the staggered LC type fiber optic adapters 854 of the blade 840 of FIG. 93. Fiber optic adapter blocks including staggered adapter configurations such as the blocks 850 are described and illustrated in further detail in U.S. patent application Ser. No. 14/658,111, filed Jan. 9, 2013, which application is incorporated herein by reference in its entirety.

The blade 840 illustrated in FIG. 93 also includes a pair of overlength cable managers 851 toward the rear of the blade 840 as well as a pair of fanout brackets 853 configured to hold fanouts 855. Similar types of cable management structures or fiber optic equipment may be included in the blade 940 of FIG. 94. However, the blade 940 shown in FIG. 94 may utilize a cable breakout manager similar to the breakout manager 601 of FIGS. 76-81 located on the chassis.

Figure 95:
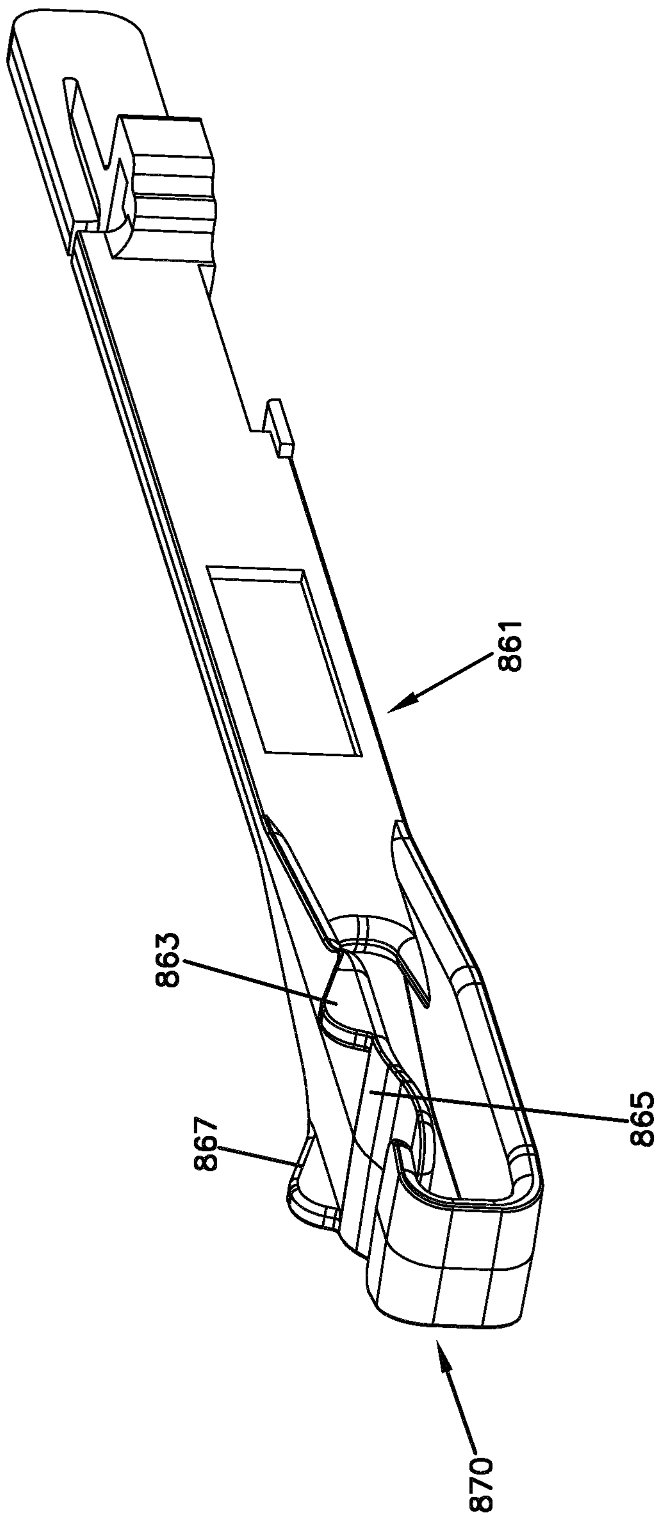
FIG. 95 is a front perspective view of one of the cable managers used on the slidable blades shown in FIGS. 93-94, the cable manager having features that are examples of inventive aspects in accordance with the present disclosure.

Regarding features that are shared by the blades 840, 940 of FIG. 93 and FIG. 94, both of these blades 840, 940 are shown to use cable managers 861 located between each fiber optic cassette 160 or each staggered adapter block 850 that have alignment tabs 863 at the wider portions 868 at the front ends 870 of the cable managers 861. The alignment tabs 863 are provided at the flexible portions 865 of the cable managers 861 that define the wider portions 868 at the front ends 870. The alignment tabs 863 of each cable manager 861 are configured to abut the cable managers 861 thereabove and keep the cable managers 861 vertically aligned from top to bottom at the front of the chassis. One of the cable managers 861 with the alignment tabs 863 are shown in isolation in FIG. 95. As shown in FIG. 95, each alignment tab 863 defines a ramped profile 867 toward the rear 869 of the tab 863. The ramped profile 867 is provided so that a blade with these types of cable managers 861 can be pulled rearwardly within a chassis, wherein the ramped portion 867 of the tab 863 can abut a blade 840/940 thereabove and cause the flexible portion 865 of the cable manager 861 to flex downwardly to clear the blade 840/940 thereabove. These types of cable managers 861 may be implemented on all of the different embodiments of blades discussed previously.

Another feature shared between the blades 840, 940 of FIGS. 93 and 94, and that can be used on all of the different blades discussed previously, relates to the cable managers 881 that are configured to be used at the outer edges of the slidable blades 840, 940 shown in FIGS. 93-94.

Figure 96:
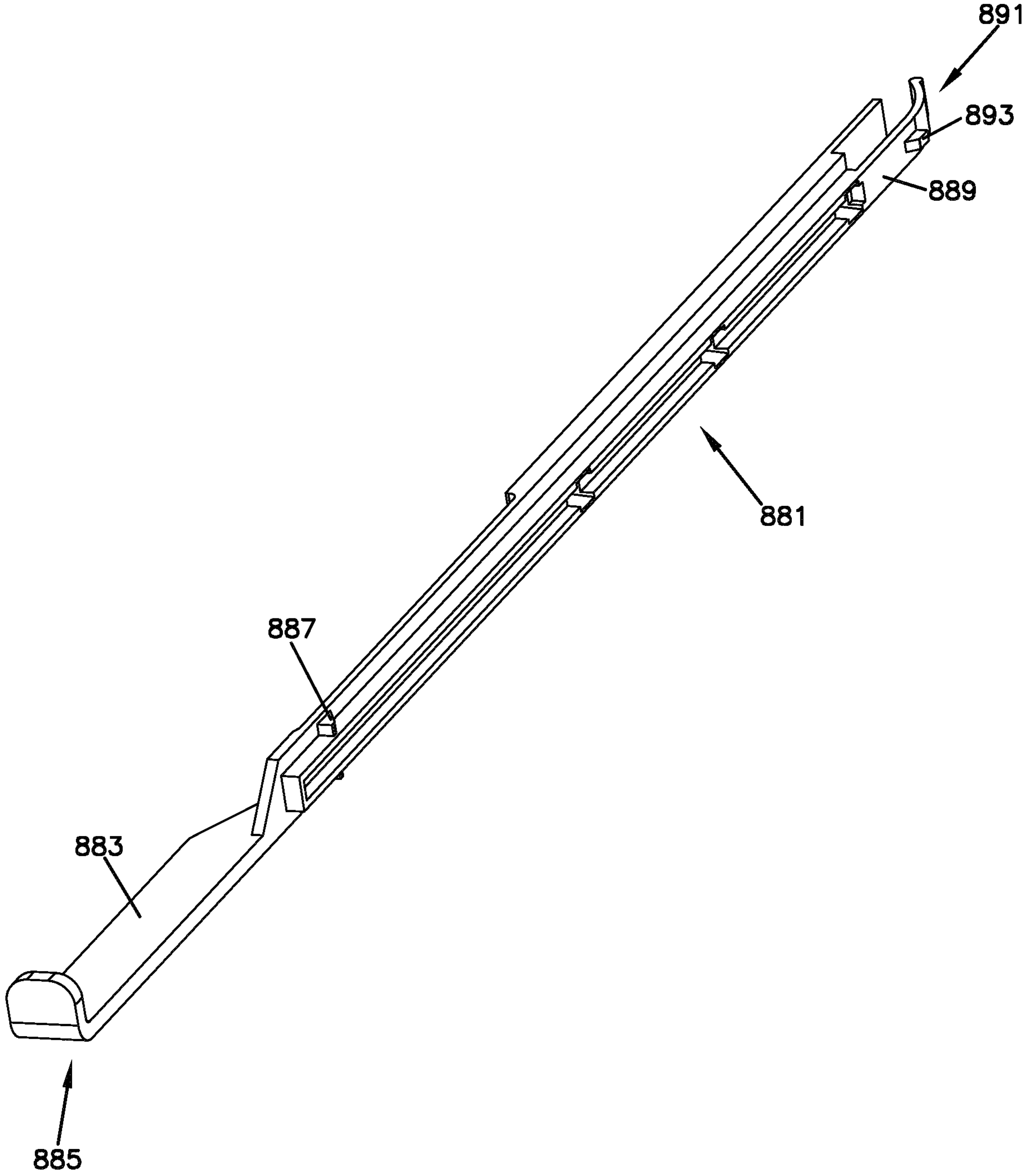
FIG. 96 is a right side perspective view of a cable manager that is configured to be used at the outer edges of the slidable blades shown in FIGS. 93-94.
Figure 97:
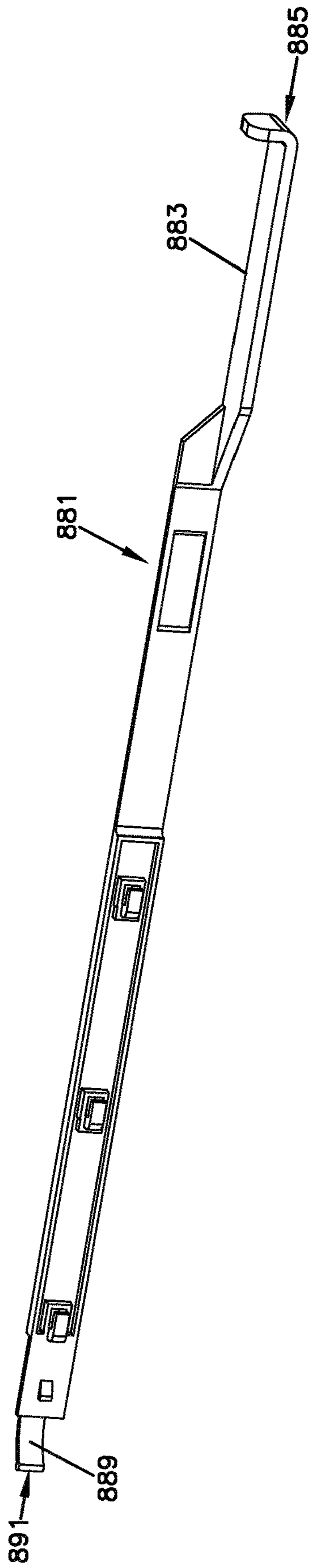
FIG. 97 is a left perspective view of the cable manager of FIG. 96.

FIG. 96 is a right side perspective view of a cable manager 881 that is configured to be used at the outer edges of the slidable blades 840, 940 shown in FIGS. 93-94 and FIG. 97 is a left perspective view of the cable manager 881.

The cable managers 881 used at the outer edges of the slidable blades 840, 940 are configured differently than the cable managers 861 that are positioned between the cassettes 160 or the adapter blocks 850. The cable managers 881, unlike the split-ring configurations defined by the center cable managers 861, define an open and a longer cable supporting platform 883 at the front ends 885 of the cable managers 881.

The cable supporting portions 883 of the cable managers 881 are also configured to be used for latching and unlatching the blades 840/940 for slidable movement. The cable supporting portions 883 at the fronts 885 of the cable managers 881 extend further than the center cable managers 861 and are configured to be grabbed by a user and flexed along a right to left direction. Flexing the cable managers 881 toward the center of the chassis clears tabs 887 that are configured to latch the blades 840/940 to the chassis at a fixed position. The cable managers 881 also define a similar flexible portion 889 at the rear ends 891 thereof that can be flexed toward the center of the chassis for clearing tabs 893 that are used for slidably latching the blades 840/940 at fixed positions to the right and left walls of a chassis.

Figure 98:
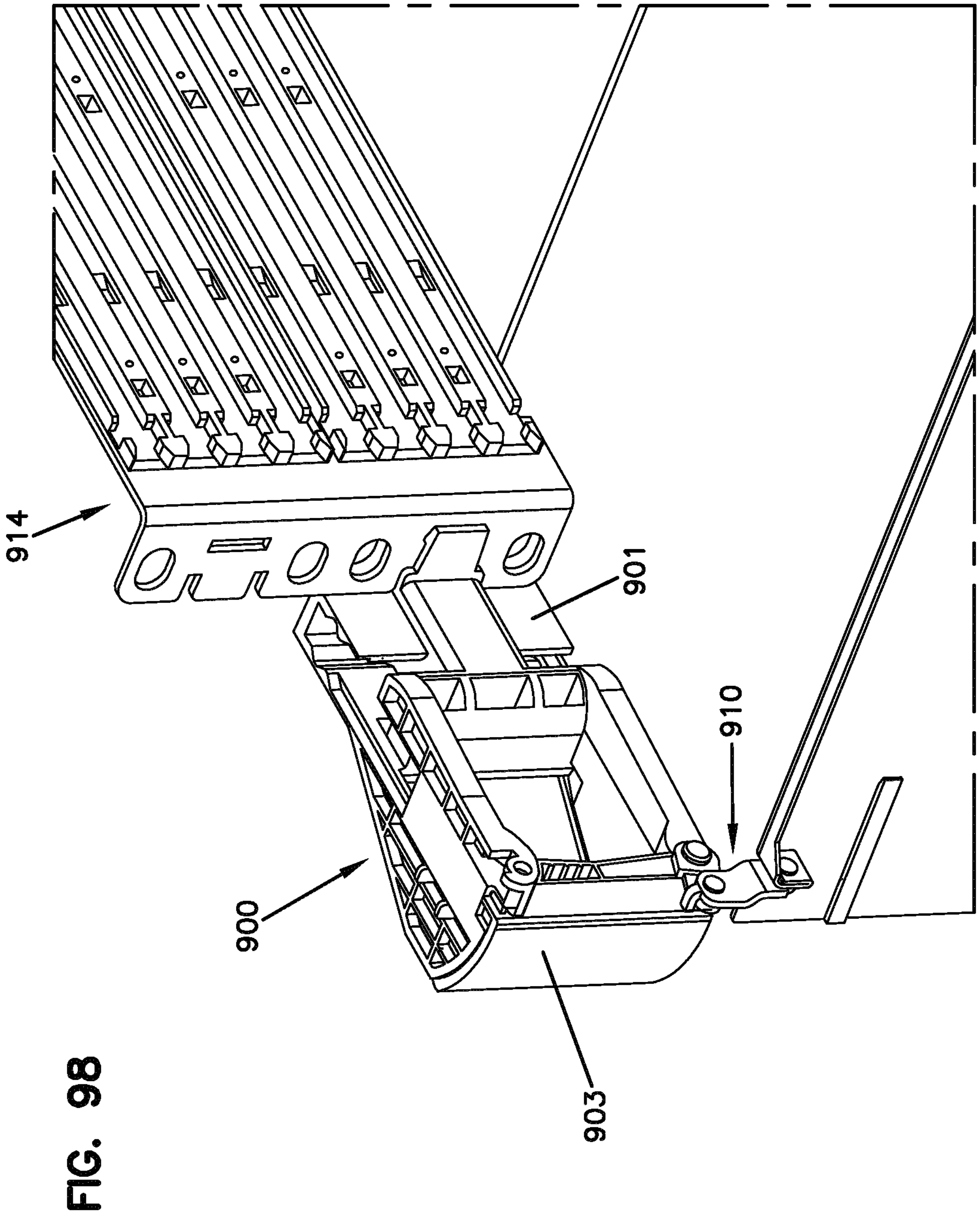
FIG. 98 illustrates a cable manager having features that are examples of inventive aspects in accordance with the present disclosure, the cable manager shown mounted to a chassis similar to the chassis shown in FIGS. 1-97 and illustrated in a closed configuration.
Figure 99:
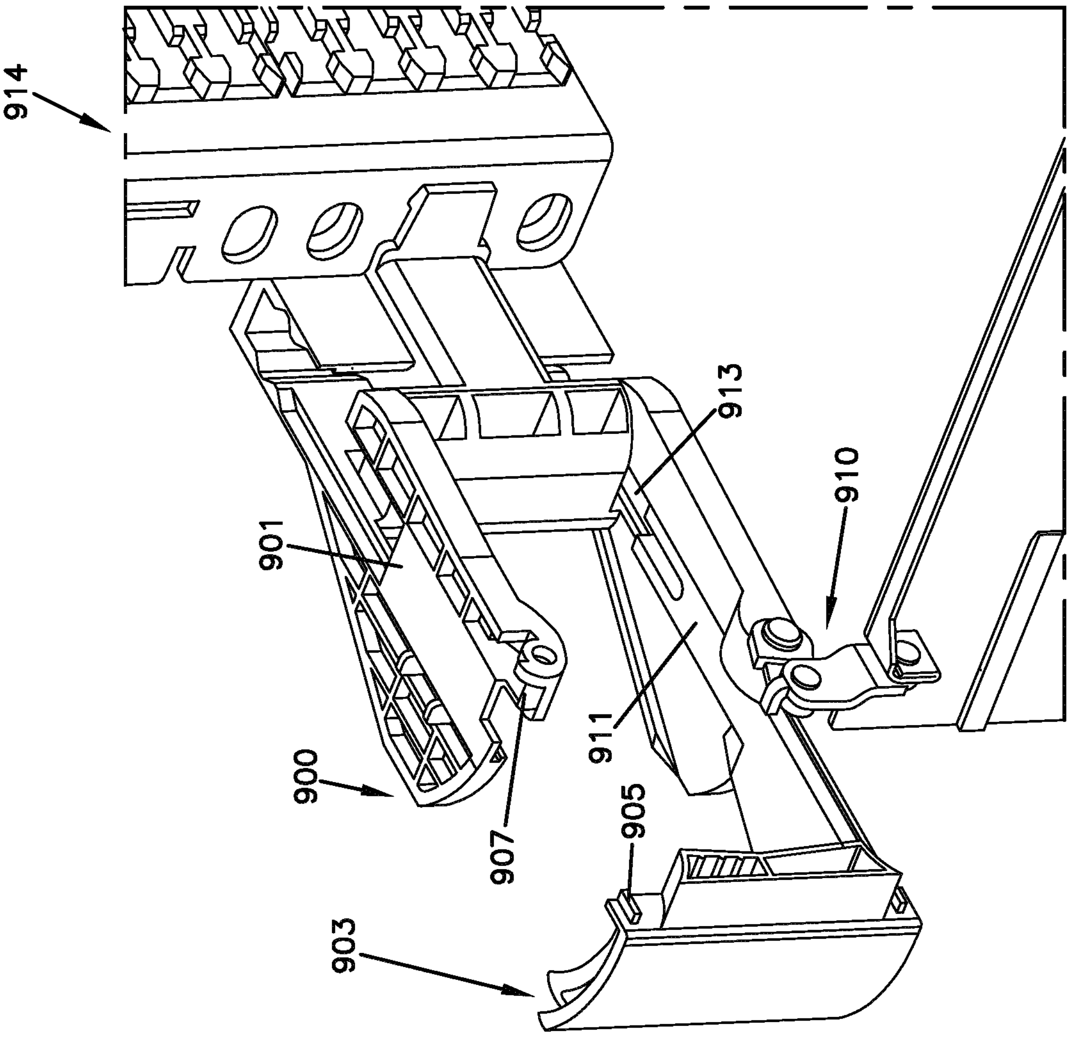
FIG. 99 illustrates the cable manager of FIG. 98 in an open configuration.

Referring now to FIGS. 98-99, a cable manager 900 configured for use on telecommunications chassis similar to chassis 14, 214, 314, and 614 of the present application is illustrated. In FIGS. 98-99, the cable manager 900 is shown as mounted on a chassis 914. As seen in FIGS. 98-99, a portion of the cable manager 900 is used for mounting a door hinge mechanism 910 that is used for pivotally attaching a door 902 to the chassis 914. The door hinge mechanism 910 is similar to a hinge mechanism shown and described in further detail in U.S. Provisional Application Ser. No. 62/027,657, filed on Jul. 22, 2014, the entire disclosure of which is incorporated herein by reference. For further details regarding the configuration of the chassis 914 and the door hinge mechanism 910 used thereon, including the operation thereof, reference may be made to the '657 Application incorporated herein.

Referring now specifically to the cable manager 900 shown in FIGS. 98-99, the cable manager 900 includes a fixed portion 901 that is fixed to the chassis 914 and a slidable portion 903 that is configured to linearly slide with respect to the fixed portion 901. With the slidable portion 903, the cable manager 900 is configured to be moved from a closed configuration to an open configuration. In the closed configuration, the cable manager 900 forms a complete ring for keeping/retaining the cables that are being directed into and out from the chassis 914. In the open configuration, the cable manager 900 defines a split ring wherein the cables can be accessed and removed from the cable manager 900.

The slidable portion 903 defines a slide 911 that is configured to linearly slide within a track 913 defined on the fixed portion 901. The slide 911 and the track 913 define intermating positive stops for limiting the forward movement of the slidable portion 903 with respect to the fixed portion 901.

The slidable portion 903 defines a tab 905 that is configured to latch with a catch 907 defined on the fixed portion 901 for forming a complete ring for keeping/retaining the cables. The tab 905 is elastically removed from the catch 907 when the slidable portion 903 needs to be unlatched from the fixed portion 901 and slid forwardly.

As noted above, the open configuration of the cable manager 900 facilitates removal of the cables from the cable manager 900. When the slidable portion 903 has been moved forwardly with respect to the fixed portion 901, the forward position of the slidable portion 903 also provides extra room for the cables to limit snagging of the cables when a blade (e.g., blade 40, 240, 640, 840, 940) of the chassis 914 is being pulled forwardly.

It should be noted that although the cable manager 900 of the present disclosure may be used on and has been described with respect to a chassis or panel 914 similar in configuration to other chassis (14, 214, 314, and 614) shown in the present application, the cable manager 900 may be utilized on any telecommunications chassis that may require managing of the cables directed into and out of that chassis. The chassis 914 shown herein and also other chassis of the present application are simply examples of the types of telecommunications equipment that may utilize the cable manager 900 of the present disclosure.

According to certain embodiments, the cable manager 900 may be formed from polymeric materials.

Although in the foregoing description, terms such as "top," "bottom," "front," "back," "right," "left," "upper," and "lower" were used for ease of description and illustration, no restriction is intended by such use of the terms. The telecommunications devices described herein can be used in any orientation, depending upon the desired application.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

The invention claimed is:

1. A fiber optic telecommunications system comprising:

a telecommunications chassis defining a front and a rear;

a plurality of blades slidably mounted to the chassis, the blades slidable in a direction extending from the front to the rear; and at least one fiber optic cassette removably mounted to each blade, the fiber optic cassette defining a housing, wherein the cassette housing defines a front side and an opposite rear side;

a cable entry location defined on the cassette housing for a cable to enter the at least one fiber optic cassette, wherein a plurality of optical fibers from the cable extend into the at least one fiber optic cassette and lead to adapter ports provided at the front side of the housing;

wherein the fiber optic telecommunications system further comprises a flexible cable manager that extends from each blade to the chassis, the flexible cable manager configured for managing optical fibers leading to or from the at least one fiber optic cassette, the flexible cable manager defining cable fingers for loosely retaining the optical fibers, the flexible cable manager configured such that when the blades are slid forwardly or rearwardly, the flexible cable manager is able to flex to accommodate a change in distance without violating minimum bend radius requirements for the optical fibers, and wherein the flexible cable manager is configured as a single integral piece that has the ability to bend under loading.

2. A fiber optic telecommunications system according to claim 1, wherein each blade includes a plurality of fiber optic cassettes removably mounted thereon.

3. A fiber optic telecommunications system according to claim 2, wherein each blade includes at least four horizontally stacked cassettes that are mounted within a standard 19-inch width and each cassette includes twelve adapter ports at the front side of the housing.

4. A fiber optic telecommunications system according to claim 1, wherein the at least one fiber optic cassette includes twelve adapter ports at the front side of the housing.

5. A fiber optic telecommunications system according to claim 1, wherein the adapter ports defined by the at least one fiber optic cassette at the front side of the housing are configured for receiving incoming fiber optic connectors that mate with connectors within the housing.

6. A fiber optic telecommunications system according to claim 5, wherein the adapters are configured to receive incoming fiber optic connectors that are of the LC format.

7. A fiber optic telecommunications system according to claim 1, wherein the cable entry location is defined by a multi-fiber connector.

* * * * *